United States Patent

[11] 3,578,951

[72] Inventor Benedict Ingrao
Elmwood Park, Ill.
[21] Appl. No. 693,270
[22] Filed Dec. 26, 1967
[45] Patented May 18, 1971
[73] Assignee John Ingro Jr.
Albuquerque, N. Mex.
fractional part interest

[54] ELECTRIC STOVES
50 Claims, 48 Drawing Figs.
[52] U.S. Cl. .............................................. 219/444,
219/403, 219/455, 219/465, 99/337
[51] Int. Cl. ............................................. H05b 3/68
[50] Field of Search ....................................... 219/455-6,
444, 403; 219/465, 37.4, 535; 99/337

[56] References Cited
UNITED STATES PATENTS

| | | | | |
|---|---|---|---|---|
| 1,704,413 | 3/1929 | Wait | | 219/535 |
| 2,250,357 | 7/1941 | Challet | | 219/456 |
| 2,272,658 | 2/1942 | Challet | | 219/456X |
| 2,810,058 | 10/1957 | Fernico | | 219/465 |
| 2,874,261 | 2/1959 | Wolf | | 219/456 |
| 3,384,735 | 5/1968 | Linger | | 219/456 |
| 1,102,392 | 7/1914 | Denhard | | 219/456 |
| 3,440,406 | 4/1969 | Sego, Jr. | | 219/444 |

Primary Examiner—Volodymyr Y. Mayewsky
Attorney—Alberts, Brezina and Lund

ABSTRACT: Electric stoves in which the relative vertical movement of a pot support and an electric heating element is controlled to control heat, the heating element and the pot support having surface means in horizontal planes. The surface means of the heating element may include at least one portion interposed between horizontally spaced portions of the surface means of the pot support, the heating element preferably including a plurality of generally annular portions at differing radial distances from a central vertical axis. In another embodiment, the pot support includes a thin flat plate portion. In one type of construction, the heating element is moved vertically while in another the pot support is moved vertically. Important features of the invention relate to means for controlling the relative vertical movement, both manually and automatically, with temperature sensing means being usable in conjunction with the control. The control means may control electrical energization of the heating element while also controlling the relative movement of the heating element and the pot support.

INVENTOR
BENEDICT INGRAO

INVENTOR
BENEDICT INGRAO
BY
Alberts, Brezina + Lund

INVENTOR
BENEDICT INGRAO

Patented May 18, 1971

INVENTOR
BENEDICT INGRAO
BY
Alberts, Brezina + Lund

Patented May 18, 1971

INVENTOR
BENEDICT INGRAO
BY
Alberto, Bregina & Lund

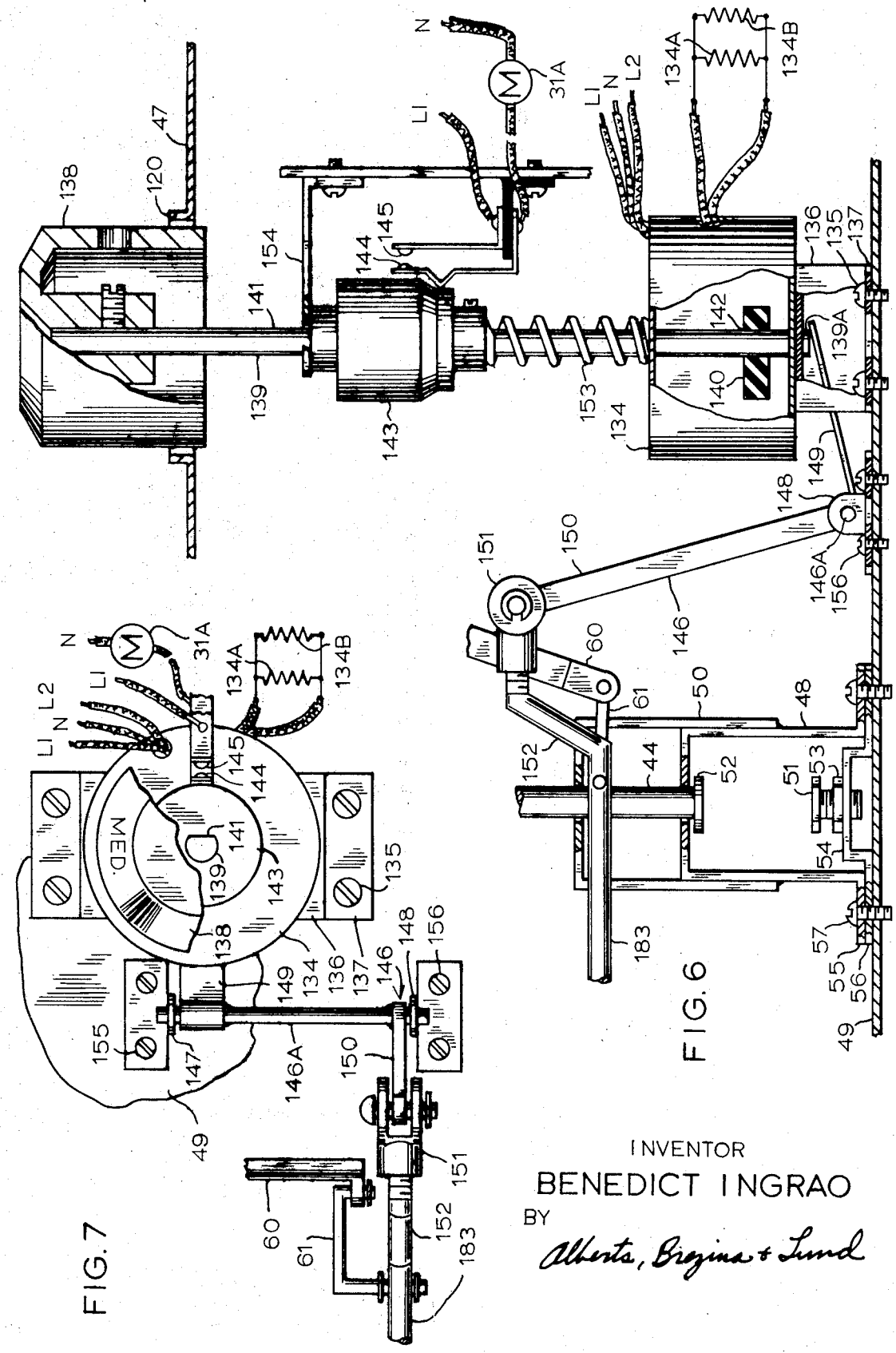

Patented May 18, 1971

INVENTOR
BENEDICT INGRAO
BY
*Alberto, Brazina + Lund*

Patented May 18, 1971

INVENTOR
BENEDICT INGRAO
BY

*Alberts, Brezina + Lund*

Patented May 18, 1971

INVENTOR
BENEDICT INGRAO
BY
Alberts, Brezina + Lund

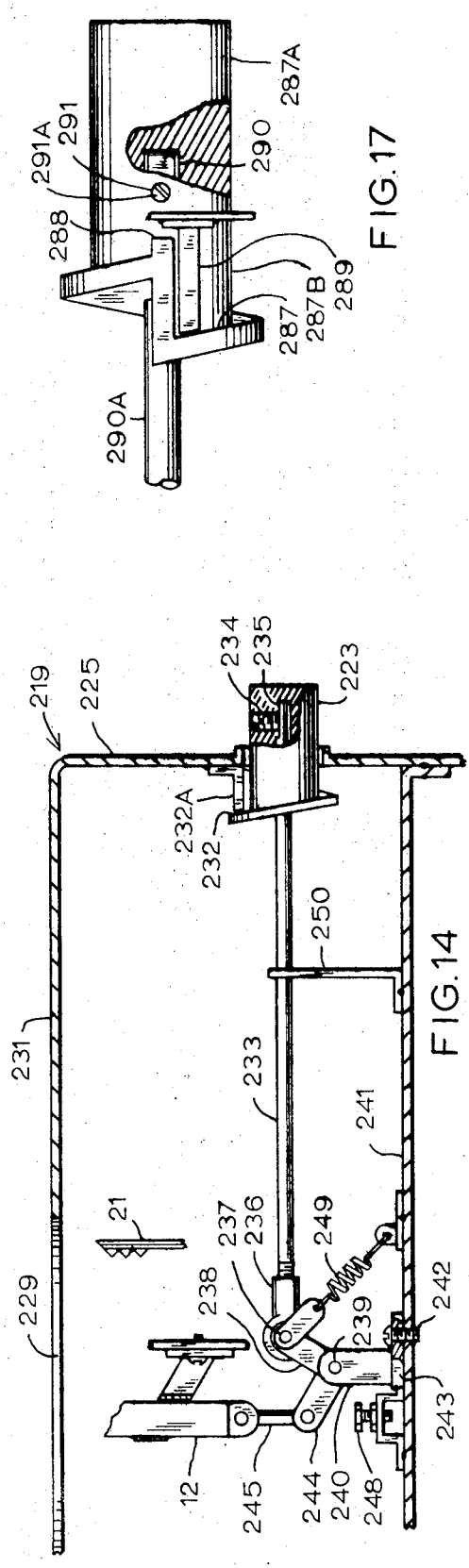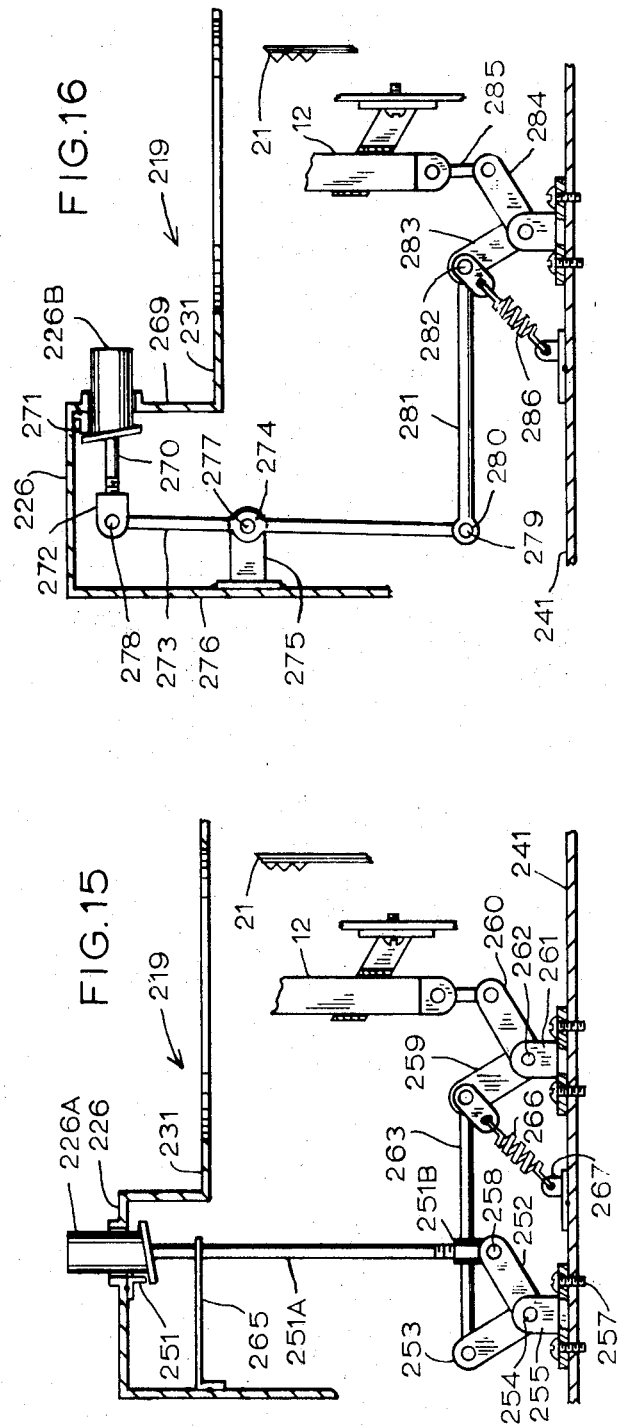
INVENTOR
BENEDICT INGRAO

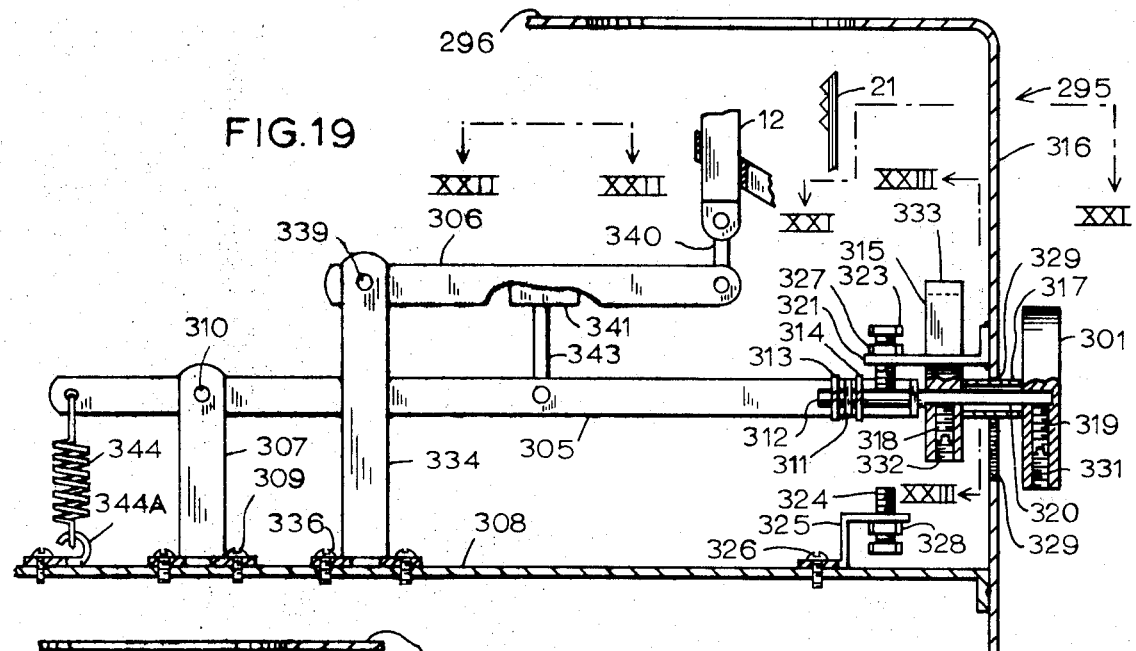
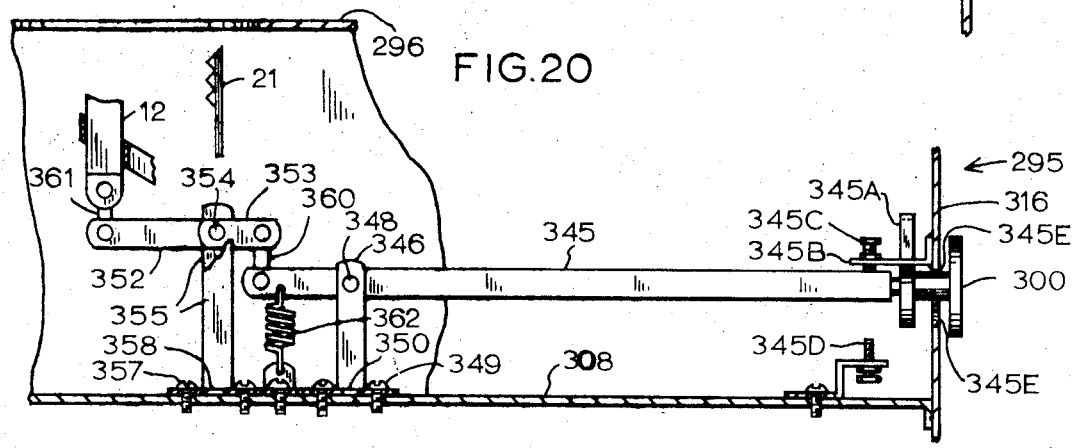
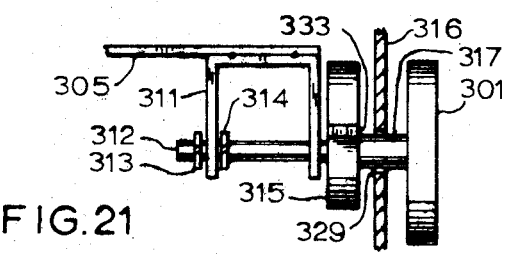
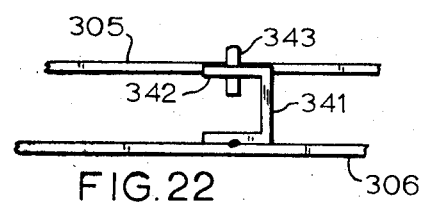
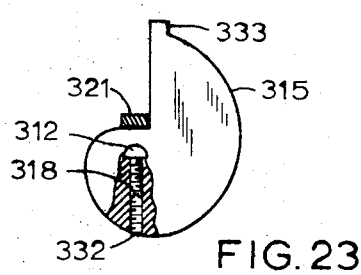
INVENTOR
BENEDICT INGRAO

Patented May 18, 1971

INVENTOR
BENEDICT INGRAO
BY
Alberts, Brezina + Lund

Patented May 18, 1971
3,578,951
22 Sheets-Sheet 14
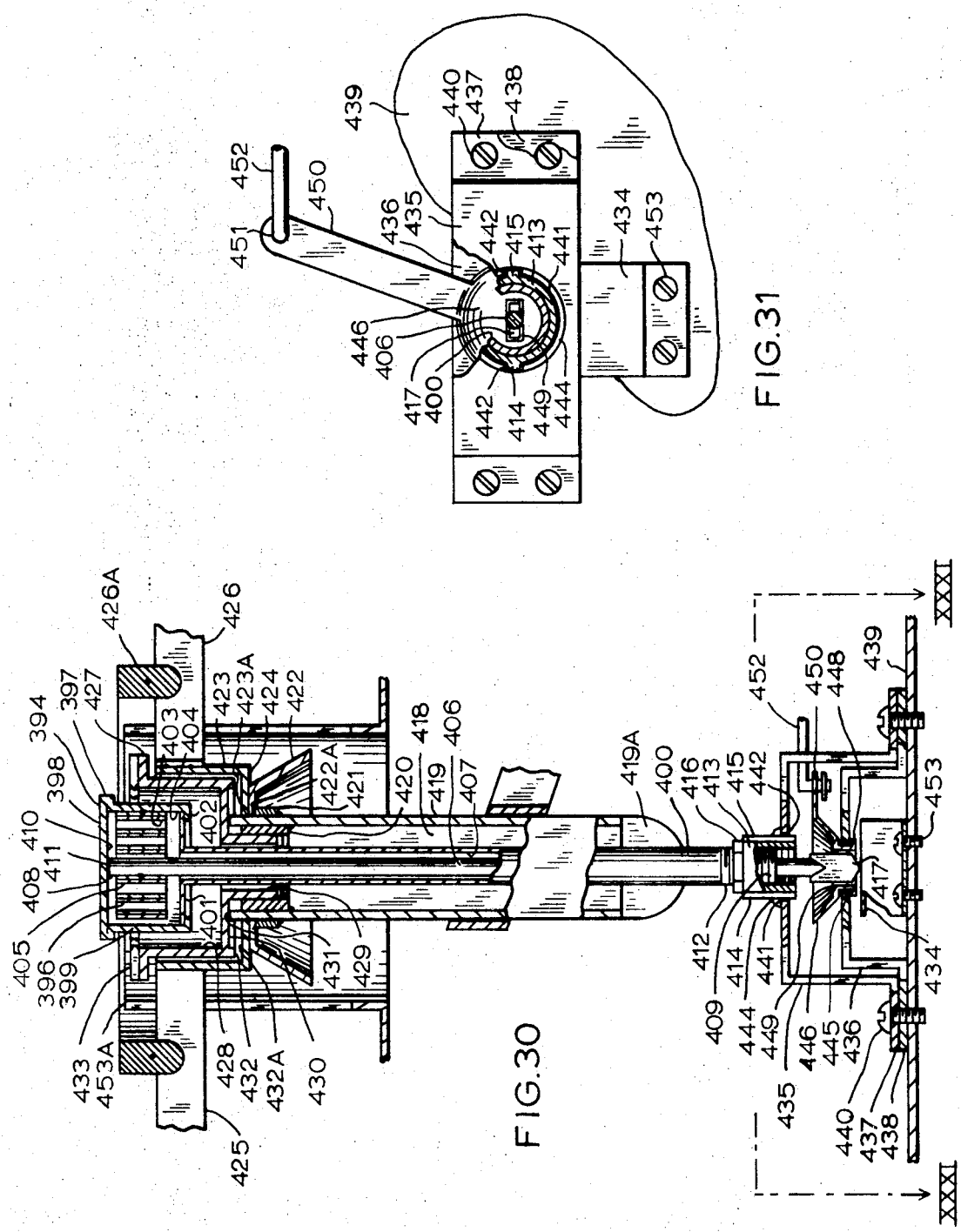
INVENTOR
BENEDICT INGRAO
BY
Alberts, Brezina + Lund Patented May 18, 1971

INVENTOR
BENEDICT INGRAO
BY
Alberts, Brezina + Lund

Patented May 18, 1971

INVENTOR
BENEDICT INGRAO
BY
*Alberts, Brezina + Lund*

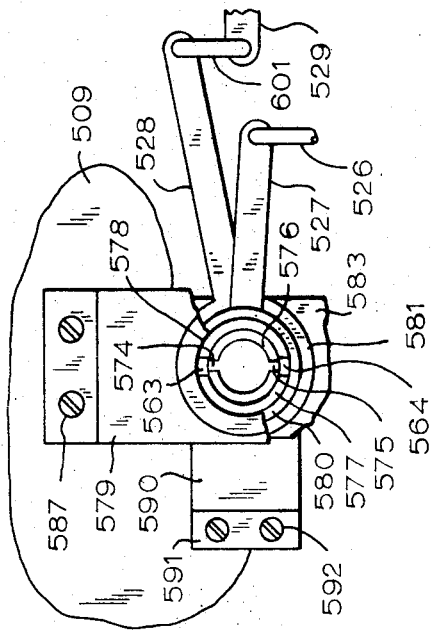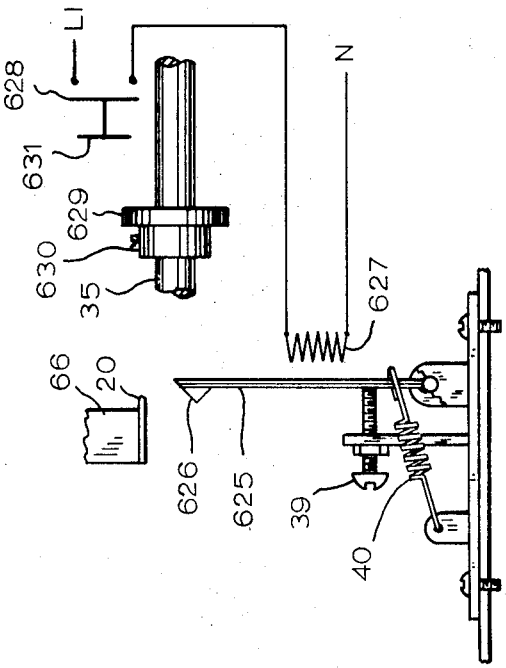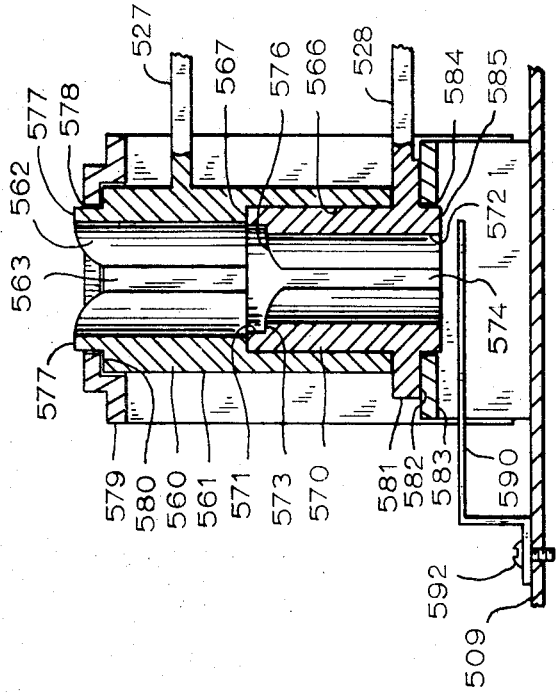

INVENTOR
BENEDICT INGRAO
BY
Alberto, Bregina + Lund

Patented May 18, 1971
3,578,951
22 Sheets-Sheet 21

INVENTOR
BENEDICT INGRAO
BY
Alberto, Brezina & Lund

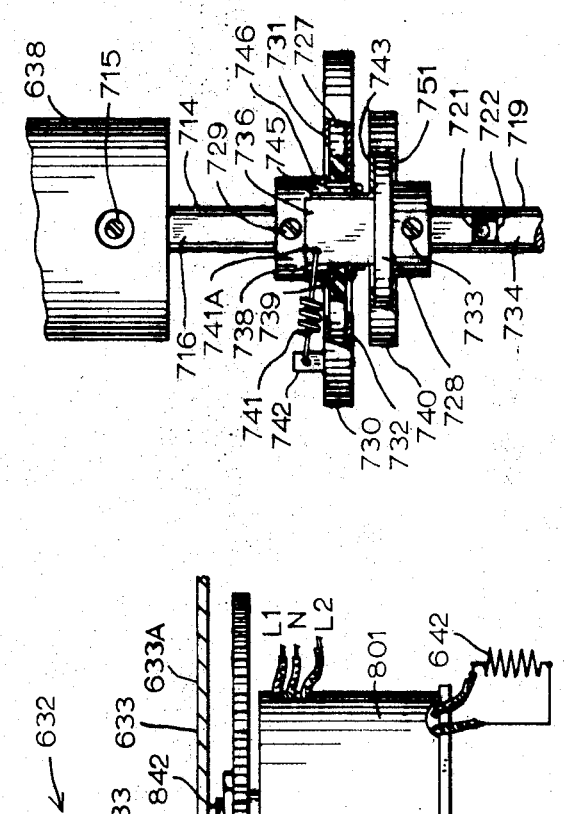

ELECTRIC STOVES

This invention relates to electric stoves and more particularly to electric stoves wherein the heat applied to a pot can be quickly cut off or rapidly set at a desired value, and which are economical in construction while being reliable and trouble-free in operation and readily controlled.

It has long been known that electric stoves have certain seemingly inherent disadvantages which have not been overcome despite a great amount of engineering and research effort. In particular, it is well known that electric stoves are slow in response, with a considerable lag between the time of setting of a particular temperature value and the time when the corresponding temperature is reached. This slow response is particularly troublesome in circumstances when it is desired to cut off heat entirely, and/or quickly, and when a pot is boiling over, for example, and it has been necessary to physically remove the pot from the heating element. Electric stoves have commonly had the additional disadvantage that the heat applied can be varied only in steps. This disadvantage has been overcome to some extent by the provision of elaborate and expensive electrical and electronic controls, but even with such controls, difficulties have been experienced particularly at low heat settings, such as when it has been desired to simmer a pot of stew, for example.

This invention was evolved with the general object of overcoming such disadvantages and of providing electric stoves which are rapid in response and in which the desired amount of heat can be readily and accurately obtained.

A further object of the invention is to provide electric stoves which have such advantages while being readily and economically constructed, reliable and trouble-free in operation and having other desirable features, such as being readily cleaned and serviced, and the like.

Another object of the invention is to provide a highly accurate and reliable temperature sensing means, usable for the control of heat either directly or indirectly, or in any desired application.

According to this invention, an electric stove is provided including a pot support having surface means in a horizontal plane engageable with the underside surface of a pot and an electric heating element is provided having surface means in a horizontal plane positionable in proximity to the underside surface of the pot, with control means being provided for effecting relative vertical movement of the pot support and the heating element. Preferably, although not necessarily, the pot support is fixed, while the heating element is movable.

With this arrangement, the spacing between the heating element and the pot can be varied to obtain an accurate control of heat. Maximum heat can be applied with the heating element in proximity to the pot, while minimum heat of applied with the heating element spaced away from the pot.

In one preferred embodiment of the invention, the heating element includes horizontally spaced portions interposed between horizontally spaced portions of the pot support, the horizontally spaced portions of the heating element being preferably defined by a plurality of generally annular portions at differing radial distances from a central vertical axis. With this arrangement, direct contact between the heating element and the pot can be obtained, when maximum heat is desired.

In another preferred embodiment of the invention, the pot support includes a thin flat horizontal plate portion, the lower surface thereof being engageable by the heating element. Preferably, the plate portion is perforated to allow hot air to escape and also to reduce the total mass of the metal of the pot support, so as to permit more rapid heating and cooling of the pot when a change in heat is desired. However, the plate can be solid to prevent spilled liquids from falling therethrough.

In one type of construction, the pot support is supported in a substantially fixed position in the opening of a horizontal wall or cook top of the stove, preferably with an upstanding ridge being provided around the opening to prevent flow of liquids into the opening.

In another type of construction, the position of the heating element is substantially fixed and the pot support is movable upwardly to lift the pot off the heating element.

A specific feature of the invention is in the provision of means urging the heating element upwardly relative to the pot support to produce a certain engagement pressure between the heating element and the pot. Preferably, a floating and/or tilting connection is provided to permit uniform engagement pressure between all portions of the surface of the heating element and the pot.

Another feature of the invention is in the provision of a pot support which can accommodate pots of small or large diameters, it being here noted that the term "pot" is used herein in a generic sense to include all forms of pans, skillets or other vessels which might be placed on a stove for heating.

The control means for controlling relative vertical movement of the heating element and the pot support may include a manually actuatable element, an electrically driven drive element, or other actuating means, or a combination thereof. A further feature is in the control of both the electrical energization of the heating element and the relative vertical movement of the pot support and the heating element from a common manually actuatable element.

Still another feature of the invention is in the provision of temperature responsive means which is highly accurate and reliable in operation. The temperature-responsive means of this invention is usable in other applications but in accordance with a further feature of this invention, it is used for controlling the relative position of the heating element and the pot support in accordance with the temperature of the underside of the pot, to permit the temperature to be accurately maintained at a desired set value and/or to prevent overheating of the pot. The invention provides temperature-responsive means which can directly control the relative position of the heating element and the pot support through a mechanical connection, or which can control the electrical energization of motor means operative to control the relative position of the pot support and the heating element. It can additionally or alternatively be used to control electrical energization of the heating element.

Yet another feature of the invention is in the provision of means for holding the control means in a condition such that the heating element is at a position spaced away from the pot, preferably with time delay means being provided for automatically releasing the holding means and allowing the heating element to engage the pot after a certain time delay.

Additional features of the invention relate to constructions such as to permit easy cleaning and servicing of the parts, to facilitate economical manufacture, to promote reliable and trouble-free operation and to make for easy and simple control with a high degree of accuracy.

These and other objects, features and advantages of the invention will become more fully apparent from the following detailed description taken in conjunction with the accompanying drawings which illustrate preferred embodiments and in which:

FIG. 6 is a sectional view taken substantially along line VI—VI of FIG. 1, illustrating another form of control mechanism for operating heating element position-regulating mechanism and for controlling electrical energization of a heating element;

FIG. 7 is a top plan view of a portion of the mechanism shown in FIG. 6;

FIG. 14 is a sectional view taken substantially along line XIV–XIV of FIG. 13;

FIG. 14 is a sectional view similar to FIG. 14, but illustrating another modified arrangement wherein controls are located at the back part of a stove;

FIG. 16 is another sectional view similar to FIG. 14, but illustrating a further modified arrangement with controls located at the back part of a stove;

FIG. 17 is a detailed view of a control knob usable with the mechanisms of FIGS. 13—16;

FIG. 19 is a sectional view taken substantially along line XIX–XIX of FIG. 18;

FIG. 20 is a sectional view taken substantially along line XX–XX of FIG. 18;

FIG. 21 is a sectional view taken substantially along line XXI–XXI of FIG. 19;

FIG. 22 is a top plan view of a portion of the mechanism shown in FIG. 19;

FIG. 23 is a sectional view taken substantially along line XXIII–XXIII of FIG. 19;

FIG. 30 is a vertical sectional view of a modified heating element arrangement, incorporating a temperature sensing system constructed in accordance with the principles of this invention;

FIG. 31 is a sectional view taken substantially along line XXXI–XXXI of FIG. 30;

FIG. 37 is a sectional view taken substantially along line XXXVII–XXXVII of FIG. 35;

FIG. 38 is a sectional view taken substantially along line XXXVIII–XXXVIII of FIG. 36;

FIG. 39 is a view illustrating diagrammatically a modified latching, timing and release means;

FIG. 45 is a sectional view taken substantially along line XXXXV–XXXXV of FIG. 40;

FIG. 46 is a plan fragmentary view of elements of the mechanism shown in cross section in FIG. 45, to illustrate the cooperation thereof;

FIG. 47 is a side elevational view of a portion of the mechanism shown in cross section in FIG. 45; and FIG. 48 is a plan fragmentary view showing a locking arrangement for the mechanism shown in cross section in FIG. 45.

Figure 1:
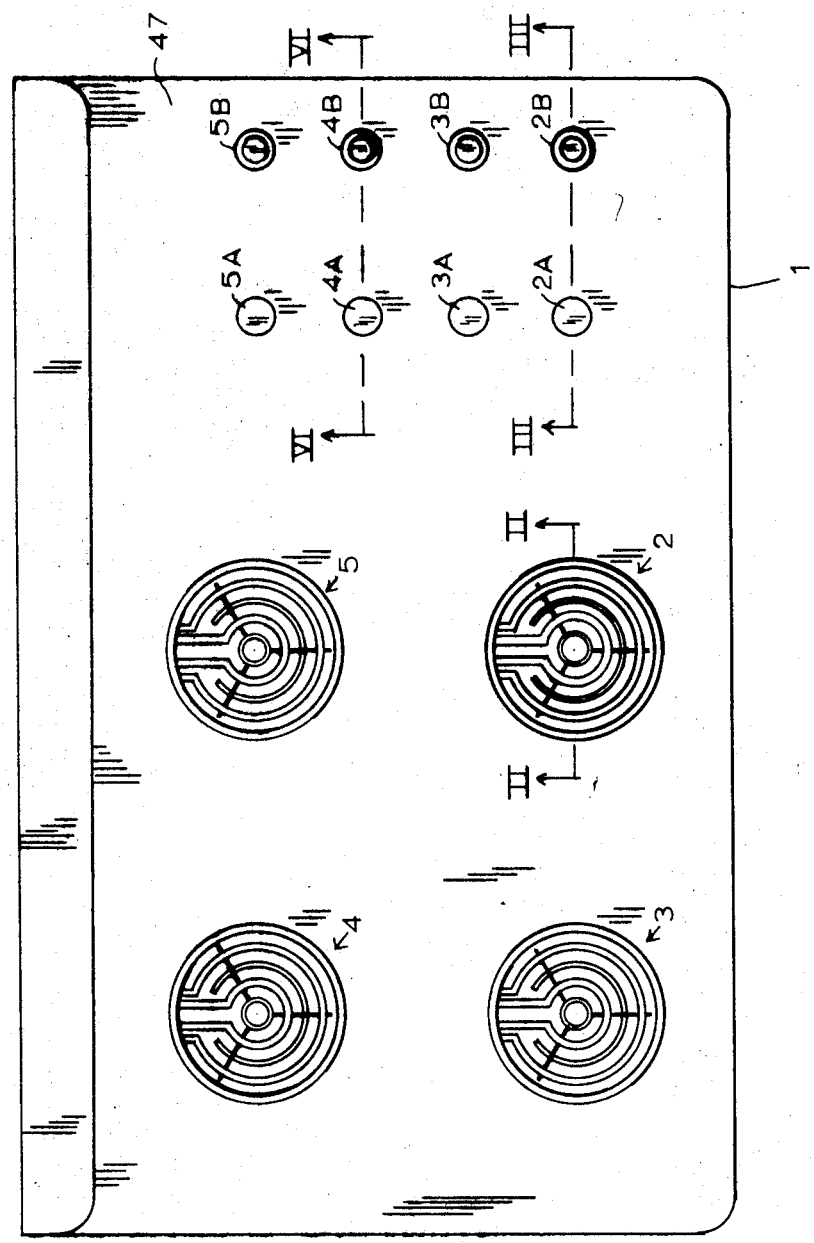
FIG. 1 is a top plan view of an electric stove constructed in accordance with the principles of this invention.

Reference numeral 1 generally designates an electric stove constructed in accordance with the principles of this invention. In general, the stove 1 comprises four-pot support and heating element structures 2, 3, 4 and 5, a pair of control knobs 2A and 2B for controlling the structure 2, a pair of control knobs 3A and 3B for controlling the structure 3, a pair of control knobs 4A and 4B for controlling the structure 4, and a pair of control knobs 5A and 5B for controlling the structure 5.

Figure 2:
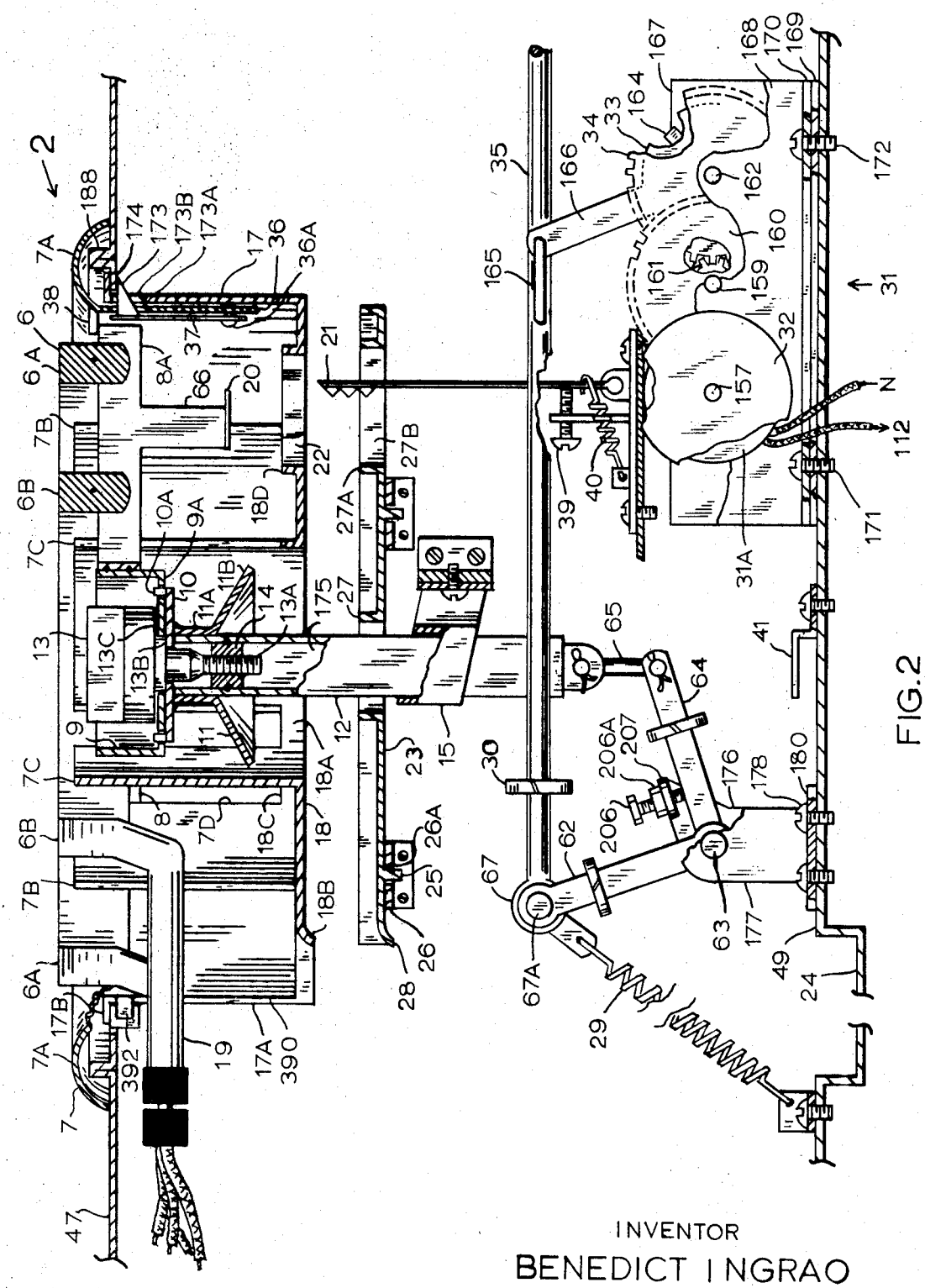
FIG. 2 is a sectional view taken substantially along line II—II of FIG. 1, showing a heating element position-regulating mechanism.

As shown in FIG. 2, the structure 2 comprises a vertically movable heating element 6 which preferably includes outer and inner generally annular portions 6A and 6B at different radial distances from a central vertical axis, and further comprises a stationary pot support 7 which preferably includes an outer circular ring 7A, portions 7B projecting upwardly between portions 6A and 6B of the heating element 6 and portions 7C projecting upwardly inside the inner portion 6B of the heating element 6, the upper surfaces of the ring 7A and the portions 7B and 7C being in a horizontal plane for engagement with the underside of a pot.

The vertical position of the heating element 6 is controllable from the knobs 2A and 2B to allow direct engagement with the underside of a pot supported on the pot support 7 to obtain maximum heat, or at a distance spaced therefrom to reduce the heat applied to the pot.

To support the heating element 6, a plurality of radially extending tie bars 8 are secured to the undersides of the portions 6A and 6B and are secured to a generally cylindrical wall of a central cup-shaped member 9 having a horizontal wall 9A which rests on a circular support disc 10, with index pins 10A projecting upwardly from peripheral edge portions of the disc 10 and through openings in the horizontal wall of the cup-shaped member 9. The disc 10 is welded or otherwise secured to a member 11 having a tubular wall portion 11A of square cross-sectional shape and having a lower frustoconical portion 11B projecting outwardly and downwardly to form a drip collar. The disc 10 together with the member 11 are removably secured on the upper end of an upright vertically movable hollow shaft 12 of square cross-sectional shape, by means of a thumbscrew 13 having a reduced diameter shank portion 13A which is threaded into a nut 14 fixedly secured within the hollow shaft 12. The thumbscrew 13 has a shoulder 13B which engages the disc 10 and has a shoulder 13c spaced upwardly from the shoulder 13B a distance greater than the thickness of the lower horizontal wall 9A of the cup-shaped member 9 to permit limited tilting movement of the heating element 6 and to provide a tilting action such that the heating element 6 can align itself with the bottom surface of a pot on the pot support 7.

To guide the shaft 12 for vertical movement, it extends through a sleeve 15 of square cross-sectional shape which is fixedly supported from the frame of the stove.

In addition to the portions 7A, 7B, and 7C, the pot support 7 has a vertical sidewall 17 and a bottom wall 18, with an opening 17A formed therein for entry of terminal portions 19 of the heating element 6 and also to permit entry of cooling air. The bottom wall 18 also has a central opening 18A to accommodate the shaft 12 and associated parts, the central opening being bordered by a vertical generally cylindrical wall defining the pot support portions 7C. The wall defining the portions 7C could be perforated for ventilation purposes but is preferably solid for a number of reasons. First, it serves as a heat barrier when a heat sensing device is used in place of the thumbscrew 13 as hereinafter described. Secondly, it prevents accidentally spilled liquids from reaching the shaft 12 and associated parts.

The bottom wall 18 of the pot support structure has an opening 22 therein to allow for passage therethrough of a tab 20 which is supported from one of the tie bars 8, the tab 20 being engageable with a toothed locking member 21 to lock the heating element 6 in a lowered position as hereinafter described. The wall 18 also has a lip 18B to channel spilled liquids into a trough 24. It also has upwardly extending ridges 18C and 18D to channel spilled liquids away from the openings 18A and 22 in said bottom wall 18. This pot support also has an outwardly extending circumferential flange 17B which seats on the rim 174 of the opening in the stove by which the pot support is supported in said stove.

In the event of spilling of liquids through the central part of the structure, they are deflected by the drip collar portion 11B to impinge on a splash pan 23 which may operate to channel the spilled liquids into a suitable trough 24 formed in the frame structure of the stove. The splash pan 23 is loosely held in place by means of depending pins 25 which engage in openings 26A in a fixed supporting member 26. The splash pan 23 has ridges 27 and 27A to prevent flow of liquids into the space around the shaft 12 and the opening 27B so that the liquids flow over a lip 28 to be projected into the trough 24.

The heating element 6 is urged upwardly toward a position in engagement with the bottom surface of a pot, by means of a spring 29 which is connected through a suitable linkage to the lower end of the shaft 12. The linkage is described in detail hereinafter, but it is here noted that drip barriers 30 are placed at different points on the linkages to prevent spilled liquids from channeling their way to the bearings of the mechanism.

Normally, the heating element projects upwardly a fraction of an inch above the horizontal plane of the pot support 7 to insure contact with a pot placed upon the pot support 7. The weight of the pot forces the heating element 6 downwardly against the action of the spring 29 to the same level as that of the pot support 7. The spring 29 provides a "floating action" for the heating element 6.

FIG. 2 also shows a motor means 31 which may be used for lowering the heating element 6, the motor means including a small electric motor 31A having a flywheel 32 operable to continue motion after an initial current is applied to the motor. The mechanism is described more in detail hereinafter, but it is here noted that a friction clutch 33 is provided on a disc 34 which is the last gear of a gear train to allow slippage at the end of its function and to also allow manual defeat of the unit when desired. The gear train also serves as a timer to slowly return the heating element to its normal "up" position under the action of the spring 29. To perform its function, the motor means is connected to a horizontally movable control rod or bus bar 35, or to any other point along the control mechanism.

The peripheral ring 7A of the pot support 7 is provided at three points with a downwardly extending finger 36 on the bottom of which is loosely riveted 36A an upwardly extending spring member 37, operating to lock the ring 7A against upward movement. The collar or ring 7A also has at three points an inwardly extending lip 38 which serves as an upper travel limit means to prevent the heating element from going too far beyond its normal upward position. Other features of the pot support arrangement are described in more detail hereinafter.

It is here noted that the holding element 21 is pivotally supported at its lower end and is releasably held against an adjustment screw 39 by means of a spring 40. It is further noted that downward movement of the heating element 6 is limited by a lower travel limit means 41 which is abutted by a portion of the linkage connected to the shaft 12.

A number of control systems for the heating element 6 are incorporated in the illustrated stove, such systems being operable by either of the control knobs 2A and 2B. A stove can be made with any or all of such systems.

Figure 3:
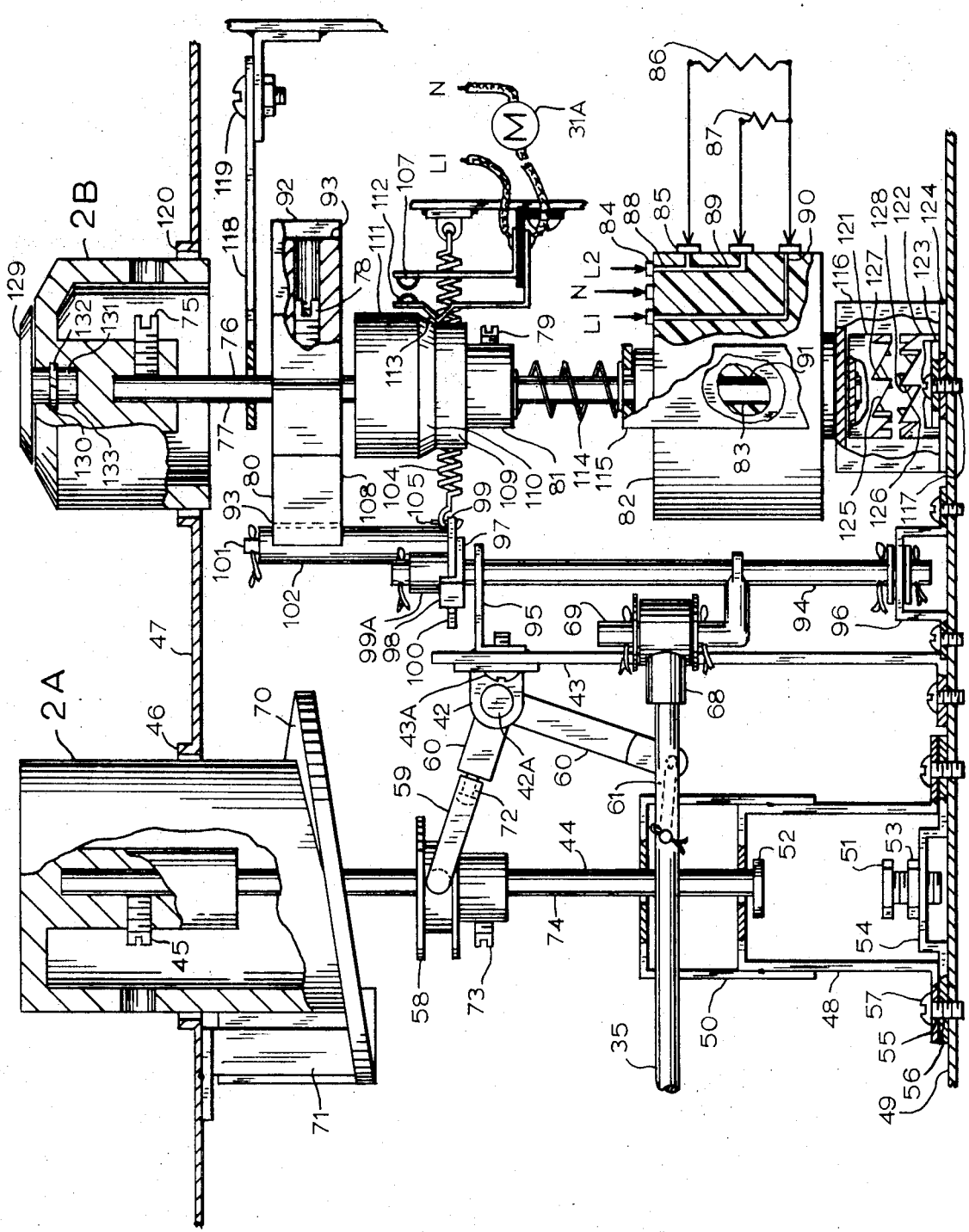
FIG. 3 is a sectional view taken substantially along line III—III of FIG. 1, showing a control mechanism for operating the regulating mechanism of FIG. 2 and for controlling electrical energization of a heating element.
Figure 5:
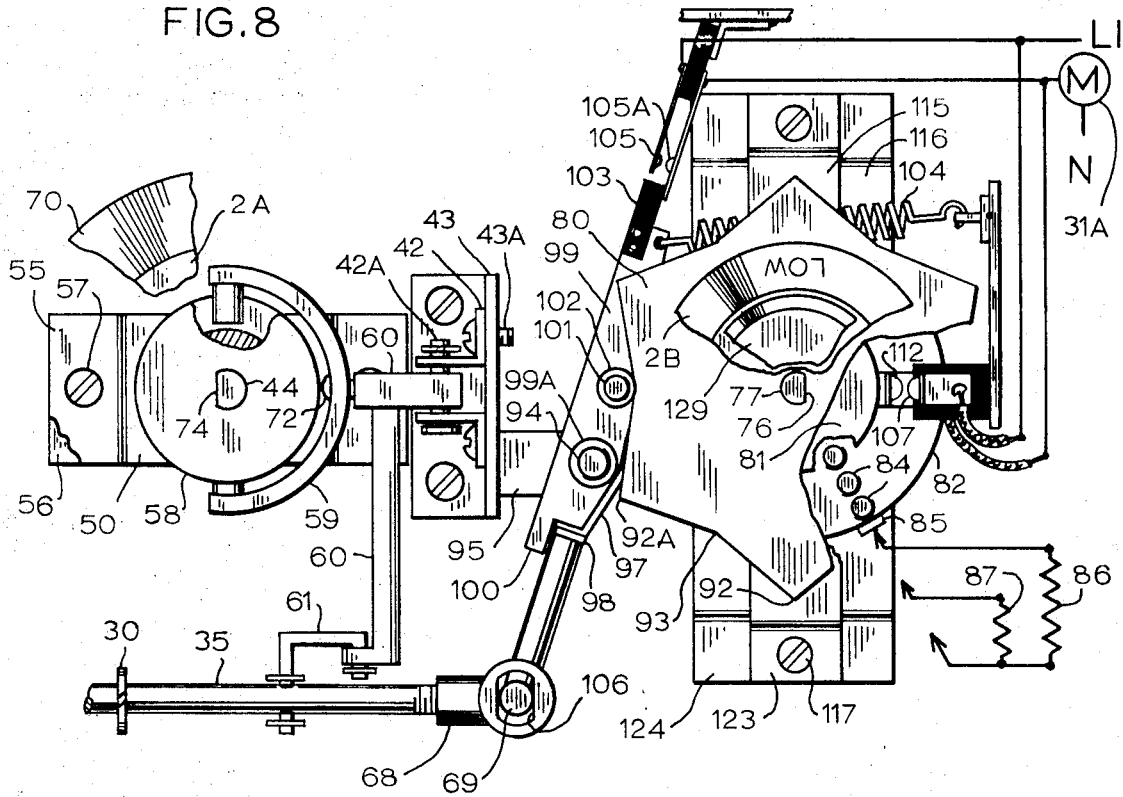
FIG. 5 is a top plan view of the mechanism shown in FIG. 3.

With reference to FIGS. 3 and 5, the knob 2A has two modes of operation. In one mode, it is pressed downwardly to lower the heating element 6 through a connecting linkage. In another mode, the knob 2A is turned to select a suitable distance between the heating element 6 and the bottom of the pot.

The knob 2A is fixed to a shaft 44 by means of a setscrew 45 and is held against horizontal displacement by means of a flange 46 about an opening in a horizontal wall 47 forming a cook top or top plate of the stove. The lower part of the shaft 44 is held against horizontal displacement by means of a centering support 48 which is secured on a horizontal wall 49 forming a structural pan in the frame of the stove. Wall 49 may serve as a separating partition between the top part of the stove and an oven located below. An intermediate centering support 50 for the shaft 44 can also be provided.

Travel limit means are preferably provided to limit the downward travel of the knob 2A, in the form of a setscrew 51 which is screwed into a threaded plate 54 directly below the shaft 44. The shaft 44 has at its lower end a flat head 52 which prevents the shaft from being pulled up too far and it also prevents undue wear on the bottom of the shaft 44 as it impinges on the setscrew 51. The setscrew 51 is locked in position by means of a locknut 53. The plate 54 is positioned directly under the lower centering support 48 and holes 55 in the support 48 are lined with holes 56 in the plate 54, for passage of screws 57 into the wall 49.

When knob 2A is pressed down, the action is transmitted through the shaft 44 to a collar 58 affixed thereto and to a yoke 59 affixed to one arm of a bellcrank lever 60 having a second arm connected through a link 61 to the bus bar or control rod 35. As shown in FIG. 2, the opposite end of the rod 35 is connected to the end of a lever arm 62 secured to a shaft 63 which carries a lever arm 64 connected through a link 65 to the lower end of the heating element support shaft 12. The bellcrank lever 60 is loosely traversed at its midpoint by a pin 42A which serves as a fulcrum point, the pin 42A in turn traverses a pair of support brackets 42 which are secured to a frame 43 by means of screws 43a.

With this arrangement, a downward movement of the control knob 2A moves the heating element 6 downwardly. The tab 20, shown in FIGS. 2 and 4 which is supported at the lower end of a member 66 formed integrally with one of the tie bars 8A moves through the opening 22 to engage the toothed portion of the element 21 which is preferably a bimetal thermostatic element. When tab 20 is engaged with the toothed portion of the element 21, the element 21 absorbs heat from the tab 20 which was conducted from the heating element 6, through the tie bar 8A and through the member 66, and after a certain interval of time, the element 21 is warped to bend back and release itself from the tab 20 so as to allow the heating element to return upwardly.

The connection between one end of the rod 35 and the lever arm 62 includes an enlarged portion 67 at one end of the rod which has an opening receiving a pin 67A secured to the lever arm 62. At the opposite end of the rod 35, as shown in FIGS. 3 and 5, a member 68 is threaded thereto and is arranged to receive a spindle 69 for operation under control of the knob 2A and 2B as hereinafter described.

A further feature of the construction is that the knob 2A can be rotated to adjust the distance between the heating element 6 and the bottom of the pot. For this purpose, the knob 2A is provided with a face cam 70 which operates against a buffer block 71 extending downwardly from the top plate 47 of the stove. When the knob 2A is turned, it is moved downwardly to thereby move the heating element 6 downwardly. The knob 2A is held by friction in any adjusted position, to remain until it is rotated back to its normal starting position.

This control arrangement is useful in many situations. For example, if a large pot is filled with a thick stew, a large quantity of heat might be required to keep the contents at a cooking temperature. If the heat source was in metal-to-metal contact with the bottom of the pot, scorching would take place. However, if the heat source is positioned a short distance from the bottom of the pot, a quarter of an inch for example, a large amount of heat could be delivered to the pot over a more extensive area and with a softer tone.

The knob 2A is normally held in its uppermost position by means of the return spring 29, the upper arm of the lever 60 being loosely coupled to the yoke 59 by means of a rivet head, pin type, extension 72 of the arm lever 60. The pin 72 enters through a hole in the yoke to allow it to swivel freely in the collar 58. The knob 2A and the collar 58 are provided with setscrews 45 and 73 which seat on a flat side 74 of the shaft 44. This arrangement makes it possible to adjust the knob 2A and the collar 58 to the optimum positions thereof.

Other controls are optionally grouped with the above-described controls. Such controls are connected with the knob 2B. The knob 2B is provided with a setscrew 75 which seats on a flat side 76 of control shaft 77, shown in detail in FIGS. 3 and 5. By means of setscrews 78 and 79, a lobed disc 80 and a bevelled circular block 81 are secured to the shaft 77, the screws 78 and 79 being seated against the flat side 76 of the shaft 77.

The control shaft 77 extends through a heat range selector switch 83 having a central bore 83 which is round with a flat side 91 to correspond to the contour of the control shaft 77 which is also round except for the flat side 76. This arrangement allows the control shaft 77 to move upwardly or downwardly through the switch 82 without affecting the switch 82 while providing a means such that the switch 82 can be rotated to select a different heat range. The heat range selector switch 82 has input contacts 84 and output contacts 85 which brush against appropriate contacts when the heat range selector switch 82 is rotated to a new heat range position. In each heat range position, some or all of the input contact points connect with some or all of the output contact points by means of internal wiring or connections which are different for each heat range selection. In FIG. 3, the heat range selector switch 82 is shown in a high position, i.e. a position for maximum energization and maximum heat intensity.

Electric stoves are usually designed for operation from 220 volt power lines, including two input lines L1 and L2 each supplying 110 volts with respect to a neutral line N. In the lower heat ranges, the heating element may be connected between the neutral line N and one of the lines L1 or L2. In higher heat ranges, the heating element may be connected between the lines L1 and L2 so as to supply 220 volts thereto. As diagrammatically indicated in FIG. 3, heating elements 86 and 87 are connected in parallel between lines L1 and L2 so that each receives the full 220 volts, this being accomplished through internal wiring 88 and 89 and through a wire 90 which serves to connect both heating elements 86 and 87 to line L1. The heating elements 86 and 87 are the equivalent of heating elements 6A and 6B of FIGS. 2 and 4. The internal wiring is, of course, different for each heat range selection and when the control knob 2B is turned to an "off" position, the heat range selector switch 82 is also turned, to deenergize the elements 86 and 87. In the "off" position there are no internal wires connecting the input contacts with the output contacts.

In accordance with an important feature of the invention, and referring to FIGS. 3, 4, 5 and 8, the vertical position of the heating element 6 may be controlled in accordance with rotation of the control knob 2B. In particular, the lobed disc 80 has a plurality of lobes 92 in spaced relationship around the outer circumference thereof and a corresponding number of index points 93 each of which is interposed between adjacent lobes or high points 92.

A vertical shaft 94 is supported in an upright position by means of an upper bracket 95 and a lower bracket 96. The spindle 69 is rigidly affixed to a midportion of the shaft 94. The plate 97 having a vertical tab 98 is welded or otherwise rigidly affixed to the upper end of the shaft 94. Another plate 99 which has an integral bushing 99A is loosely fitted on the upper end of the shaft 94 in adjacent relation to the plate 97. Plate 99 carries a tab 100 and a spindle 101 which is loosely fitted with a roller bushing 102, and also carries a second insulated tab 103, and is connected through a spring 104 to a stationary part of the stove frame.

Referring to FIG. 5, in operation, when it is desired to lower the heat range selection and at the same time to lower the heating element 6 away from the bottom of the pot, the control knob 2B is turned clockwise, for example, to the next suitable heat range position and simultaneously the lobed disc 80 is also turned clockwise which causes the nearest lobe 92A to force the plate 99 to revolve counterclockwise through the spindle 101 and the bushing 102. When the plate 99 is revolved, it moves around its central axis 94, the plate 99 being pivotally mounted on the upper end of the shaft 94. With revolving movement of the plate 99, tab 100 thereon engages the tab 98 which is part of the adjacent plate 97, so that plate 97 revolves the vertical shaft 94 counterclockwise to which it is fixedly secured. The shaft 94 causes the spindle 69 to move in a horizontal direction to the right, as viewed in FIG. 5, and to thus move the control rod 35 in a horizontal direction to the right to lower the heating element 6.

While the heating element 6 is being held down by the element 21 for a period of time to allow cooling, the upper plate 99 is rotated clockwise back to its original and normal position on an index point 93 by means of the return spring 104. In its normal position, the plate 99 causes the bushing 102 to seat against one of the index points 93 causing the entire control system of knob 2B to be firmly secured in its selected position, thereby permitting the contact points on the heat range selector switch 82 to be positively positioned with respect to their corresponding brush contacts. When the heating element 6 has cooled off and has been released by the element 21 to be returned to its upper position the bus bar 35 will move to the left and the tab 98 will also move to the left into engagement with its cooperating tab 100 and is again in a normal position, in readiness for the next action.

The operation as thus far described has been strictly mechanical but the mechanical action can be aided by an electrical action, through energization of a motor 31A of the motor means 31. In particular, the control plate 99 has a second insulated tab 103, as viewed in FIG. 5, which normally holds contact points 105 and 105A in an open position, the points 105 and 105A being connected in series with the motor 31A as diagrammatically illustrated in FIG. 5. When the control knob 2B is turned slightly, the plate 99 with the tab 103 is moved correspondingly by one of the lobes 92 which allows the contact points 105 and 105A to close, to thereby apply current to the motor 31A. The electrical current continues until the bushing 102 recedes into an index point indicated by reference numeral 93, at which time the tab 103 returns to its normal position to open the contact points 105 and 105A. With this operation, the electrical current might be applied to the motor 31A for only a short period of time during turning of the control knob 2B to a new position, whereas a longer period of energization might be required to fully move down the heating element 6. To provide a longer period of energization time, the flywheel 32 is provided. When the heating element 6 is moved to the limit of its downward movement, the inertia of the flywheel 32 is dissipated through slippage in the friction clutch 33.

If desired, the control tab 98 and the follower tab 100 can be omitted to disable the mechanical means for lowering the heating element 6, and the lowering can be accomplished strictly by energization of the electric motor 31A. In that event, shaft 94 would be retained along with all of the parts associated therewith, each serving its own particular function as described above.

It should be noted that the member 68 has a transversely extending opening 106 receiving the spindle 69 to permit movement of the spindle 69 in an arcuate path without causing the control rod 35 to be moved transversely.

It is also noted that the control knob 2A can serve as an indicating device to indicate whether or not the heating element 6 is in an "up" position, or in a "down" position, or in any position therebetween. Thus the height of the knob 2A indicates the position of the heating element 6.

If it is desired to lower the heating element 6 electrically without changing the heat range position, the knob 2B is pressed downward which causes the insulated bevelled circular buffer block 81 to ride down proportionately to close contact points 107 and 112 to energize the motor 31A as diagrammatically illustrated in FIG. 5. It will be noted in FIGS. 3 and 5 that if the control knob 2B is depressed, the lobed disc 80 will also be depressed and sufficient clearance is provided between a bottom face 108 of the lobed disc 80 and the top of the shaft 94. Also, the bushing 102 with its supporting spindle 101 are elongated sufficiently to insure proper contact with the index points 93 on the lobed disc 80, regardless of whether the lobed disc 80 is in an "up" position or in a "down" position or in any position therebetween.

The circular bevelled block 81, which is made of bakelite or other insulating material, has three circumferential working surfaces 109, 110 and 111, the surfaces 109 and 111 being cylindrical with the surface 109 having a smaller diameter and with the surface 110 being a tapered surface intermediate the surfaces 109 and 111. When the control knob 2B is in a normally upward position, a supporting member 113 for a contact point 112 is seated on the smaller diameter portion 109. When the control knob 2B is moved in a downwardly extending direction, the bevelled surface 110 cams the supporting member 113 to cause the contact point 112 to touch the contact point 107, thereby completing a circuit to energize the motor 31A. As the control knob 2B is moved further in a downward direction, the supporting member 113 rides on the larger diameter portion 111.

The control knob 2B is returned to its normal upward position by means of a return spring 114 which is placed between the circular bevelled block 81 and a fixed supporting bracket 115. The supporting bracket 115 and another supporting bracket 116 are placed above and below the heat range selector switch 82 to prevent the switch 82 from moving up or down with the control shaft 77. Such brackets are secured to the wall 49 by means of screws 117, the brackets being of inverted U-shaped configuration having outward flanges 123 and 124 with openings therein for receiving the screws 117.

The upper end of the control shaft 77 can be held in vertical alignment, against horizontal displacement, by means of another bracket 118 which is secured to a stationary structure of the frame of the stove by means of adjustable screw means 119. An upwardly extending lip or flange 120 may be provided about an opening in the top plate 47 of the stove, in surrounding relation to the control knob 2B.

As above mentioned, the heat range can be selected by turning the control knob 2B in either direction. Optionally operable means are provided so that the next lower heat range can be selected by merely pressing the control knob 2B downwardly. In particular, a sawtooth rotor 121 is provided on the shaft 77 for cooperation with a sawtooth stator 122 which is fixedly carried on the wall 49. The rotor 121 and stator 122 have angularly spaced teeth in facing relation, formed in cylindrical wall portions thereof, the teeth having inclined faces 125 and 126 and vertical faces 127 and 128.

In a normal position of alignment, the opening teeth are slightly staggered so that points of the inclined faces 125 and 126 will engage as the control knob 2B and shaft 77 are moved downwardly. With further movement, the rotor member 121 will be rotated by camming action until the vertical faces 127 and 128 engage. Then when the control knob 2B is released, the spring 114 causes it to move upwardly while it is rotated further by the pressure of the bushing 102 against the lobed disc 80, until the bushing 102 seats itself against an index point 93 through the action of the spring 104. Thus, the shaft 77 is brought to a position such that the knob 2B can again be depressed to effect engagement of the surfaces 125 and 126 and to again rotate the shaft 77 and the switch 82 to the next lower heat range.

To facilitate the operation in which the knob 2B is depressed in order to effect rotation thereof, a loosely fitting cap 129 is preferably provided on top of the control knob 2B so as to allow free turning of the knob, and so as to obviate friction which might otherwise occur between the knob 2B and the palm, thumb or finger of a person's hand. The cap 129 is substantially a flat horizontal disc having on its underside a short axle 131 which is fitted with a lockring 132, the top of the knob 2B being provided with a centrally located bore 133 having an undercut 130 to serve as a seat for the lockring 132. The bore 133 thus serves to loosely embrace the axle 131.

It will be noted that this system of changing the heat range selection can be modified by the addition of contact points 107 and 112 and the buffer block 81. With the combination of both systems and optionally including the lobed disc 80 with its mechanical parts carried on shaft 94, it is possible to lower the heat range selection and lower the heating element 6 simultaneously, merely be pressing down on the control knob 2B.

FIGS. 6 and 7 show a different type of heat range control switch 134, which is not a step-type switch as shown in FIG. 3 but is an infinitely variable control through which any degree of electrical energization of the heating element can be obtained. It can be a rheostat type of control, but preferably is of a type now in commercial use, wherein a cam controls the positioning of contact points which make and break alternately to supply current to the heating element 6, according to the time required to maintain the desired energization of the heating element 6, which is shown as 134A and 134B in FIGS. 6 and 7.

The body of the heat range selector control 134 is stationary and is secured to the wall 49 by means of screws 135. An inverted U-shaped bracket 136 with outwardly extending flanges 137 is welded to the underside of the body of the control 134. The bracket 136 keeps the control 134 in fixedly spaced relationship to the wall 49, the screws 135 being extended through openings in the outwardly extending flanges 137.

In this control system, a control knob 138 is provided which is secured to the upper end of a shaft 139, shaft 139 being keyed to a cam 140 in the control 134, as diagrammatically illustrated. When the control knob 138 is turned to select a suitable heat range, the cam 140 is also turned to set the relative working positions of contact points (not shown) in the control 134. The control shaft 139 has a flat side 141 which coincides with a flat side in the bore 142 of the cam 140.

In operation, the control knob 138 is turned to select the heat range desired. The same control knob can be provided with means to lower the heating element 6. In particular, a circular bevelled buffer block 143 similar to the block 81 in the arrangement of FIG. 3 can be provided to control engagement of contact points 144 and 145 in series with the motor 31A, so as to control the lowering of the heating element 6 through electrical means.

A mechanical means for lowering the heating element 6 can be optionally or additionally provided, including a bellcrank lever 146 having an arm 149 engaged by the lower end 139A of the shaft 139 and having a second arm 150 connected to the end of the control rod 183 through a member 151, the rod 183 in this arrangement having an offset end portion 152 on which the member 151 is threaded. The control rod 183 functions the same as bus bar 35. The shaft 146A is pivotally held in a horizontal position by means of flanged brackets 147 and 148 which are secured to the structural pan 49 by means of screws 155 and 156.

In operation, the control knob 138 is pressed downwardly to cause the lower end 139A of the shaft 139 to press the lever arm 149 downwardly which moves the lever arm 150 in a clockwise direction as viewed in FIG. 6, so as to move the heating element 6 downwardly through the linkage shown in FIG. 2. The control knob 138 is normally held in an "up" position by means of a return spring 153 which is placed between the block 143 and the control 134.

It is here noted that the sawtooth rotor 121 cooperates with the stator 122 to serve as a means for limiting downward movement of the shaft 77 in the arrangement of FIG. 3. In the event that the sawtooth rotor and stator arrangement is not used, a flat head can be provided at the bottom of the shaft 77 to cooperate with a fixed stop, in an arrangement similar to the means illustrated for limiting downward movement of the shaft 74 in FIG. 3.

The bracket 154 in FIG. 6 serves as an upper travel limit means for the shaft 139, while the lever arm 149 and the wall 49 serve as a lower travel limit means.

Figure 4:
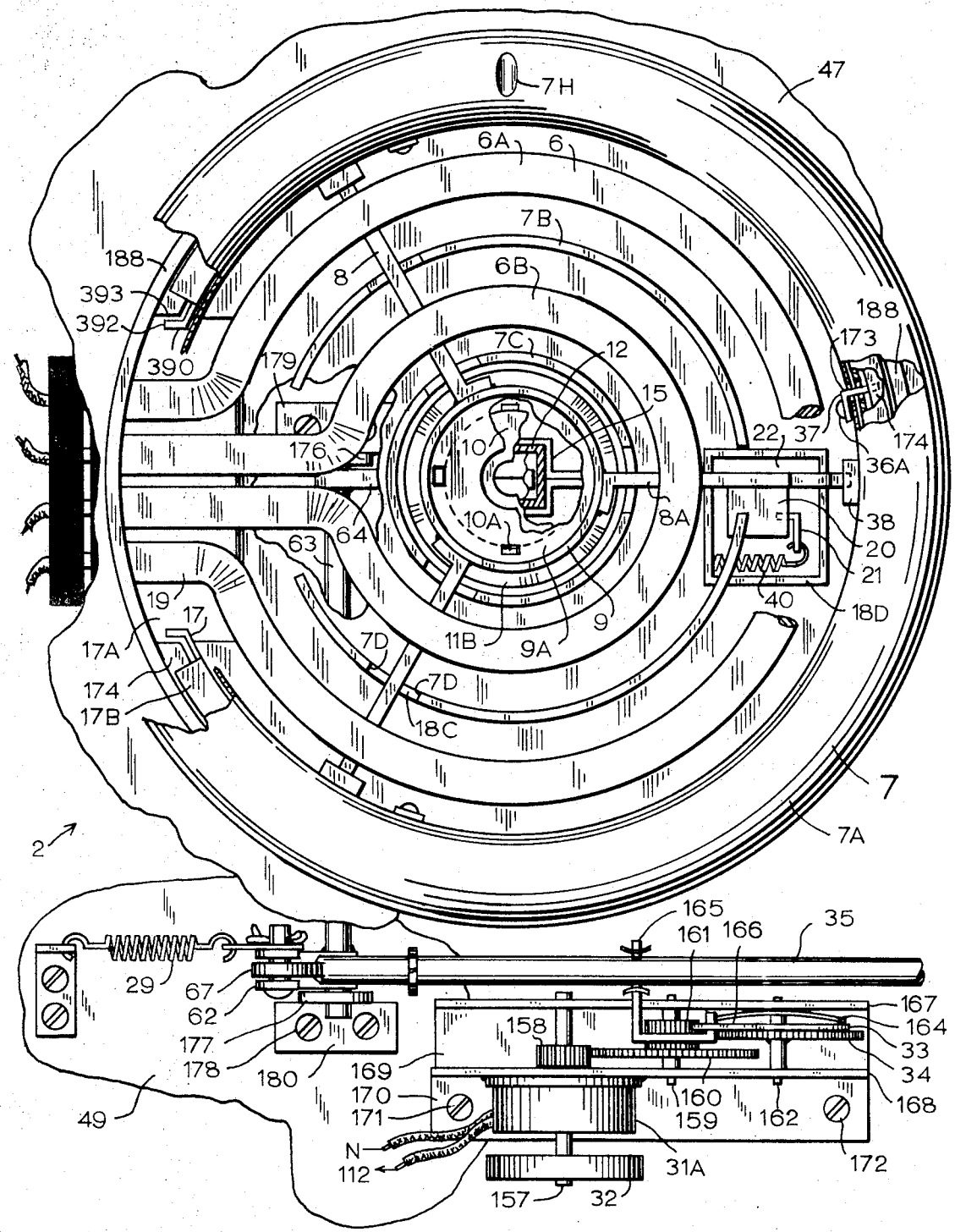
FIG. 4 is a top plan view of the mechanism shown in FIG. 2.

Referring to FIGS. 2 and 4, and particularly to FIG. 4, the motor means 31 comprises two support plates 167 and 168 in spaced parallel vertical planes having horizontal mounting flanges 169 and 170 at the lower ends thereof, which may be secured by screws 171 and 172 to the wall 49. The housing of the motor 31A is mounted on the plate 168 and the motor 31A has a shaft 157 extending through openings in the plates 168 and 167, the flywheel 32 being secured to an opposite end portion of the shaft 157. The shaft 157 carries a pinion 158 which is meshed with a gear 160 on a shaft 159, pinion 161, affixed to the gear 160, being meshed with a gear 34 which serves as a disc on shaft 162 frictionally engaged by the clutch plate 33, a spring 164 being provided between the plate 33 and the plate 167. The clutch plate 33 carries an arm 166 which is coupled to the control rod 35 by means of a connecting link 165.

It will be understood that the motor 31A can be omitted and the remaining parts can still be used as a timing means for the upward return of the heating element 6 and/or as a slow return means to prevent the return spring 29 from impinging the heating element 6 abruptly against the bottom of the pot.

FIG. 4 also provides a top plan view of the structure 2 and shows the spring members 37 which, as described above, and also shown in FIG. 2, are secured to the fingers 36, which are a part of the ring 7A, it being noted that each spring member 37 is swivelly secured to the bottom end of the corresponding finger 36 by means of a rivet 36A and normally presses against the full vertical length of the finger 36. The top end of each spring member 37 has a pointed tip 173 which extends through an opening 173A in the top end of the finger 36 and through an opening 173B in the sidewall 17 and which also seats under a rim 174 of an opening in the top plate of the stove, to prevent vertical movement and the horizontal rotation of said ring 7A. When it is necessary to remove the pot support 7 for cleaning or otherwise, the top ends of the spring members 37 are moved away from their normal positions to allow the tips 173 to clear the opening in the top portion of the fingers 36 and the spring members 37 are then swiveled in a sidewise direction so as not to engage the tips 173 through the openings in the fingers 36 until it is desired to do so when replacing the pot support structure.

It may here be noted that the shaft 12 is hollow to provide a space 175 which may conveniently be used to accommodate heat controls or other accessories mounted in the space normally occupied by the nut 14 and thumbscrew 13, as hereinafter described.

It is further noted that the heating element 6 can be in the form of a pair of circular portions 6A and 6B as illustrated or it can be in the form of spiral loops while the pot support points can be interposed between adjacent loops in a manner similar to the illustrated arrangement.

Conventional heating elements are flattened horizontally to provide greater surface area of contact with the bottom of a pot and a better heat distribution. Such conventional heating elements can be used in a stove constructed according to this invention, or modified heating elements could be used in order to take advantage of features of the invention. In particular, the illustrated heating element portions 6A and 6B are flattened vertically to allow more space therebetween, to accommodate the vertically extending pot support portions 7B and 7C. The upper surfaces of the heating element portions 6A and 6B are, however, flattened horizontally to provide a greater area of surface contact with the bottom of the pot.

Figure 8:
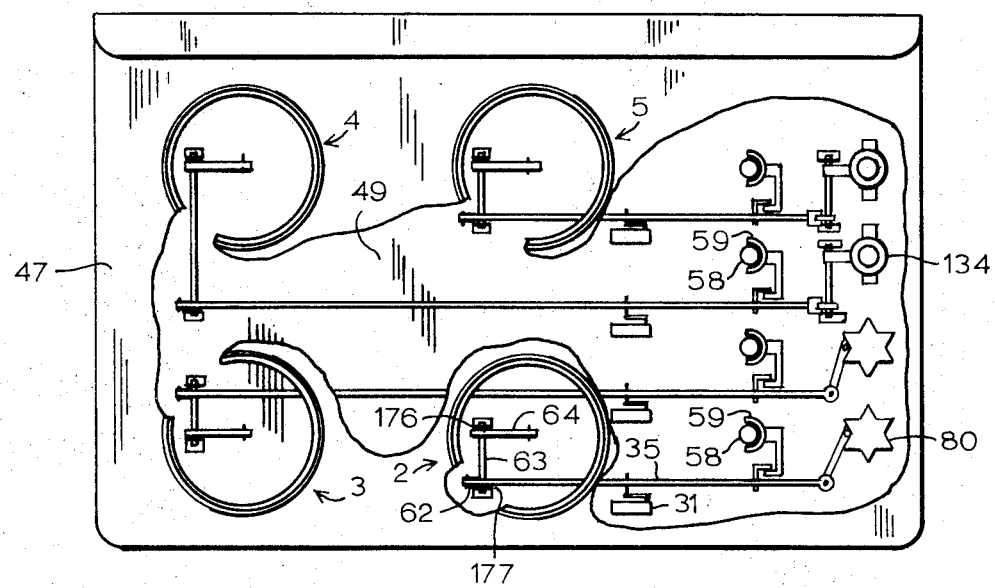
FIG. 8 is a diagrammatic plan view of the arrangement of the mechanisms shown in FIGS. 2—7 in relation to the heating elements of the stove.

FIG. 8 shows a top view of the stove in FIG. 1 with the top panel 47 cut away to show the layout of the connecting linkage in the stove. The controls to the front heating elements are shown as 80 and using the controls shown in FIGS. 3 and 5. The heating elements in the rear are shown being controlled by the controls 134 shown in FIGS. 6 and 7, for example.

Figure 9:
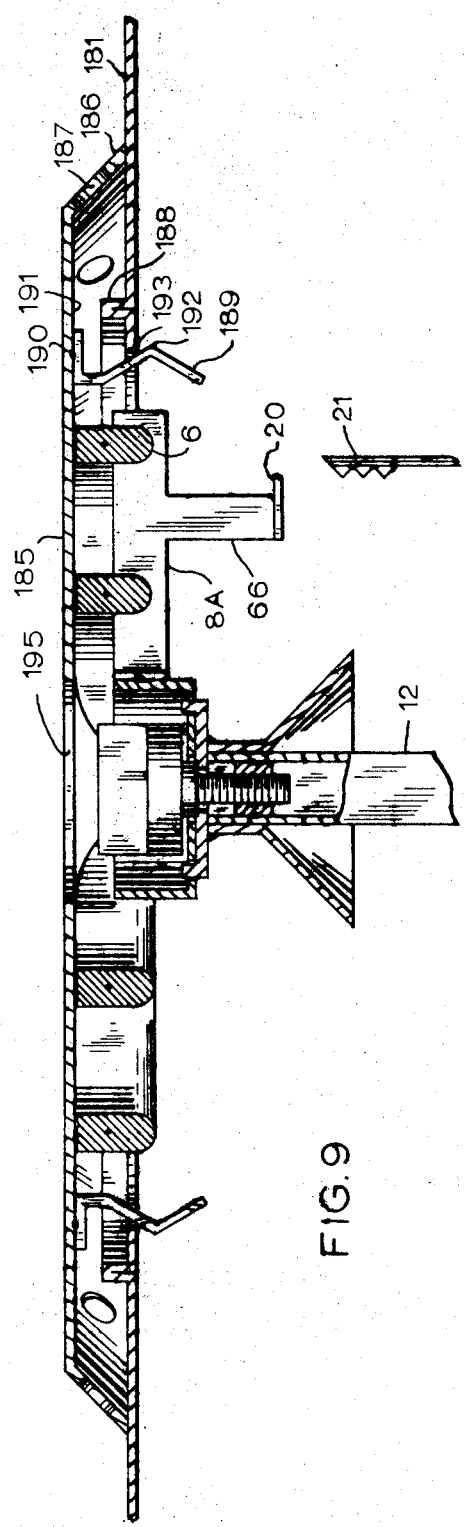
FIG. 9 is a sectional view similar to an upper portion of FIG. 2, but illustrating a modified pot support and heating element structure.

Reference is now invited to FIG. 9 which is a cross-sectional view of a modified pot support and heating element structure. A pot support 185 is provided which is substantially a flat disc placed over an opening in the top plate 181 of the stove, similar to the top plate 47 in FIG. 2, the pot support 185 preferably having a diameter substantially greater than that of the opening and being held in spaced relation above the top plate of the stove by means of a downwardly and outwardly extending peripheral rim portion 186. Rim 186 may preferably have openings 187 to allow escape of hot air from under the plate 185.

The opening in the top plate of the stove is preferably bordered by a raised ridge portion 188 to prevent spilled liquids from flowing into the opening. A raised ridge of this type may preferably be provided regardless of which type of pot support is used.

The pot support 185 is held in position by means of spring strips 189 which are secured by welds 190 or otherwise to the underside surface 191 of the disc 185. Strips 189 extend downwardly and have outwardly deformed midportions 192 engageable with surface portions 193 on the underside of the top plate of the stove adjacent the opening therein. The spring strips 189 exert a pressure sufficient to prevent the support 185 from being dislodged by upward pressure of the heating element 6 or by displacement by a cook pot. In the arrangement of FIG. 9, the heating element 6 normally is in firm engagement with the underside surface of the support 185 to transmit heat therethrough to the cook pot thereon.

Figure 10:
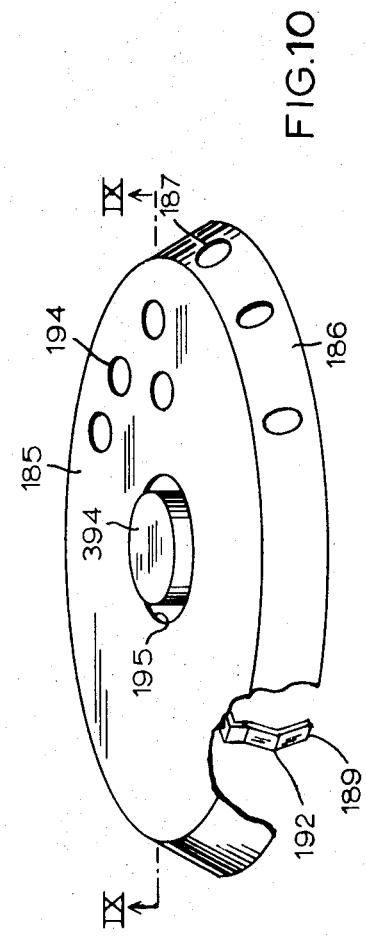
FIG. 10 is a perspective view of a pot support member of the structure shown in FIG. 9.

Referring to the perspective view of FIG. 10, the disc 185 can be perforated as shown in part and as indicated by reference numeral 194, to allow escape of hot air and also to reduce the total mass of metal so as not to absorb excessive heat which would be applied to the pot after the heating element 6 is lowered. In the alternative, it can be solid without any perforations, to prevent spilled liquids from flowing into the opening in the top plate of the stove.

It should here be noted that the support 185 may be provided with a central opening 195 to accommodate a heat sensing arrangement indicated by numeral 394 and described in detail hereinafter.

Figure 11:
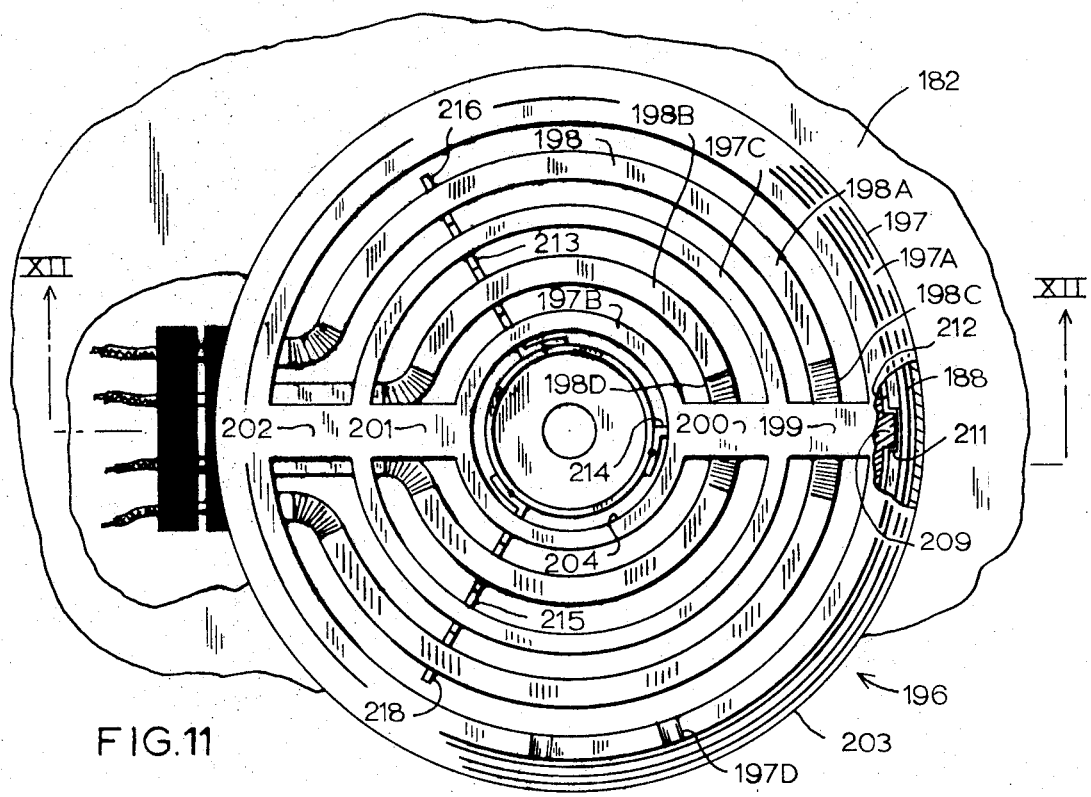
FIG. 11 is a top plan view of another modified form of pot support and heating element structure.

FIG. 11 is a top plan view of another modified form of pot support and heating element structure generally designated by reference numeral 196. The structure 196 comprises a pot support 197 having an outer circumferential rim portion 197A, an inner ring portion 197B and preferably at least one intermediate ring portion 197C. The upper surfaces of the portions 197A, 197B and 197C are preferably located in a horizontal plane. A heating element 198 is provided having portions 198A and 198B which is of a construction similar to that of the element 6 except that a modification in shape is made to accommodate radially extending rib portions 199, 200, 201 and 202 of the pot support 197 which function to connect the portions 197A, 197B and 197C thereof. In particular, the heating element 198 has downwardly curved portions 198C and 198D below the rib portions 199 and 200, to provide clearance between said heating element and the bottom of said rib portions 199 and 200, so as to allow engagement of the heating element 198 with the underside of a pot on the pot support 197.

The outer circumferential rim portion 197A of the pot support 197 is angled downwardly at 203 to rest on the top plate 182 of the stove outside a raised annular ridge 188 which surrounds an opening therein.

Figure 12:
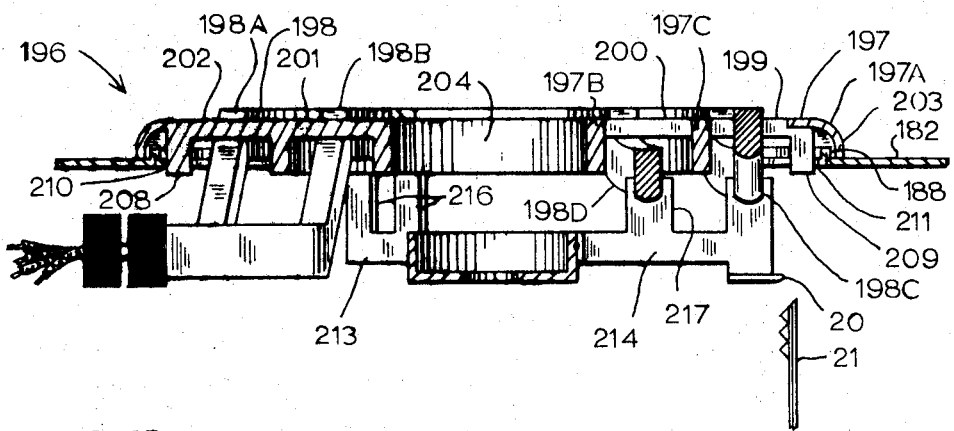
FIG. 12 is a sectional view taken substantially along line XII–XII of FIG. 11.

It is noted that when using the type of pot support illustrated in FIGS. 11 and 12, it is desirable to provide a travel limit means operative on the control linkage to prevent the heating element 198 from traveling upwardly beyond a certain position. In particular, as shown in FIG. 2, an adjustment screw 206 is provided which is threaded into a tab extension 207 of a flange support bracket 176, the screw 206 being locked in position by means of a locknut 206A, the adjustment screw being engaged by the lever 64 to limit counterclockwise movement thereof and to thereby limit upward movement of the heating element. It is further noted that the bracket 176 cooperates with another flanged bracket 177 in providing a bearing for the shaft 63, with screws 178 extending through holes in flange portions 179 and 180 of the brackets 176 and 177 to hold the same to the wall 49.

Referring again to FIGS. 11 and 12, the pot support 197 is provided with index means 208 and 209 which prevent it from turning in the opening in the top plate 182 of the stove. Such index means 208 and 209 are in the form of downwardly extending tabs which are integral with the pot support 197 and are located adjacent the outer periphery thereof. Preferably, the index tab means 208 and 209 are located in diametrically opposite positions, in alignment with the ribs 199—202. The index tab means 208 and 209 seat into cutouts 210 and 211 provided in the edge of the opening 212 in the top plate 182 of the stove.

Horizontal crossbars 213, 214 and 215 support the heating element 198 and have vertically rising extensions 216, 217 and 218 which are rigidly secured to the portions 198A and 198B of the heating element 198. The central opening 204 is provided for a thumbscrew or for a heat sensing device hereinafter described.

Figure 13:
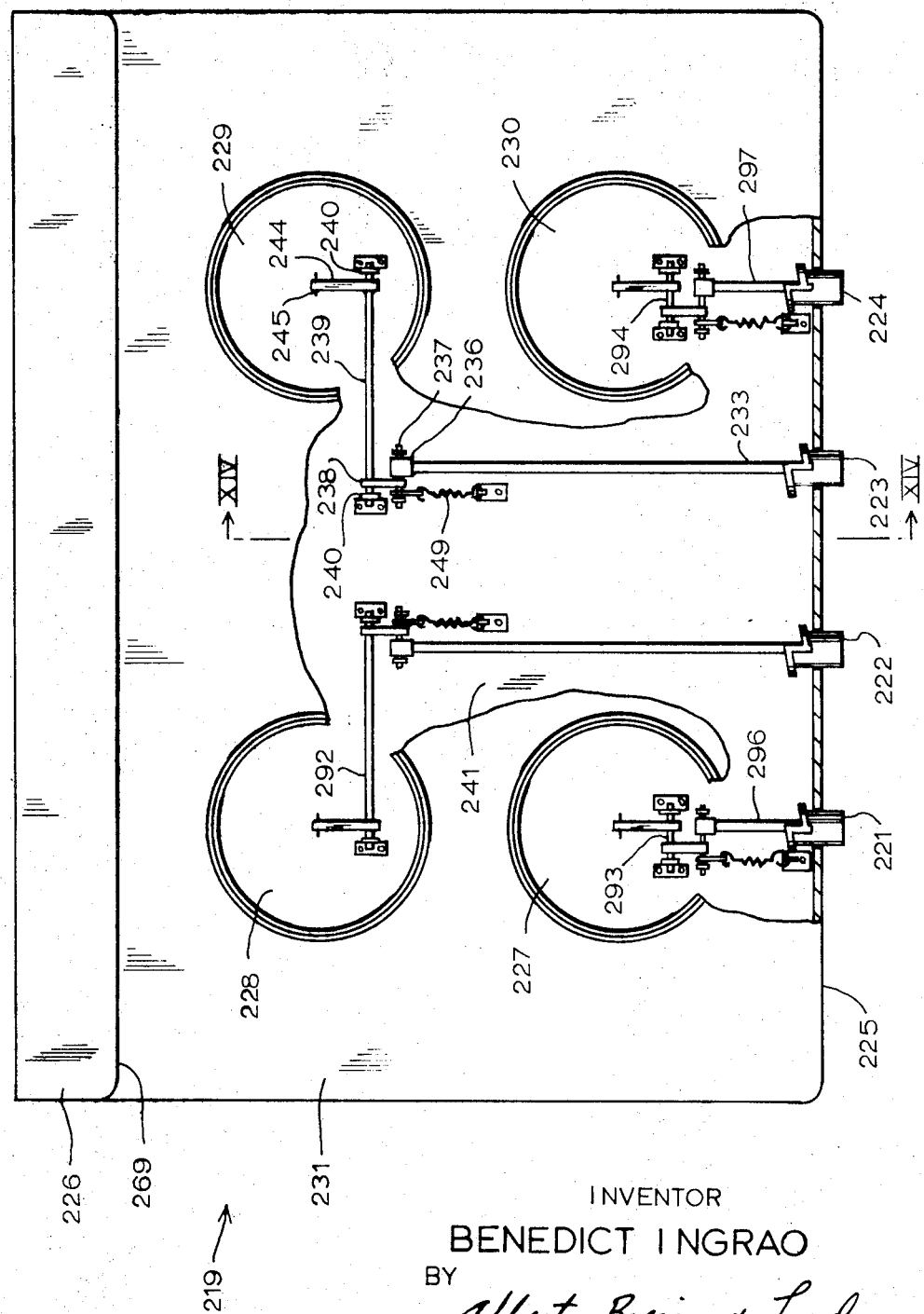
FIG. 13 is a diagrammatic view similar to FIG. 8 but illustrating a modified arrangement wherein controls are located on the front part of a stove.

FIG. 13 shows a top view of an electric stove 219 having control knobs 221, 222, 223 and 224 mounted on a front panel 225 thereof. It should be noted that the control knobs 221—224 could be located at other positions on the stove 219, for example on the side or top portions of a rear panel 226 thereon. The heating elements of stove 219 may be controlled in essentially the same manner as shown in FIG. 1 in regard to the heating elements 6 thereof. Four openings 227—230 in a cook top or top plate 231 of stove 219 normally accommodate the heating elements of stove 219.

As shown in FIG. 14, control knob 223, for example, has a face cam 232 thereon contacting a buffer block 232A which is connected to the back side of front panel 225 of stove 219. Control knob 223 is also connected to one end of a horizontal bus bar 233 by means of a setscrew 234 which seats on a flat side 235 in the end of bus bar 233. The opposite end of bus bar 233 is loosely threaded into a turnbuckle 236 which is freely fitted on a horizontal pin 237. The horizontal pin 237 is securely fitted into a hole on the upper end of a vertical lever 238, which is securely welded to one end of the horizontal axial shaft 239 at right angles to vertical lever 238. Two flanged brackets 240, one at each end of the horizontal axial shaft 239 are secured to a structural pan 241 by means of screws 242 which traverse holes in flanges 243. A horizontal lever 244 is welded to axial shaft 239, the free end of the lever 244 is connected through a link 245 to the bottom end of the shaft 12 which supports the heating element.

When control knob 223 is turned, the bus bar 233 turns in turnbuckle 236, which serves as an axial bearing for the threaded end of bus bar 233 and also as a means to adjust the length of the bus bar 233. Control knob 223 is normally turned only one revolution for its maximum degree of operation, and accordingly bus bar 233 will only lose or gain one threaded portion in the turnbuckle 236. As control knob 223 is turned clockwise, the face cam 232 acts against buffer block 232A and causes bus bar 233 to advance, which causes levers 238 and 244 to rotate counterclockwise in the supporting flange brackets 240 and lower the vertical shaft 12 which in turn lowers the heating elements 6.

An adjustment screw 248 is located below horizontal lever 244 to adjust the depth to which the heating elements 6 may be lowered. A return spring 249 automatically returns the heating elements 6 to its normal "up" position, where it is slightly above the top level of the pot support. Spring 249 is designed to allow a few ounces of pressure from a pot placed on the heating elements 6 to lower the heating elements 6 to the level of the top of the pot support. An apertured guide flange 250 can be used to align control knob 223 in the front panel 225 of stove 219.

FIG. 15 and FIG. 16 show control means similar to the control means of FIG. 14, with slight variations, mainly in the location of the knobs and in the connecting linkages. FIG. 15 shows a control knob 226A mounted vertically on top of the rear panel 226 of the stove 219, having a buffer block 251, a vertical bus bar 251A secured to control knob 226A, a turnbuckle 251B loosely threaded on the lower end of the bus bar 251A, a pair of levers 252 and 253 mounted at right angles to each other, one at each end of a horizontal axial shaft 254 and secured thereto by welding or other means. Horizontal shaft 254 is loosely fitted in a pair of apertured flanged brackets 255, which are located at each end of the shaft 254. The brackets 255 are firmly secured to the structural pan 241 of stove 219 by means of screws 257 which traverse holes in the bracket flanges.

The turnbuckle 251B is pivotally connected to the free end of the horizontal lever 252 by means of a horizontal dowel pin 258. A second set of right-angled levers 259 and 260, similar to the first-mentioned right-angled levers, is provided having a pair of flanged brackets 261, one at each end of a horizontal axial shaft 262, and secured to the structural pan 241. A second horizontal bus bar 263, having its ends bent at right angles to serve as pins, has one end loosely fitted into a hole in the upper free end of the first vertical lever 253, and the other end loosely fitted into a hole in the upper free end of the second vertical lever 259. The free end of the second horizontal lever 260 is connected to the bottom of the vertical shaft 12, which supports the heating element 6.

A return spring 266 is provided to automatically return the heating element 6 to its normal "up" position and also to return the control knob 226A to its normal "out" position. An apertured flange bracket 265 can be provided to help align the vertical bus bar 251A and the control knob 226A in their satisfactory vertical positions. The return spring 266 is attached at one end to an end of the horizontal bus bar 263 extending through the second vertical lever 259, and spring 266 is attached at the other end to an extending flange 267 of the structural pan 241.

FIG. 16 shows a control knob 226B mounted horizontally on the front face 269 of the rear panel 226 of the stove 219. The control knob 226B has a short horizontal bus bar 270 secured thereto, which contacts a buffer block 271. A turnbuckle 272 is loosely threaded on the free end of the bus bar 270. A vertical lever 273 is attached at one end to the turnbuckle 272 and is fulcrumed at its midportion 274. A flanged bracket 275 serves as a fulcrum point, and is secured to a back panel 276 of stove 219 by welding or other means. A horizontal fulcrum pin 277 is provided which is welded to the free end of the flanged bracket 275 and traverses the midportion 274 of the vertical lever 273. The top free end 278 of the vertical lever 273 is bent horizontally in the same direction as the fulcrum pin 277, and is attached to the turnbuckle 272. The bottom end 279 of the vertical lever 273 is also bent horizontally, in the same direction as the fulcrum pin 277, and is attached to a hole 280 in one end of a second horizontal bus bar 281. The opposite end 282 of the second horizontal bus bar 281 is bent at a horizontal right angle, and is attached to a top end of a vertical lever 283, which is attached to a second horizontal lever 284 as described above in regard to the right angle levers 259 and 260. The free end of the horizontal lever 284 is connected through a link 285 to the lower end of the heating element support shaft 12. A return spring 286 is also provided to serve as did the return spring 266 of FIG. 15.

It is understood that FIGS. 13, 14, 15 and 16 are intended to show only a few of the possible types of control linkages, and these control linkages can be used with any of the various types of control systems, shown in this invention.

In operation of the control linkage shown in FIG. 15, when the control knob 226A is advanced downwardly by turning or by pressing, the vertical bus bar 251A is also advanced downwardly which causes the first set of right-angled levers 252 and 253 to rotate proportionately in a clockwise direction. The horizontal second bus bar 263 is advanced horizontally to the right which causes the second set of right-angled levers 259 and 260 to rotate also clockwise in the same proportion as the first set of right-angled levers 252 and 253. The free end of the horizontal lever 260 in the second set of right-angled levers then lowers the vertical shaft 12 and its corresponding heating element 6.

In operation of the control linkage of FIG. 16, when the control knob 226B is advanced inwardly by turning or by pressing, the short horizontal bus bar 270 is also advanced proportionately. This causes the fulcrumed lever 273 to angle backward at the top and advance forward at the bottom, which in turn causes the horizontal second bus bar 281 to advance horizontally to the right and to rotate clockwise the right-angled levers 283 and 284 proportionately, causing the heating element 6 to be lowered by the vertical shaft 12.

FIG. 17 shows another view of the face cam-type control knob used in this invention. A face cam 287 extends radially from the central axis of the control knob 287A and outwardly from the sides 287B thereon. The face cam 287 describes one complete spiral loop around the body of the control knob 287A. A stop 288, located at the end of the spiral loop on face cam 287, abuts against a buffer block 289 to prevent the control knob from being turned too far and from causing the control knob to seat back to its starting point unintentionally.

The control knob 287A has a central axial bore 290 for receiving a bus bar 290A, and a threaded bore 291 at right angles to the central bore 290 to receive a setscrew 291A which serves to securely hold the bus bar 290A in said central bore 290. It should be mentioned here that the face cam 287 can be separate from the control knob 287A and can be mounted at any position along the controlling bus bar to which the control knob 287A is attached, and a buffer block can also be suitably provided to cooperate with the separate face cam.

As seen in FIG. 13, control knobs 221 and 224 are directly in front of their respective heating elements. Control knobs 222 and 223 are set to one side of their respective heating elements, and mechanical connection is made through elongated axial shafts 292 and 293 respectively, to which the right-angled levers 238 and 244 are connected as shown in FIG. 14. Control knobs 221 and 224 have short axial shafts 293 and 294 and short bus bars 296 and 297 making it possible to place the location of said control knobs 221 and 224 directly in front of their respective heating elements. In all other respects, control knobs 221, 222 and 224 and their respective heating elements positioned in openings 227, 228 and 230 function in an identical manner to the control knob 223 and its heating element positioned in opening 229. It should also be mentioned that although the stoves shown in this invention comprise four heating elements provided with means to lower or adjust the vertical height thereof, an electric stove can be provided having only one or more of its heating elements provided with the control means as shown in this invention.

Figure 18:
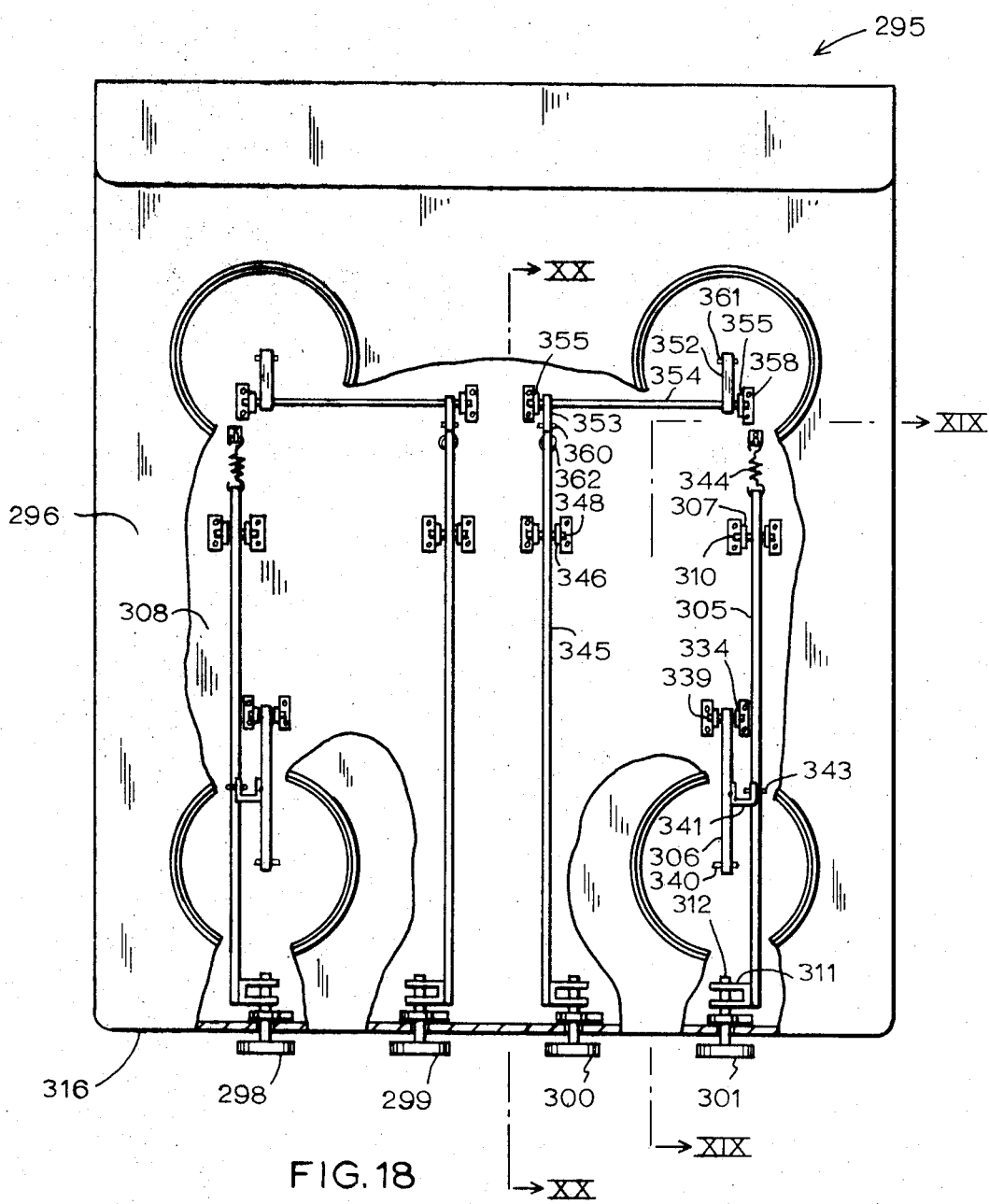
FIG. 18 is another diagrammatic view similar to FIG. 8, but showing another modified arrangement wherein controls are located at the front part of a stove.

FIG. 18 shows a stove 295 having an optional set of mechanical control levers operated by the control knobs 298, 299, 300 and 301. The stove 295 is shown having four heating elements provided with a control means of this invention, although fewer of the heating elements may be so provided.

The heating elements are not shown and the top panel 296 of the stove 295 is shown in cutaway view. FIG. 19 shows a side view of the control system controlled by knob 301 in FIG. 18. In this control system the control knob 301 is pressed downwardly to lower the heating element which is connected to the vertical shaft 12. Upon lowering of the vertical shaft 12, a tab on the heating element support may be engaged with a locking member 21, operable as above-described.

In this system it is desired that the distance travelled downwardly by the vertical shaft 12 will be substantially equal to the distance travelled downwardly by the control knob 301. It is also desired that the control knob 301 will travel downwardly in a substantially straight line, not describing an arc in so doing.

In order to accomplish these two desired functions, a set of two control levers 305 and 306 are provided. The long control lever 305 extends well back in the stove 295 and is fulcrummed and supported at its rearward end by means of two flanged brackets 307 which are secured to the structural pan 308 by means of screws 309 which traverse holes in the bottom flanges of the brackets 307. A dowel pin 310 traverses a hole in the top end of each of the brackets 307, and also the end portion of the control lever 305 which is fulcrummed between said brackets 307. A U-shaped bracket 311 is welded horizontally to the front end of the control lever 305, as shown in top view in FIG. 21. A control knob shaft 312 is freely fitted in a horizontal position in two holes of the U-shaped bracket 311, and the shaft 312 is prevented from excessive end play by means of snap rings 313 and 314 which fit into circumferential grooves on the shaft 312. The shaft 312 fits into the control knob 301, and an edge cam 315 is placed on the shaft 312 just inside a front panel 316 of the stove 295, control knob 301 being placed on the outside of the front panel 316. The cam 315 and the control knob 301 are held in spaced relation to each other by means of a spacer bushing 317 located between them. Both the cam 315 and the control knob 301 are secured to the control shaft 312 by means of setscrews 318 and 319 respectively, which seat against a flat side 320 of the control shaft 312. An L-shaped buffer strip 321 is affixed to a front panel 316 in such a manner that the edge cam 315 may cooperate with it. The horizontal midportion of the L-shaped buffer strip 321 serves as a buffer block, and an adjustment screw 323 is located on the free end of the strip 321 to serve as an "upper" travel limit means for the control knob 301. A "lower" travel limit means is also provided for the control knob 301, in the form of an adjustment screw 324. This adjustment screw 324 is threaded into a flanged bracket 325, which is secured to some stationary object, such as the structural pan 308, by means of screws 326. Both the upper setscrew 323 and the lower setscrew 324 are locked in position by means of locknuts 327 and 328 respectively. In operation, the control shaft 312 abuts against the setscrews, which are positioned opposite each other, at the respective ends of its journey.

An opening 329 in the stove panel 316 which is traversed by the control shaft 312 and the spacer 317 is preferably in the form of a vertical slot. The upper edge of the slot 329 can optionally serve as an "upper" limit and the lower edge of the vertical slot 329 can optionally serve as a "lower" limit for the control knob 301. The sides of the vertical slot 329 also serve to prevent side-to-side play of the control knob 301 and the control lever 305. The control knob 301 is a circular disc in shape and has a threaded bore 331 in its edge to receive the setscrew 319.

FIG. 23 shows a front face of the edge cam 315, having a threaded bore 332 in its edge to receive the setscrew 318. The cam 315 also has a travel "stop" 333 at its highest point to prevent the cam 315 from being turned too far past its useful point, which would cause it to seat back to its starting point.

As shown in FIG. 19, a short follower lever 306 is pivotally supported at one end by means of a pair of flanged brackets 334, which are secured to the structural pan 308 by means of screws 336. A pin 339 traverses the end of the follower lever 306 and the top part of the support brackets 334. The free end of the follower lever 306 is connected to the bottom of the vertical shaft 12, which supports the heating element, by means of a U-shaped link 340 which traverses holes in said free end of the follower lever 306 and the bottom of the shaft 12. A U-shaped bracket 341 is welded to the midportion of the follower lever 306 as shown by the top view in FIG. 22. The free end 342 of the U-shaped bracket 341 is substantially directly above the control lever 305 and is in a parallel line to it. A hole in the free end 342 of the U-shaped bracket 341 receives one end of a U-shaped link 343. The other end of the U-shaped link 343 traverses a hole in the midportion of the longer control lever 305.

It has been explained that both rear portions of the horizontal levers 305 and 306 are fulcrummed individually, and that both midsections are connected together by means of a U-shaped link 343. It can be seen that when the control knob 301 of the longer control lever 305 is moved downwardly, for example, 1 inch, a midportion of said lever 305 will move downwardly only one-half inch. The connecting U-shaped link 343 will proportionately move the midportion of the shorter follower lever 306 also one-half inch, and consequently the working end of the shorter lever 306, which connects to the bottom of the shaft 12, will move 1 inch causing the heating element to move downwardly in direct proportion to the control knob 301.

If, due to the shortage of available space in the stove, it is not possible to connect the levers 305 and 306 in their exact midportions by the U-shaped links 343, the length of the levers 305 and 306 and the relative positions thereof to each other and the location of the U-shaped links 343 with the U-shaped bracket 341 are changed in such a way as to insure that a direct proportion of travel between the vertical shaft 12 and the control knob 301 are maintained. Of course, it may be desired to use a different ratio of travel between the control knob 301 and the shaft 12. In this case, the levers 305 and 306 could be arranged differently with respect to each other, and the connecting U-shaped links 343 and the U-shaped bracket 341 could be connected at any suitable point along the intermediate portion of the levers 305 and 306.

A return spring 344 is connected between a hook 344A fastened to the structural pan 308, and the end of the longer control lever 305, which at this point extends beyond the fulcrummed brackets 307. Return spring 344 serves to maintain control knob 301 and vertical shaft 12 in the normal "up" position.

The control knob 298 and the control means associated with this control knob are operated in a manner similar to the manner of operation of control knob 301 and its associated control means. The control knobs 299 and 300, and their associated control means, are arranged somewhat differently from control knobs 298 and 301, and their associated control means. FIG. 20 gives a horizontal cross-sectional view of the control knob 300 and its associated control means.

Control knob 300 is connected to a long horizontal control lever 345, along with a cam 345A, a buffer strip 345B, "upper" and "lower" travel limit screws 345C and 345D, respectively, and a vertical slot 345E in the front panel 316 of the stove 295 in the same manner that control knob 301 is connected to its horizontal lever 305, along with cam 315, travel limit means 323 and 324, and vertical slot 329. The control lever 345 is approximately the same length or slightly longer than the control lever 305, and is fulcrummed at the same length so that control knob 300 will describe the same degree of arc as control knob 301 when it is moved up or down. The long control lever 345 is suitably fulcrummed by means of a pair of flanged brackets 346 which are placed one on each side of the control lever 345 and near one end thereof. A pin 348 traverses a hole in the top end of each of the flanged brackets 346 and also the control lever 345 at its back end, serving as a pivot point for lever 345. The flanged brackets 346 are secured to the structural pan 308 by means of screws 349 which traverse holes in the bracket flanges 350. The end of control lever 345, beyond the fulcrum 348, is connected to one end of a set of two levers 352 and 353 which are welded in opposite directions from each other on a horizontal axial shaft 354. The axial shaft 354 is pivotally supported by two flanged brackets 355, one on each end of said shaft 354, and secured to the structural pan 308 by means of screws 357 which traverse holes in the bracket flanges 358. Control lever 345 is connected to one end of the oppositely facing lever 353 by means of a U-shaped link 360. The free end of lever 352 receives one end of a U-shaped link 361, the other end of which is connected to a vertical shaft 12, which is the support for a heating element.

As can be seen from FIG. 20, when the control know 300 is pressed downward the opposite end of control lever 345, which is beyond the fulcrum pin 348, moves upward. This upward motion causes one end of lever 353 to rise, causing the opposite end of lever 352 to move downward because of the pivotal action of the axial shaft 354. The downward motion of lever 352 forces the vertical shaft 12, and its corresponding heating element, downward. Suitable lengths of the levers 345, 352, and 353 and suitable positions of the fulcrum points 348 and 354 can be employed to cause vertical shaft 12, and its corresponding heating element, to be moved in the desired relation to the movement of control knob 300.

A return spring 362 is provided between the structural pan 308 and an end of the long control lever 345. Control knob 299, and its corresponding control means, are operated in the same manner as control knob 300 and its corresponding control means.

FIGS. 24, 25, 26 and 27 show alternative means for supporting and guiding a vertical shaft which supports a heating element of an electric stove. This optional support and guide means can be used in place of the square guide 15 which is shown in FIG. 2.

Figure 24:
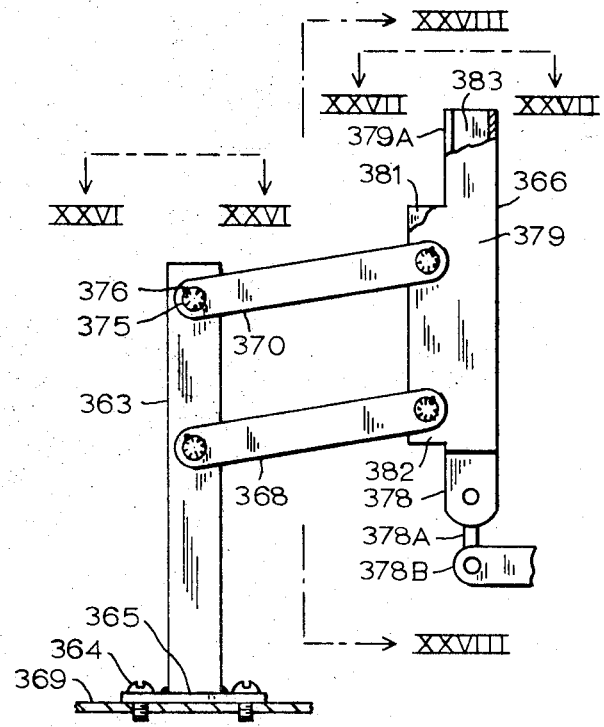
FIG. 24 is a side elevational view of a modified form of heating element support mechanism.
Figure 25:
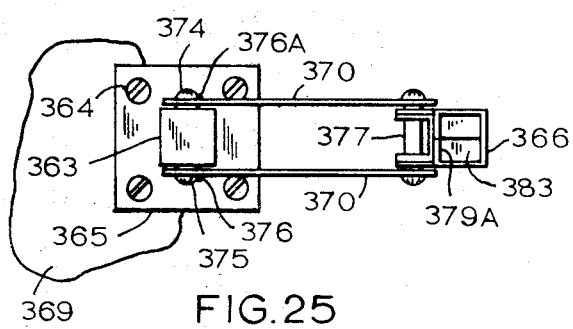
FIG. 25 is a top plan view of the mechanism shown in FIG. 24.
Figure 26:
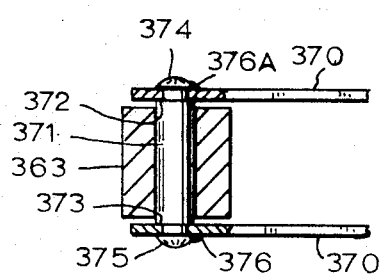
FIG. 26 is a sectional view taken substantially along line XXVI–XXVI of FIG. 24.

FIG. 24 shows a side elevation of a parallel bar type of support and guide means, in which a vertical square post 363 is secured to a structural pan 369 by means of screws 364 which traverse holes in a plate 365 welded on the bottom of the post 363. A vertically movable square shaft 366 is connected to the square post 363 by means of two pairs of horizontal parallel bars 368 and 370 in such a way as to be in vertical alignment with and parallel to the square post 363. The pair of parallel bars 370 is pivotably secured to the top end of the vertical square post 363 by means of a horizontal pin 371, as shown in FIGS. 25 and 26, having shoulders 372 and 373 to receive the parallel bars 370. The pin 371 has ends 374 and 375 flattened against the parallel bars 370, and spot welds 376 and 376A may be provided to secure the connection between the pin 371 and the parallel bars 370. A second shouldered pin 377 pivotably secures the opposite ends of parallel bars 370 to an upper portion of the vertical square shaft 366. The other pair of parallel bars 368 are loosely connected to lower portions of the vertical square post 363 and the vertical square shaft 366 in the same manner as described above. Parallel bars 370 and parallel bars 368 are also connected parallel to each other.

Figure 27:
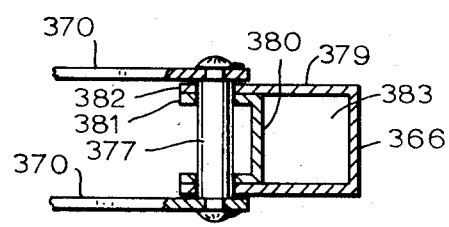
FIG. 27 is a sectional view taken substantially along line XXVII–XXVII of FIG. 24.

A bottom flange 378 of the vertical square shaft 366 is connected through a connecting link 378A to an end of a control lever 378B, like the control lever 284 shown in FIG. 16 and by control lever 64 in FIG. 2, as an example. As shown in FIGS. 25 and 27, the vertical square shaft 366 has an outer three-sided shell 379 and an inner three-sided shell 380 with side ends 381 located adjacent side ends 382 of shell 379. The arrangement of the two shells provide a hollow channel 383 in the vertical square shaft 366, which could be used to house devices such as shafts, controls, or indicators or the like. Pins 371 and 377 are firmly secured to parallel bars 370 by welding or other means to prevent the bars from twisting, but pins 371 and 377 are loosely fitted in the holes of vertical square post 363 and vertically movable square shaft 366 so that up or down movement of the square shaft 366 is possible. The side ends 379A of vertical square shaft 366 are brought together at the upper end of shaft 366 to form a four-sided closed square shaft at this upper end.

With the arrangement shown in FIGS. 24, 25, 26 and 27 the vertical square shaft 366 is capable of up or down movement, but it cannot be twisted out of its vertical alignment, and parallel bars 368 are always parallel to parallel bars 370.

Figures 28, 29:
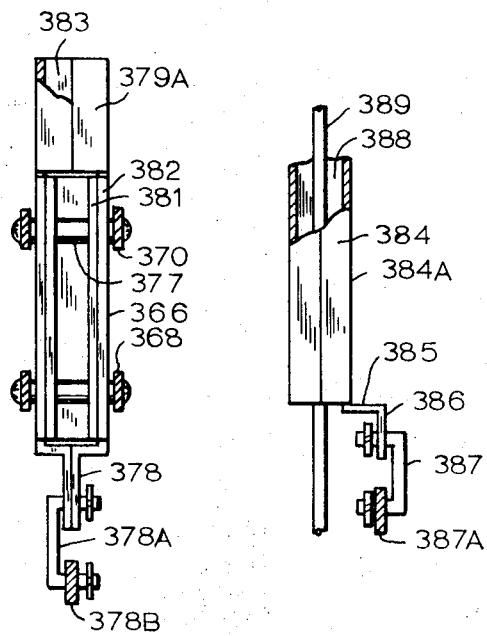
FIG. 28 is a sectional view taken substantially along line XXVIII–XXVIII of FIG. 24.
FIG. 29 is a view similar to FIG. 28 but showing a modified arrangement.

FIG. 28 shows another view of the vertical square shaft 366, taken along the line XXVIII—XXVIII of FIG. 24. The two opposite sides of square shaft 366 are formed together at the bottom of shaft 366 to form the extension flange 378 thereof, which receives an end of the U-shaped link 378A, the other end of which is connected to the control lever 378B.

FIG. 29 shows a portion of an optional type vertical square shaft 384, which is similar to the shaft 366 except that the bottom extension is offset from the central axis of the shaft 384. Only one side 384A of the vertical square shaft 384 extends down to form an offset flange 386 through member 385 to receive a U-shaped connecting link 387 which is connected to a control lever 387A. With this arrangement a hollow chamber 388 in the vertical square shaft 384 may be used to house an accessory means, such as the vertical rod or tube 389, which may extend downward from the bottom of the shaft 384 without obstructing the U-shaped link 387, or the control lever 387A. Referring again to FIG. 4, a cutout portion 17A of the sidewall 17 permits entry of the heating element ends 19. The edge of opening 390 in sidewall 17 is bent outwardly to form flanges 392, which loosely engage the edge 393 of a cutout portion of the rim 174, to prevent the pot support 7 from revolving. The collar or ring 7A, as before mentioned, is prevented from revolving in its seat by means of the pointed index means 173 which engage holes in the vertical sidewall 17 of the pot support 7.

In accordance with this invention, heat sensing units are provided which automatically regulate the amount of time an electrical current is delivered to a heating element or which control the relative vertical position of a heating element and a pot support.

FIG. 30 illustrates a heat sensing unit 394 which is usable either to control electrical energization of a heating element or to control the relative vertical position of a heating element and a pot support.

The heat sensing unit 394 employs a spirally wound bimetal thermostatic spring 396 which is suitably mounted in a watertight housing 397. The housing 397 is an inverted metal cup in shape having a flat top surface 398 for good surface-to-surface contact with the bottom of a cook pot, and a circular vertical sidewall 399 which extends downward. A vertical housing or tube 400 has its upper end 401 flared outward to seat in a lower opening of the housing 397, and a lower edge 402 of the circular sidewall 399 of housing 397 is crimped securely over the outwardly flared end 401 of the vertical tube 400, and is preferably welded thereto so that housing 397 and vertical tube 400 become as one unit. The outer end 403 of the spiral thermostatic spring 396 is secured to the inside surface 404 of the vertical sidewall 399. The inner end 405 of the spiral thermostatic spring 396 is secured by welding or other means to a top end 408 of the vertical control rod 406, which passes loosely through a central bore 407 of the vertical tube 400 and out through a bottom end 409 thereof. A bottom side 410 of the top surface 398 serves as an upper bearing surface for an extreme top end 411 of the vertical control rod 406, to assist in free movement of the thermostatic spring 396 and to prevent undue axial torsion thereon. An external thread 412 on the bottom end 409 of vertical tube 400 has a sleeve 413 threaded thereon, and two vertical splines 414 and 415 extend on either side of the outside surface of sleeve 413. A locknut 416 secures sleeve 413 on the bottom end of vertical tube 400. The vertical control rod 406 has its extended lower end flattened to serve as an index means or spline 417.

The heating sensing unit 394 is loosely housed in a hollow space 418 of a vertically movable square shaft 419, which has a downwardly extending flange 419A which is offset, as in FIG. 29 by 386, to permit the extension of the bottom end of heat-sensing unit 394. The vertically movable square shaft 419 is similar to the square shaft 12 of FIG. 2, but is modified to accommodate the heat-sensing unit 394. It is wider than square shaft 12, and an internally threaded nut 420 is securely fixed in the hollow space 418 of shaft 419. In addition, the square shaft 419 has a peripheral ridge 421 secured to the upper outside periphery of square shaft 419, which serves as a seat for a drip collar 422 having a square center hole 422A so as to fit closely to the sidewall of the square shaft 419 to prevent drippings or spilled liquids from seeping between the sidewall and the collar 422. A central support member 423 having an inwardly extending flange 424 and attached crossbars 425 and 426 to support a heating element 426A is positioned above the drip collar 422. A special nut 427 holds the drip collar 422 and the central member 423 in position, and central support member 423 is prevented from rotating around square shaft 419 by its square center hole 423A. The nut 427 has an upper wide central bore 428 which loosely houses the heat-sensing unit housing 397, and a lower narrow central bore 429 externally threaded to engage with the internal thread of an internally located nut 420. When special nut 427 is securely threaded in position an outwardly flanged portion 430 of nut 427 rests on a top edge 431 of the vertical shaft 419. A downwardly extending ridge 432 of the circular sidewall of nut 427 extends downwardly beyond the flanged portion 430 to serve as spacer means, forming a small space 432A between the bottom end of spacer means 432 and the top surface of center flange 424 on the central support member 423, to enable heating element 426A to align itself with the bottom of a cook pot or other object to be heated, thereby forming a good surface to surface contact between the heating element 426A and the cook pot bottom.

Ridges 433 are located on the top edge of nut 427 to provide an irregular surface for engagement with one's fingers to facilitate the removal of nut 427 during the cleaning of the stove without the necessity of using tools.

A bottom support spring 434 supports the heat-sensing unit 394 in the vertically movable square shaft 419, while the heat-sensing unit 394 is held in vertical alignment by the smaller central bore 429 of the nut 427, central bore 429 housing the upper end of vertical tube 400 of heat-sensing unit 394. The bottom end of heat-sensing unit 394 loosely engages a pair of inverted U-shaped brackets 435 and 436, as shown in the top cutaway cross-sectional view of FIG. 31, taken along the lines XXXI—XXXI of FIG. 30.

Referring to both FIGS. 30 and 31, the upper bracket 435 and the lower bracket 436 each have horizontally outward extending flanges 437 and 438 positioned adjacent one another and secured to a structural pan 439 by means of mounting screws 440. The upper bracket 435 has a center hole 441 having two index notches 442, one on each side of said hole 441. The splined sleeve 413 of the heat-sensing unit 394 is loosely fitted into the hole 441 and is free to move up or down therein. The splines 414 and 415 on sleeve 413 fit into the index notches 442 on opposite sides of the hole 441 to prevent rotation of the heat-sensing unit 394. An upwardly extending lip 444 around each side of the hole 441 serves to guide the splined sleeve 413 into engagement with the hole 441. The size of lip 444 diminishes to zero at the edges of the index notches 442.

A center hole 445 in the lower bracket 436 is positioned in vertical axial alignment with the center hole 441 of upper bracket 435. A small funnel-shaped member 446 is loosely fitted in the center hole 445 to serve as a guide for the spline 417 on the lower end of the vertical control rod 406 of heat-sensing unit 394. The edge of the hole 445 in lower bracket 436 fits into a shoulder 448 at the lower end of the funnel-shaped member 446 to secure member 446 to the lower bracket 436 while allowing it to rotate freely within the hole 445. The center hole of funnel-shaped member 446 is shaped in the form of an elongated slot 449, to serve as a keyway for the spline 417 of vertical control rod 406. An arm 450 extends outward from the upper portion of the funnel-shaped member 446, having a hole 451 in the extreme end thereof which receives one end of a connecting link 452, the other end of which may be connected to a control assembly not shown in FIG. 30.

In operation, the heat-sensing unit 394 is normally held in an "up" position by means of the support spring 434 which is secured beneath the bracket 436 to the structural pan 439 by means of screws 453. When a pot is placed on the stove of this invention, the bottom of the pot presses down on the top of heat-sensing unit 394, causing the top of unit 394 to drop to the level of the top of a port support 453A. At the same time, the heating element 426A is also lowered to this level through the weight of the pot. Both the heating element 426A and the heat-sensing unit 394 will exert a slight upward pressure on the pot while it is resting on the stove. As heating element 426A delivers heat to the bottom of the pot, heat-sensing unit 394 senses the temperature of the pot. It should be noted that if a plate type pot support 185 is used, as shown in FIGS. 9 and 10, a hole 195 is provided in the center of the pot support 185 to permit heat sensing 394 to protrude upwardly therefrom. The control units for use with the heat-sensing unit 394 are shown in FIGS. 32—34.

Figure 32:
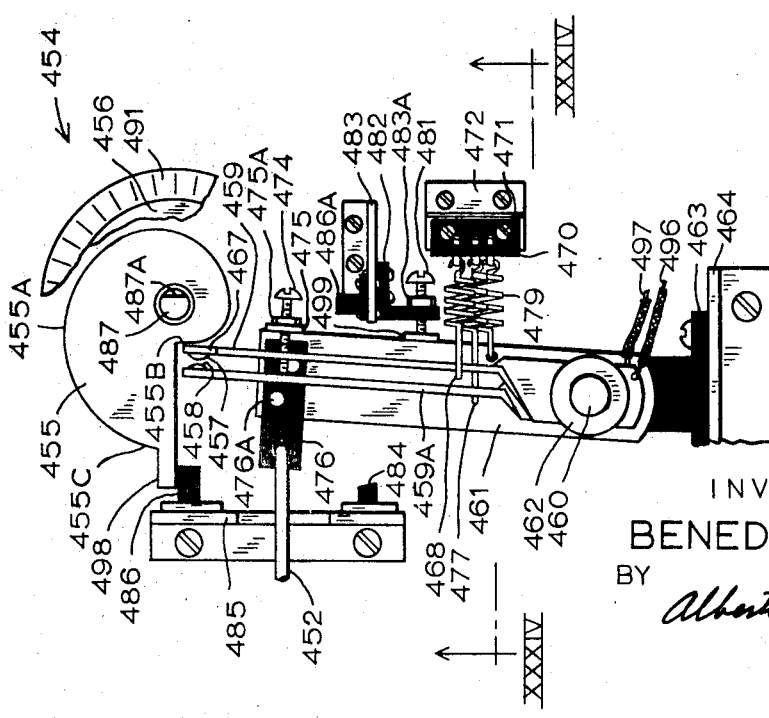
FIG. 32 is a sectional view constituting a top plan view of a control mechanism usable with the mechanism shown in FIG. 30.

FIG. 32 shows a top view of a control unit 454 to which is connected one end of the connecting link 452, the other end of which may be connected to the heat-sensing unit 394 as shown in FIGS. 30 and 31. FIG. 33 is a side view of the control assembly 454 shown in FIG. 32, and FIG. 34 is an end view thereof.

Figure 33:
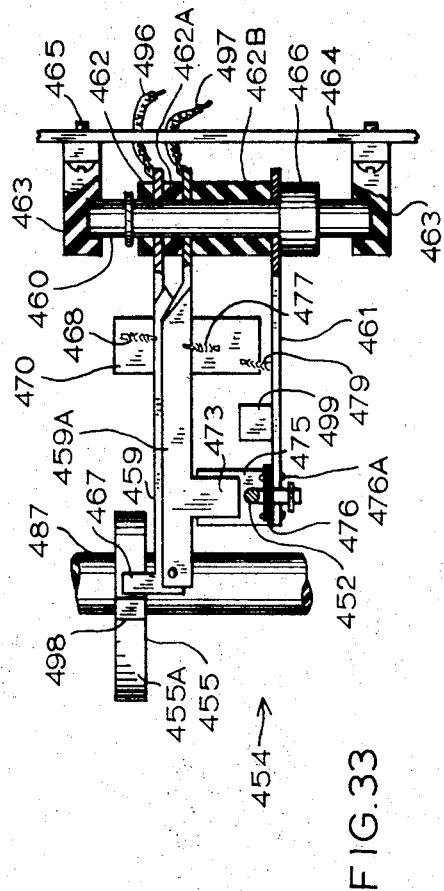
FIG. 33 is a side elevational view, partly in section, of the mechanism shown in FIG. 32.
Figure 34:
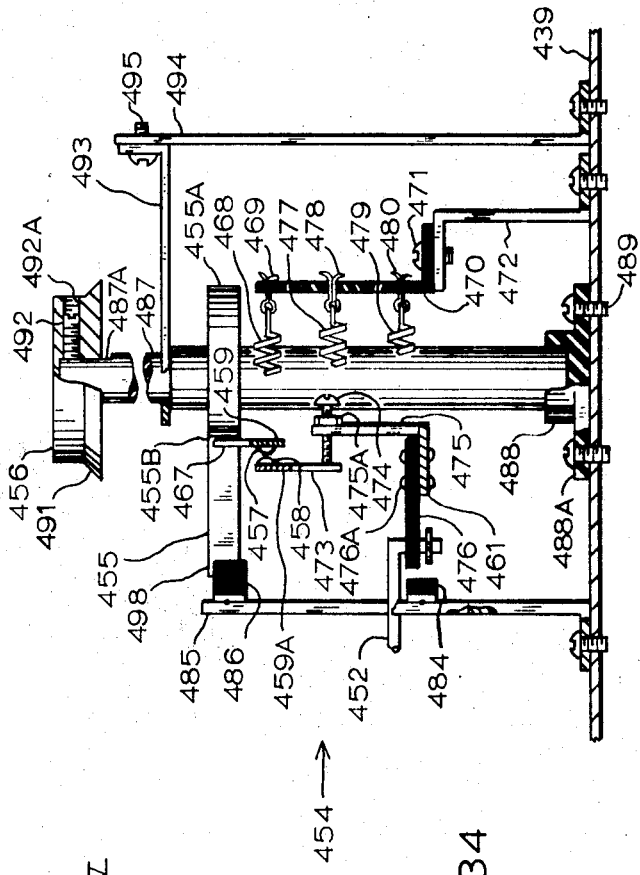
FIG. 34 is a sectional view taken substantially along line XXXIV–XXXIV of FIG. 32.

The heat control unit 454 of FIGS. 32—34 serves to control the heating element 426A, to which it is attached, to regulate the temperature of a pot placed on the heating element 426A. An edge cam 455 having an outwardly sloping edge 455A with a smallest edge point 455B and a largest edge point 455C is connected to a graduated control knob 456, and contacts an electrical contact point 457 to push contact point 457 against a second contact point 458 to complete an electrical circuit which supplies an electrical current to the heating element 426A. When the desired temperature set by control knob 456 has been reached in the pot on heating element 426A, the sensing unit 394 causes the connecting link 452 to pull contact point 458 away from contact point 457, thereby cutting off the electrical current to the heating element 426A. As the temperature in the pot on heating element 426A begins to fall after the current has been cut off, sensing unit 394 causes connecting link 452 to push the control plate 461 to the right, as viewed in FIG. 32, allowing the contact point 458 to return to press against contact point 457 to again complete the electrical circuit to heating element 426A. This process is repeated to keep the temperature of the pot on heating element 426A at the approximate temperature set on control knob 456. The contact points 457 and 458 of heat control unit 454 are each connected to an end of contact point members 459 and 459A, respectively, the other ends of which are pivotally connected to a vertical pivot shaft 460, which also pivotally holds a control plate 461 thereon. As shown in FIG. 33, the contact point members 459 and 459A and the control plate 461 are held in spaced relation to one another by insulting spacers 462, 462A and 462B on the pivot shaft 460, which also is made of insulating material. The vertical pivot shaft is held in position by a pair of cupped support members 463, which are secured to a stationary wall 464 of the stove by means of mounting screws 465. A large diameter portion 466 of pivot shaft 460 creates a support for the plate 461 and point members 459 and 459A carried by the shaft 460.

The contact point members 459 and 459A are elongated metal strips having contact points of silver or other suitable metal and having their free ends in a vertical position and their pivot ends twisted to a horizontal position. The upper contact point member 459 has an upwardly extending tab 467 at its free end which contacts the edge 455A of edge cam 455, and a spring 468 is attached between a midportion of the member 459 and a spur 469 on an L-shaped flanged insulating bracket 470, which is fastened by mounting screws 471 to a stationary wall or bracket 472 of the stove. The purpose of spring 468 is to maintain upward extending tab 467 pressuredly engaged with the edge 455A of edge cam 455.

The lower contact point member 459A has a tab 473 extending downward from its midportion to be engaged by the threaded end of an adjustment screw 474, which is threaded through an upwardly extending tab 475 of the control plate 461 and locked in place by a locknut 475A. One end of an electrically insulating strip 476 is secured by rivets 476A to control plate 461 and the other end of strip 476 is connected with one end of the connecting link 452 as mentioned earlier. A second spring 477 is connected between the midpoint of the lower contact point member 459A and a second spur 478 on the insulating bracket 470. The second spring 477 normally pulls the lower contact point member 459A toward the upper contact point member 459A toward the upper contact point member 459 to bring the contact point 458 into contact with contact point 457.

A third spring 479 is connected between a midportion of the control plate 461 and a third spur 480 on the insulating bracket 470 to pull the control plate 461, normally, against the threaded end of a travel limit adjustment screw 481, as shown in FIG. 32, except when it is pulled away therefrom by the action of the heat sensing unit 394 and the connecting link 452. Adjustment screw 481 is threadedly connected to an L-shaped electrical insulating flange 482, which is fastened to a stationary wall portion 483, not shown in FIG. 34, and screw 481 is locked in position by a locknut 483A.

A travel limit block 484 is fastened to another stationary wall portion 485 of the stove to limit the movement of control plate 461, and a pair of travel limit blocks 486 and 486A are fastened to the stationary wall portions 485 and 483 respectively, to limit the rotational movement of the edge cam 455. The control knob 456 and the edge cam 455 are both axially connected to a vertical control shaft 487, which rests in a cupped bracket 488 having an outwardly extending flange 488A securely fastened by mounting screws 489 to the structural pan or horizontal support wall 439. Control knob 456 has an outwardly and slightly downwardly extending bottom flange 491 having temperature settings marked thereon, and knob 456 is mounted axially on the top of vertical control shaft 487 and held in place by means of a setscrew 492 in a threaded hole 492A in control knob 456, which screw 492 presses against a flat portion 487A on the control shaft 487. The shaft 487 is shown sectioned near its top end in FIG. 34, and is held in place by a surrounding bracket 493 which is fastened to a vertical stationary wall 494 by mounting screws 495. The cam 455 and the shaft 587 are made of electrical insulating material and are preferably made integral with each other.

In operation of the heat control unit 454, when control knob 456 is in its normal "off" position, edge cam 455 is positioned so that the tab 467 of contact point member 459 is pulled by spring 468 against edge 455A of edge cam 455 at its smallest point 455B. With contact point member 459 in this position, contact point member 459A is restrained by adjustment screw 474 on control plate 461, which in turn is restrained by the travel limit adjustment screw 481 on the support wall 483, in such a manner as to prevent the contact point 458 from touching the contact point 457. Contact point 457 is connected through contact point member 459 and a wire 496 to a source of electric current, not shown, and contact point 458 is connected through contact point member 459A and a wire 497 to the heating element 426A, also not shown. When contact points 457 and 458 are separate, the electrical circuit to the heating element 426A is open, and the heating element 426A does not receive electrical current. This "off" position of the control unit 454 is shown in the FIGS. 32 through 34.

When the control knob 456 is turned to an "on" position, the edge cam 455 is turned so that the edge 455A thereof pushes contact point member 459 toward contact point member 459A to cause contact point 457 to make contact with contact point 458, thereby closing the electrical circuit to the heating element 426A and causing an electrical current to flow thereto. As a result of this current, heating element 426A will supply heat to a pot resting thereon, causing an increase in temperature thereof which will be sensed by the sensing unit 394. As the temperature at the sensing unit 394 increases, the bimetal spring 396 of the sensing unit 394 contracts, (bimetal springs may be made to contract or expand with an increase in temperature), to cause the vertical control rod 406 in the vertical tube 400 to rotate in a counterclockwise direction as viewed from the top. The spline 417 on the lower end of the vertical control rod 406 is engaged in the rectangular slot 449 to cause the funnel-shaped member 446 having the outwardly extending arm 450 to rotate in a counterclockwise direction also, as viewed in FIG. 31 thereby causing the horizontal connecting link 452 to rotate the control plate 461 in a counterclockwise direction about the pivot shaft 460. As the temperature at the heat sensing unit 394 continues to increase, the bimetal spring 396 continues to contract and the connecting link 452 continues to rotate the control plate 461 in a counterclockwise direction until a point is reached wherein the adjustment screw 474 causes the contact point member 459A to separate the contact point 458 from the contact point 457, thereby cutting off the electrical current to the heating element 426A. The point at which contact is broken between contact points 458 and 457 is determined by the position of the contact points 457 and 458 which in turn is determined by the rotational position of the control knob 456. The travel limit block 484 prevents control plate 461 from advancing too far in the counterclockwise direction, while the adjustment screw 481 limits the travel of control plate 461 in a clockwise direction. Adjustment screw 474 controls the position of the contact point member 459A corresponding to a given temperature at the heat-sensing unit 394, to control the temperature at which contact is broken between contact points 458 and 457 corresponding to a given setting of the control knob 456. Adjustment screw 474 also prevents the contact points 458 and 459 from touching one another when they are in an "off" position as viewed in FIG. 32. An extension member 498 of the edge cam 455 abuts against the limit control block 486 to limit the counterclockwise rotational movement of the edge cam 455 and control knob 456, and extension member 498 abuts against the limit control block 486A at a given point in the clockwise rotation of the edge cam 455 to limit the clockwise rotation of edge cam 455 and control knob 456.

It should be noted that the spurs 469, 478 and 480 are arranged on the bracket 470 to prevent their contact with one another and to prevent the contact of springs 468, 477 and 479 with one another. The control plate 461 and the contact point members 459 and 459A, when contact points 457 and 458 are separate, are electrically insulated from one another and from other parts of the control unit 454. This insulated situation serves to insure safe operation of the control unit 454.

When it is necessary to clean any parts of the stove which are located close to the heating element 426A, the heat-sensing unit 394 can be removed by simply pulling it out, since there are not holding means provided between the bottom ends of the heat-sensing unit 394 and the cooperating brackets 435 and 436 with their associated parts. When the heat-sensing unit 394 is pulled out of engagement with brackets 435 and 436 and their associated parts, the funnel-shaped member 446 with the integral arm 450 automatically rotates clockwise because of the action of the return spring 479 on the control plate 461. The rotation of funnel-shaped member 446 and control plate 461 stops when the tab 499 on control plate 461 contacts the threaded end of the adjustment screw 481. Adjustment screw 481 is adjusted to stop the rotation of control plate 461 and the funnel-shaped member 446 when the elongated slot 449 thereon aligns with the notches 442 in the center hole 441 of the upper bracket 435. With the heat-sensing unit 394 removed, the splines 414 and 415 on the splined sleeve 413 on the vertical tube 400 align with the spline 417 on the bottom end of vertical control rod 406. The heat-sensing unit 394 can thereby be reinstalled by simply inserting the unit 394 into the well or hollow space 418 of the vertical square shaft 419 until the bottom end of heat-sensing unit 394 bottoms out on the bracket members 435 and 436 and their associated parts. A slight rotation of the heat-sensing unit 394 then causes the spline 417 to align itself with the slotted means 442, and 449 and drop down therein. If the spiral bimetal spring 396 has changed its calibration during removal of the heat-sensing unit 394, or at any other time, such as due to aging, the splined sleeve 413 on the bottom of vertical tube 400 will not align with the spline 417 on the lower end of the vertical control rod 406. In this case, the lock nut 416 is loosened and the splined sleeve 413 is rotated on its thread until the splines 414 and 415 align with the spline 417 on the end of the vertical control rod 406. Lock nut 416 is then retightened. The spline 417 on the bottom of the vertical control rod 406 seats into the elongated slot 449 in the funnel-shaped member 446 just before the splined sleeve 413 seats into the slotted center hole 441 upon replacement of the heat-sensing unit 394, to facilitate the reinsertion of the unit 394.

Figure 35:
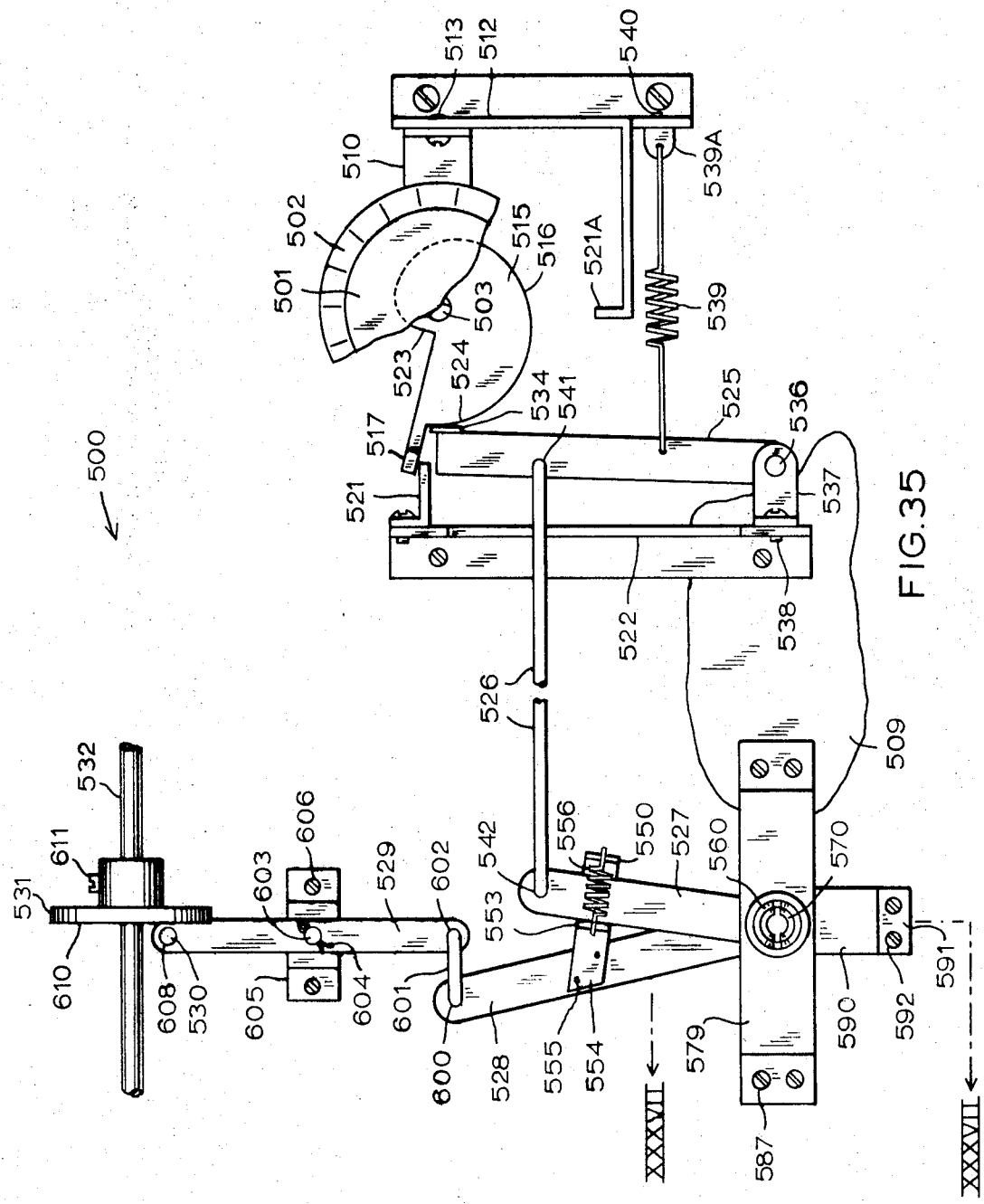
FIG. 35 is a top plan view showing another form of mechanism usable with the heat sensing mechanism shown in FIG. 30.
Figure 36:
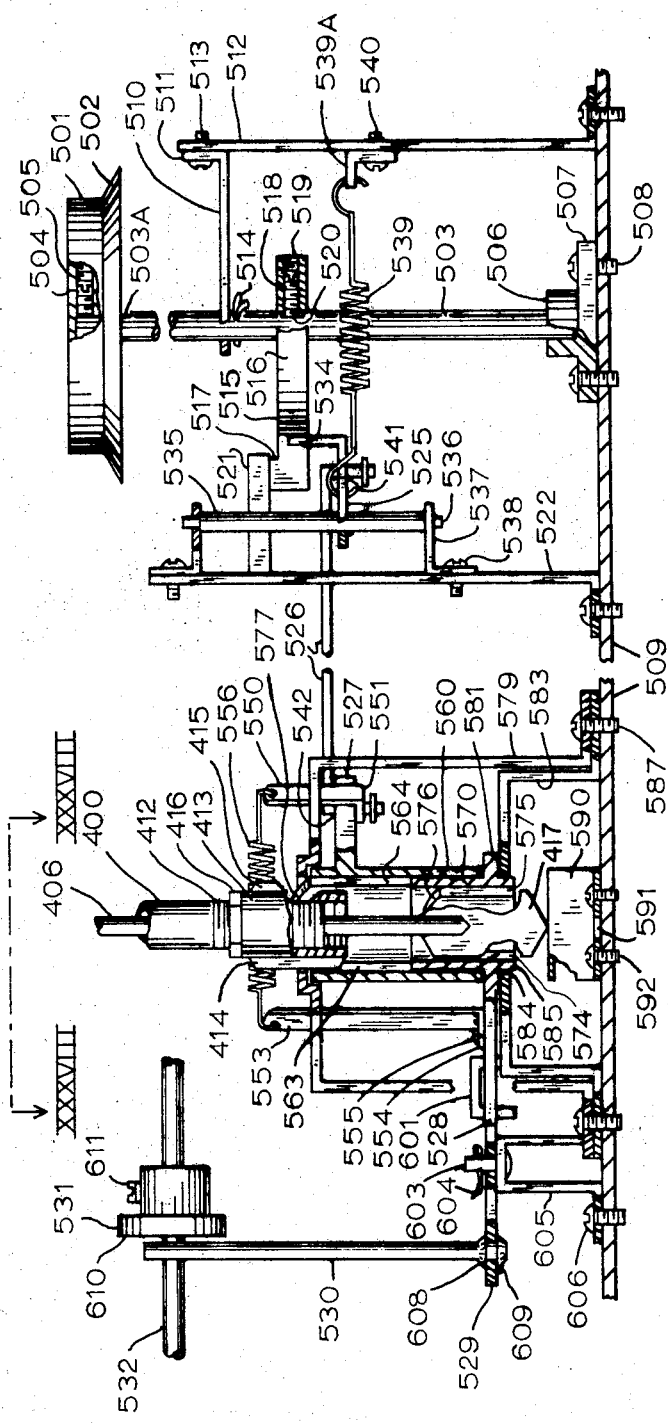
FIG. 36 is a sectional view illustrating the connection of the mechanism shown in FIG. 35 to mechanism similar to that shown in FIG. 30.

An alternative species of heat control unit is shown in FIGS. 35—38. FIG. 35 shows a top view of a heat control unit 500 constructed according to the principles of this invention. FIG. 36 is an end view of the heat control unit 500 shown in FIG. 35. In the heat control unit 500 a circular control knob 501 having a downwardly and outwardly extending bottom flange 502 is axially mounted on the top of a vertical control shaft 503 by means of a setscrew 504 threaded into a bore 505 in the control knob 501 to press against the flattened portion 503A of the vertical shaft 503. The bottom end of vertical shaft 503 rests in a cup-shaped bracket 506 having a flanged portion 507 which is secured by the mounting screw 508 to a structural panel 509, and an upper portion of vertical shaft 503 is held in position by a surrounding bracket 510 having an upwardly extending flange 511 secured to a structural panel 512 by means of a mounting screw 513, in the same manner that control shaft 487 is held in position in FIG. 34. The end of bracket 510 which surrounds the control shaft 503 rests loosely on a cotter pin 514 which traverses a hole in the control shaft 503. An edge cam 515 having an edge 516 and an outwardly extending member 517 is axially mounted on a midportion of the control shaft 503 by means of a setscrew 518 which is threaded into a bore 519 in the edge cam 515 to press against a flattened portion 520 of the control shaft 503. A travel limit block 521 is secured to a structural panel 522 to limit the counterclockwise rotational motion of the edge cam 515 and the control knob 501. Travel limit means 521A is also provided to limit the clockwise rotation of the cam 515 and the control knob 501. It should be noted that the edge 516 on edge cam 515 progresses gradually from a point of smallest radius 523 to a point of largest radius 524 in a clockwise direction as viewed from above, while the edge 455A of the edge cam 455 in FIG. 32 progresses outward in a counterclockwise direction. It should also be noted that the heat control unit 500 is entirely mechanical, using not electrical parts, although such electrical parts could be added if a more complicated control unit were desired.

The mechanical control unit 500 operates to control the temperature of a pot or other device on the stove in which it is installed by regulating the distance between the heating element of the stove and the bottom surface of the pot or other device. The heat control unit 500 may be used in conjunction with the heat sensing unit 394 shown in FIG. 30, and with the mechanical means for lowering the heating element thereof, which means are shown in FIG. 2. In particular, when the control knob 501 is rotated in a clockwise direction to set for a desired temperature level, a control plate 525 rotates in a clockwise direction pulls a connecting link 526 and an upper counterrotating lever 527, causing lever 527 to rotate in a clockwise direction. The rotation of lever 527 causes the attached vertical tube 400 of the heat-sensing unit 394 and the vertical control rod 406 thereof to rotate clockwise also, and the rotation of vertical control rod 406 causes a clockwise rotation of a lower counterrotating lever 528, which causes a counterclockwise rotation of a centrally pivoted lever 529, releasing any pressure of the vertical pin 530 on a collar 531 which is axially secured to a shaft 532 connected to the heating element 426A in a manner similar to the connection of the shaft 35, shown in FIG. 2, to the heating element 6 thereof. When the pressure of the pin 530 is released on the collar 531, the shaft 532, which operates identically as the shaft 35 of FIG. 2, is freed to move to the left, thereby maintaining the heating element 426A in its highest position against the bottom of a pot or other device on the stove. When the temperature of the pot or other device, sensed by the sensing unit 394, exceeds the temperature set by control knob 501, the vertical control rod 406 causes the lower counterrotating lever 528 to rotate counterclockwise away from the upper counterrotating lever 527, which is retained by the connecting link 526 and control plate 525, and lower counterrotating lever 528 causes the centrally pivoted lever 529 and the vertical pin 530 to force the control rod 532 to the right, thereby lowering the heating element 426A away from the pot or other device. If the temperature of a pot decreases because of the lowered heating element 426A, the control rod 406 on the heat-sensing unit 394 rotates in a clockwise direction to cause the lower counterrotating lever 528 to rotate in the clockwise direction and rotate the centrally pivoted lever 529 in a counterclockwise direction, thereby releasing the pressure of the vertical pin 530 from the collar 531 and allowing the control bar 532 to move to the left, to raise the heating element 426A. The process described above is repeated to maintain the heating element 426A at a level required to maintain the temperature of the pot or other device at the level set by the control knob 501.

It is important to note that the position of the collar 531 along the bus bar 532 can be adjusted to calibrate the control 500.

An upwardly extending tab 534 on the control plate 525 is positioned to contact the edge cam 515. A vertical pivot 535 extends through the opposite end of control plate 525 and has axial extensions 536 at each end which have a smaller diameter than the body portion of shaft 535 and which are secured in holes in a pair of flanged brackets 537 which are mounted to the structural plate 522 by means of the mounting screws 538. A spring 539 is stretched between a midportion of the control plate 525 and a flanged bracket 539A secured to the structural plate 512 by the mounting screw 540, to maintain the tab 534 of control plate 525 pressuredly engaged with the edge 516 of edge cam 515. One end of the connecting link 526 is secured in a hole 541 in the midportion of the control plate 525, and the other end of connecting link 526 is secured in a hole 542 in the free end of the upper counterrotating lever 527, which is pivotally connected at its other end in a manner which will be described. An upwardly extending flanged tab 550 has a flange 551 welded to the underside of the upper counterrotating lever 527, and an upwardly extending flanged tab 553 has a flange 554 secured by rivets 555 to the top side of the lower counterrotating lever 528. A spring 556 is connected between the top portions of the flange tabs 550 and 553 to urge the counterrotating levers 527 and 528 together to align the keyways 563 and 564 of the upper pivot member with keyways 574 and 575 of the lower pivot member when the heat-sensing unit 394 is removed, so as to facilitate easy reinsertion of the heat-sensing unit 394. The tab 553 on the lower counterrotating lever 528 serves as a travel limit means for the upper counterrotating lever 527, when the edge of the upper lever 527 comes to rest against the tab 553.

FIG. 36 shows an end view of the counterrotating levers 527 and 528 and their pivotal connection. The levers 527 and 528 are shown spread farther apart than they appear in FIG. 35, in order to show the details of construction more clearly. Also, the bottom portion of the heat-sensing unit 394 including the vertical tube 400 and the vertical control rod 406 with its end flange 417, the threaded sleeve 413 with its vertically extending splines 414 and 415, and the locknut 416 which secures the sleeve 413 in its relative position on the bottom end of the vertical tube 400, are shown positioned in the pivotal connection of the counterrotating levers 527 and 528, even though they are not shown in FIGS. 35 and 37. FIG. 37 shows a cross-sectional cutout view of the pivotal connection of levers 527 and 528 taken along the line XXXVII–XXXVII of FIG. 35. FIG. 38 is an expanded view of a portion of FIG. 35 having a portion thereof cutaway.

Referring now to FIGS. 35–38, and particularly to FIG. 37, the upper counterrotating lever 527 is integrally connected at its pivot end to an upper pivot member 560, which has an upper cylindrical wall 561 forming an upper vertical central bore 562 having two oppositely located full length vertical keyways 563 and 564. A lower central bore 566 on the upper pivot member 560 is connected on the same vertical axis with the upper bore 562 and has a larger diameter than the bore 562. A shoulder means 567 extends from the junction between the upper bore 562 and the lower bore 566. A lower pivot member 570 is integrally connected to the pivot end of the lower counterrotating lever 528, and is loosely housed in the lower central bore 566 of the upper pivot member 560. The lower pivot member 570 has an upper central bore 571 at its extreme upper end which is equal in diameter to the upper central bore 562 of the upper pivot member 560. A lower central bore 572 of the lower pivot member 570 is axially connected to the upper central bore 571 thereon, and upwardly extending shoulders 573 and 576 are formed at the junction between the upper bore 571 and the lower bore 572 to facilitate insertion of the lower end of the heat-sensing unit 394 therein. Two oppositely placed vertically extending keyways 574 and 575 are located in the lower bore 572 of the lower pivot member 570, and downwardly sloping shoulders 573 and 576 serve as guides as mentioned. The upper flanges 577 extend upward from the extreme top of the upper pivot means 560, and traverse a center hole 578 in an upper U-shaped flanged bracket 579, and the flanges 577 form a shoulder 580 which seats on the under surface of the upper flange bracket 579. A circumferential flange 581 extends outward from the lower end of the lower pivot member 570 and is integrally connected to the counterrotating lever 528. The circumferential flange 581 forms a downwardly facing shoulder 582 which seats on an upper surface of a lower U-shaped flanged bracket 583 having a center hole 584 therein which is located on the same axis as the center hole 578 of the upper flanged bracket 579. A downwardly extending flange 585 of the lower pivot member 570 traverses the center hole 584 of the lower flanged bracket 583. The flanged bracket 579 and the lower flanged bracket 583 are mounted to the structural plate 509 by means of the mounting screws 587, and the upwardly extending flanges 577 and downwardly extending flange 585 which traverse the center holes 578 and 584 of the flanged brackets 579 and 583 serve to keep the telescoped pivot members 560 and 570 in vertical alignment between the upper and lower flanged brackets 579 and 583. The upper and lower pivot members 560 and 570 are supported by the circumferential flange 581 which rests on the upper side of the lower flanged bracket 583.

As shown in FIG. 36, the splines 414 and 415 protruding outwardly from the splined sleeve 413 of the vertical tube 400 of heat-sensing unit 394 fit loosely in the vertical keyways 563 and 564 of the upper pivot member 560. The spline 417 at the bottom end of the vertical control rod 406 of heat sensing unit 394 engages the vertical keyways 574 and 575 of the lower pivot member 570. With this arrangement the vertical tube 400, which remains stationary during normal operation of the heat-sensing unit 394, holds the upper pivot member 560 and consequently the upper counterrotating lever 527 in a fixed position during normal operation depending upon the setting on the control knob 501 of the heat control unit 500. The vertical control rod 406, which rotates during normal operation of the heat-sensing unit 394 in response to contractions or expansions of the bimetal spring 396 thereof, rotates the lower pivot member 570 and consequently the lower counterrotating lever 528 to control the level of the heating element 426A, as explained earlier. A leaf spring 590 is located beneath the central portion of the lower inverted U-shaped flanged bracket 583 to serve as a foundation for the spline 417 of the heat-sensing unit 394 and to maintain the top of heat-sensing unit 394 pressuredly engaged with a cook pot or other device on the stove. The leaf spring 590 has a flanged portion 591 which is securely mounted to the structural plate 509 by means of the mounting screws 592. The leaf spring 590 serves the same purpose as the leaf spring 434 shown in FIG. 30. The free end of the lower counterrotating lever 528 has a hole 600 therein which receives one downwardly bent end of a connecting link 601, the other end of which is also bent downwardly and traverses a hole 602 in the centrally pivoted lever 529. The lever 529 is horizontally pivotable about its midpoint which is connected by a vertical pin 603 and a cotter pin 604 to a small flanged bracket 605 which is fastened to the structural plate 509 by means of the mounting screws 606. The vertical pin 530 traverses a hole 608 in the other end of the centrally pivoted lever 529 and is welded thereto by means of the spot weld 609. As described earlier, the other end of the vertical pin 530 is positioned to make contact with the face 610 of the collar 531, which is secured to the bus bar 532 by means of a setscrew 611.

With this arrangement of the heat control unit 500, the operation thereof is accomplished as described earlier. The cam 515 is illustrated in a minimum temperature position in FIG. 35 and the bus bar 532 and collar 531 are at a limit of their movement to the left with the heating element being engaged with the bottom of the pot. The lever or control plate 525 is at the limit of its counterclockwise movement and through the link 526, the upper lever 527 is also at the limit of its counterclockwise movement. When the temperature of the thermostatic spring 396 increases, the lower lever 528 is rotated in a counterclockwise direction to rotate the lever 529 in a clockwise direction and the pin or shaft 530 immediately engages and actuates the collar 531 and bus bar 532 to the right, thereby lowering the heating element 426A, so that the temperature of the pot is automatically kept at a low value.

When the cam 515 is moved in a clockwise direction by the control knob 501, the control plate 525 is allowed to be rotated in a clockwise direction by the spring 539 and through the connecting link 526, the upper lever 527 is rotated in a clockwise direction. Through the thermostatic spring 396, the lower lever 528 also is rotated in a clockwise direction and the lever 529 is rotated in a counterclockwise direction to move the vertical pin or shaft 530 to the left away from the collar 531. The temperature of the thermostatic spring 396 must then reach a higher value before the pin or shaft 530 is moved to the right to an extent sufficient to engage the collar and the bus bar 532. A further increase in temperature will cause the pin 530 to move the collar 531 to the right and lower the heating element. Thus, a higher temperature of the pot is automatically maintained. In this manner, the heat control unit 500 provides for an efficient and accurate control of the temperature of a cook pot or other device which is placed on a stove having the heat control unit 500 installed therein. As mentioned earlier, the heat control unit 500 is entirely mechanical but it can be combined with the heat control unit 454 shown in FIGS. 32—34 which controls the supply of electrical current to the heating element to which it is attached.

Referring to FIGS. 2 and 4, if the bimetal latching means 21 is not used, and the geared means of 31 are used optionally in its place, as a timing means, the mode of operation would be as follows. When it is necessary to lower the heating element 6 to engage it with the timing mechanism the control knob, such as control knob 2A, is pressed downwardly which causes the bus bar 35 to move to the right, as viewed in FIG. 2. The motion causes the arm 166 which is integral with the clutch 33 to rotate clockwise through the link 165 which is attached to the bus bar 35. The clutch 33 is frictionally rotated between the gear disc 34 and the spring 164 to a new position. As the pressure of the operator's hand is released from the control knob 2A, the heating element 6 is thus temporarily secured in a lowered position by the geared timing means. In this position, the spring 29 is trying to contract back to its original position and is exerting a pulling force on the bus bar 35 and trying to force it to the left to raise the heating element to its "up" position. The action of the spring 29 pulls on the bus bar 35 to the left, causing the arm 166 and the clutch 33 to rotate counterclockwise through the link 165. The clutch 33, being frictionally engaged between the gear disc 34 and the spring 164 will rotate counterclockwise only as fast as the unraveling gears 34, 161, 160, etc. will allow it. If it is desired to raise the heating element 6 after it has been lowered, against the holding effect of the timing means as described, it is only necessary to pull the control knob 2A upwardly and this in turn would defeat the timing means by causing the clutch 33 with the arm 166 to slip counterclockwise against the action of the pressure between the gear disc 34 and the spring 164. In pulling up on the control knob 2A to perform the defeat function, the tab 20 is also disengaged from the latching member 21. This can be used singularly as the defeat means if the clutch 33 with associated parts are not used.

FIG. 39 shows a latching member 625, similar to the latching member 21 of FIG. 2, which has a hook 626 to engage the tab 20, which is connected to the cross members or tie bars 8, also shown in FIG. 2. In this modification, a resistance wire 627 is provided which is placed in close proximity to the thermostatic bimetal latching member 625, or it can be coiled around it. A normally open switch 628 is also provided which is operated by some part of the control linkages or members. In this case, for example, a collar 629 is used which is secured to the bus bar 35 by means of a set screw 630.

In operation, when the heating element 6 is lowered all the way, tab 20, which is a part of the heating element support 8, travels downwardly to engage with the hook 626 on the bimetal latching member 625. At the same time, the bus bar 35 which has lowered the heating element 6, travel to the right, as viewed in FIG. 39. The collar 629 on the bus bar 35 presses against the switch plunger or button 631 which completes the electrical circuit through the switch 628 for automatically timing the length of time the heating element 6 is to be held in a lowered position and then later automatically releasing the heating element 6 to be returned automatically to its "up" position which would put it in contact with the bottom of a pot again.

As the circuit is completed, the current enters through line L–1, in DC or in a phase of AC goes through the switch 628, through the resistance wire 627 and back to line N.

As the resistance wire 627 is electrically energized, it warms up causing the bimetal latching member 625 to bend backward or clockwise causing the hook 626 to draw away from the tab 20 after a calibrated period of time, for example, 15 seconds. As the tab 20 is released from engagement with the hook 626 the heating element 6 is freed to return to its "up" position, also the bus bar 35 is caused to move to the left thereby releasing pressure on the switch plunger 631 which opens the circuit in the switch 628 causing the resistance wire 627 to be deenergized and cool off and allowing the latching member 625 to return to its original position to be in readiness for the next cycle.

It can be mentioned here also that the pot support walls 7B and 7C, shown in FIGS. 2 and 4, have vertical slots or channels 7D to allow vertical movement of the heating element support arms 8 through the circular portions of the pot support walls 7B and 7C.

Figure 40:
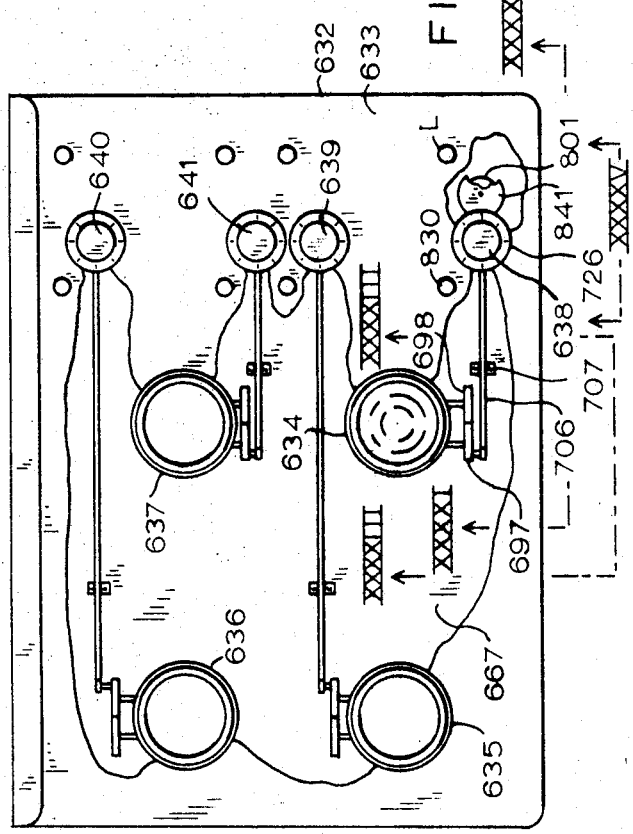
FIG. 40 is a diagrammatic top view of a modified form of stove according to the invention, having stationary heating elements and movable pot supports.

FIG. 40 is a diagrammatic top view of a stove constituting another form of this invention. In this form, heating elements are substantially stationary and pot supports are vertically movable and adjustable in height in relation to heating elements and also in relation to a top panel 633 of the stove 632.

Figure 41:
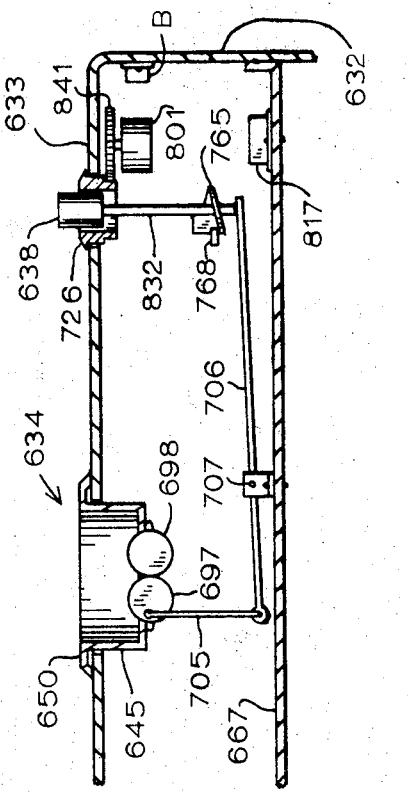
FIG. 41 is a sectional view taken substantially along line XXXX1–XXXX1 of FIG. 40.

The top panel 633 of the stove 632 is shown partly cut away. Four heating units 634 to 637 are shown, respectively controlled by control knobs 638 to 641 with their respective control members. FIG. 41 is a sectional side view of one of the heating units 634 with its control knob 638 and control members taken along line XXXXI–XXXXI of FIG. 40.

Figure 43:
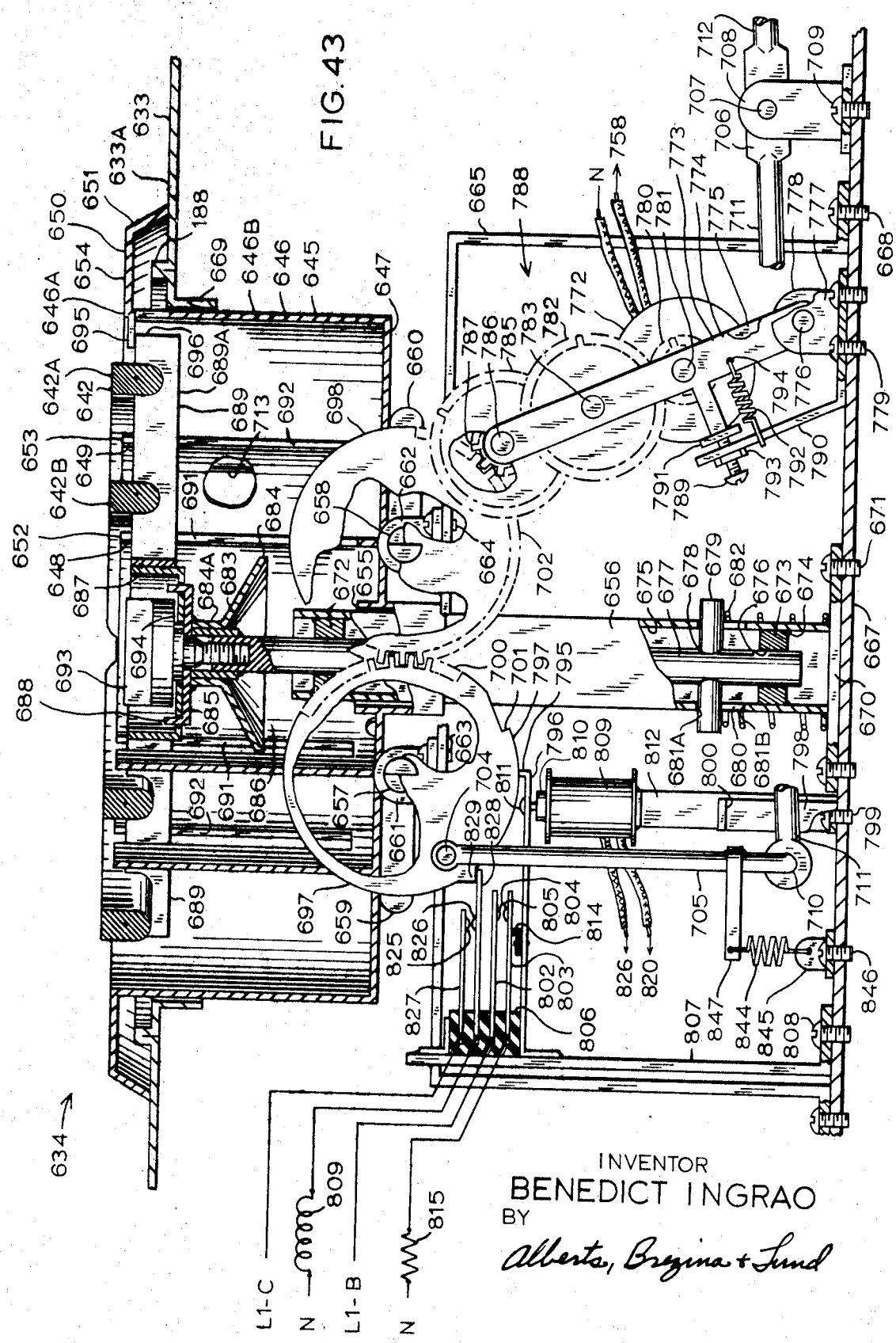
FIG. 43 is a sectional view taken substantially along line XXXXIII–XXXXIII of FIG. 40.

FIG. 43 shows an enlarged front sectional view of the vertically movable and vertically adjustable pot support 645 with the associated parts which is taken along line XXXX-III–XXXXIII of FIG. 40 but not showing the control knobs with their associated parts.

Figure 44:
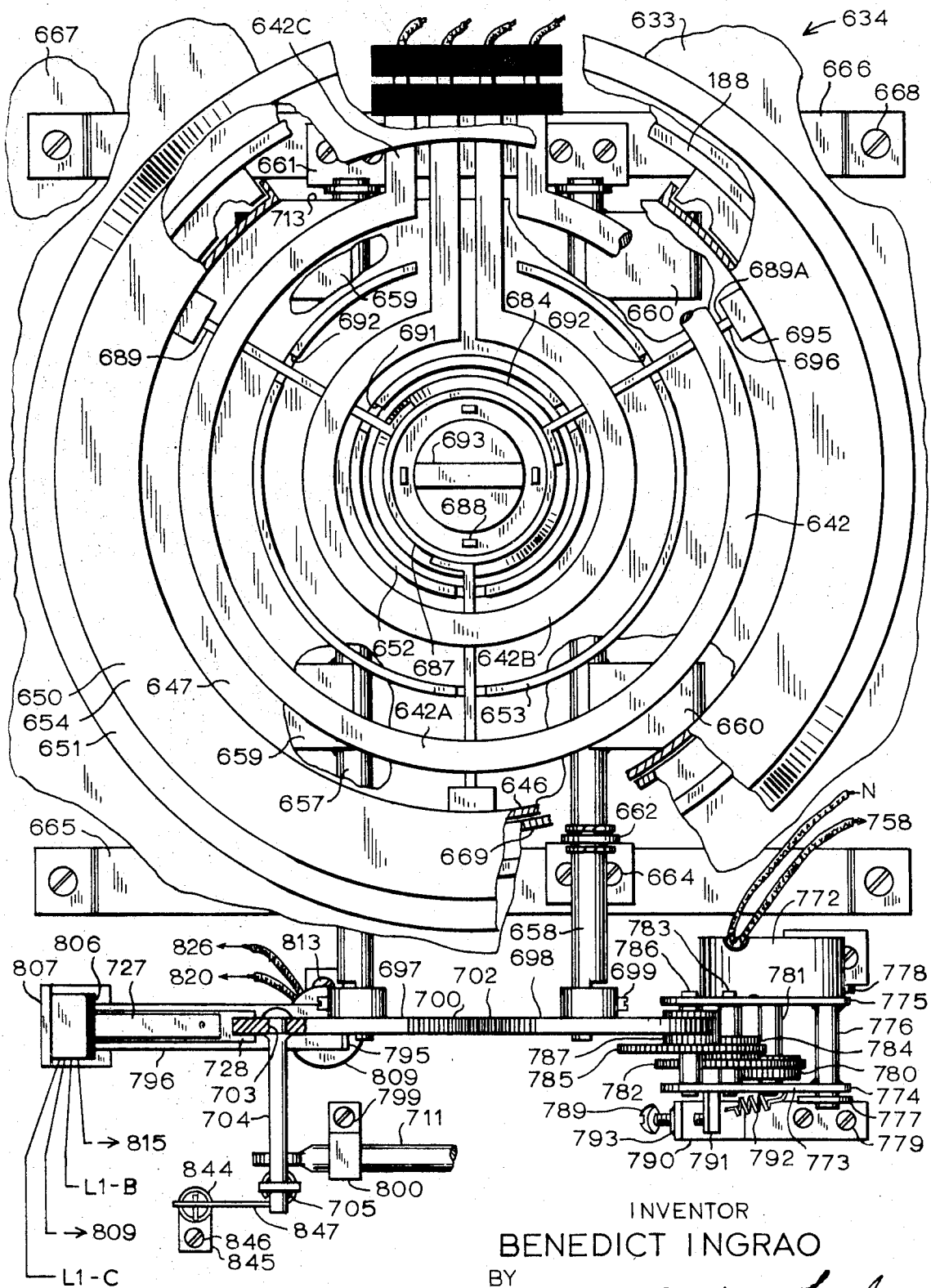
FIG. 44 is a top plan view of the assembly shown in FIG. 43.

FIG. 44 shows a top plan view of the heating unit 634 and is also taken from FIG. 40.

The pot support 645 in FIGS. 43 and 44 is similar to the pot support 7 in FIG. 2 except for a few modifications. Referring to FIG. 43 particularly, numeral 645 designates the pot support which has an outer circular vertical wall 646, a bottom horizontal wall 647, a centrally located circular vertical wall 648 and at least one intermediately located circular vertical wall 649 although the intermediate wall 649 can be omitted if so desired, as can the intermediate wall 7B of FIG. 2 also be omitted. The purpose of the walls 648 and 649 is to provide the upper edges 652 and 653 which serve as the support points for a port or pan along with the surface 654 of the collar 650. The top portion 646A of the outer vertical wall 646 is made integral with the horizontal outwardly extending collar 650 which normally rests on the top surface 633A of the horizontal top wall or panel 633 of the stove 632. The outer periphery 651 of the collar 650 angles downwardly to seat on the said top panel 633 of the stove 632 outside of the vertical ridge 188 which was previously described. The top end portions 652 and 653 of the vertical walls 648 and 649 respectively and the top surface 654 of the collar 650 are substantially on the same horizontal plane and comprise the top surface level of the pot support 645. SAid top surface level provides the seat for a pot or pan placed thereon. The collar 650 is broad enough to accommodate a good sized pot or pan.

The pot support 645 is made in one piece or it can be made with the central and intermediate walls 648 and 649 secured in place by means of welding or other means.

An important feature of the pot support 645 is that after cleaning it can be replaced in its normal position merely by dropping it in place. There are not fittings on the pot support 645 to connect and not tolls are necessary. The pot support 645 has a flanged square central opening 655 on the bottom wall 647 which is loosely traversed by a stationary vertical hollow square shaft 656. The cooperation between the square opening 655 and the square shaft 656 allows the pot support 645 to be vertically movable and also prevents the pot support 645 from revolving horizontally.

On the underside of the pot support 645 and just below the bottom wall 647 thereof are two parallel horizontal shafts 657 and 658. The shafts 657 and 658 have horizontally spaced apart outwardly extending levers 659 and 660 welded to the midportions thereof. The shafts 647 and 658 are supported in a horizontal position by means of flanged brackets 661 and 662, one on each end of the shafts 657 and 658. The brackets 661 and 662 are secured to a pair of inverted U-shaped flanged brackets 665 and 666 by means of screws 663 and 664. The U-shaped brackets 665 and 666 in turn are secured to the structural pan 667 by means of screws 668.

The edge of the opening in the top panel 633 of the stove 632 is flared downwardly 669 to provide a bearing surface for the pot support 645 and fits closely to the outside surface 646B of the outer sidewall 646 of the pot support 645. The downward flare 669 and the flanged square opening 655 both cooperate to prevent the pot support 645 from tilting to one side if a heavy pot is placed on one side of the pot support collar 650 when the pot support 645 is in a raised position.

The bottom end of the vertical square shaft 656 is welded to a horizontal mounting plate 670 which in turn is secured to the structural pan 667 by means of screws 671. An upper and a lower bushing 672 and 673 respectively are welded 674 to the inside wall 675 of the vertical hollow square shaft 656. The bushings 672 and 673 have a vertical central bore 676 in which is loosely supported a vertical support rod 677. The lower end of the rod 677 has a horizontal bore 678 which is securely fitted with a horizontal pin 679 which serves as part of a travel limit means. The ends of the horizontal pin 679 traverse vertical slots 680 on opposite sides of the hollow square shaft 656. The upper edges 681A of the slots 680 serves as part of a travel limit means for the heating element 642 and the lower edges 681B serve as a lower travel limit means. A spring 682 is provided between the mounting plate 670 and the lower side of the horizontal pin 679 to urge the heating element 642 in a normally "up" position.

A short length of square metal tube 683 is welded to the top end of the vertical rod 677. A drip collar 684 is removably fitted around the square tube 683 through a narrowed square upper end 684A on the drip collar 684 to prevent said drip collar 684 from revolving horizontally. A horizontal disc 685 is welded to the top end of the drip collar 684. The drip collar 684 and its associated parts are located in the space 686 within the circular centrally located vertical wall 648.

A circular support member 687 as previously described in the No. 1 species of this invention, and shown in FIG. 2, is positioned on the support disc 685 and horizontal rotation thereof is limited by means of vertically rising pins 688 which traverse holes in the bottom horizontal wall of the said circular support member 687. The pins 688 are upwardly extending extensions formed from the outer edge of the support disc 685.

The three outwardly extending horizontal crossbars or tie bars 689 are welded at one end to the sidewall of the circular support member 687 in spaced relation to each other. The crossbar numbered 689A and associated parts are brought more forwardly in FIG. 43 to show them more clearly. The heating element portions 642A and 642B are secured to the upper edges of the crossbars 689 in spaced relation to each other from the central vertical axis. FIGS. 43 and 44 show an outer circular heating element portion 642A and an inner circular heating element portion 642B interposed within the pot support points 652, 653 and 654. The vertical circular walls 648 and 649 of the pot support 645 have vertical slots or vertical channel means 691 and 692 to allow the free vertical movement of the crossbars 689 within the pot support portions of the pot support 645.

A thumbscrew 693 is provided to secure the heating element 642 to the top of the support rod 677. A clearance 694 is provided between the bottom shoulder of the thumbscrew 693 and the top surface of the horizontal wall of the circular support member 687 to provide a slight tilting action the same as in species No. 1 shown in FIG. 2. The pot support 645 is also provided with means to align the heating element 642 in a horizontal position when the heating element 642 is in its "up" position, with no pot on the pot support. These alignment means are in the form of horizontal tabs 695 which are formed from the outer wall 646 of the pot support 645 and which extend inwardly toward the central axis of the pot support 645. The tabs 695 serve also as an upper travel limit means for the heating element 642 when the pot support 645 is in a "down" position.

The top edges of the outer ends 696 of the crossbars 689 normally engage the underside of the tabs 695 by means of the upwardly urging spring 682.

One end of each of the horizontal shafts 657 and 658 is provided with gear members 697 and 698 which are meshed together and synchronized. The gear members 697 and 698 are disc shaped and each is secured to one end of each shaft 657 and 658 by means of screws 699 which seat on flat sides on the end of each of the shafts 657 and 658. One of the gear members 697 has part of its periphery hobbed with gear teeth 700 and an inclined notch 701 is provided at one point on the smooth portion of the lower periphery. The second gear member 698 is also provided with gear teeth 702 along most of its periphery. These gear teeth 702 mesh with the gear teeth 700 on the first-mentioned gear member 697. A hole 703 is provided near one side of the gear member 697 opposite of the gear portion 700 and is securely fitted with a horizontal pin 704. A vertical rod 705 has its top end loosely connected to the horizontal pin 704 through a hole in said top end. The bottom end of the vertical rod 705 is bent horizontally in the same plane as the horizontal pin 704. A horizontal control lever 706 is provided which is fulcrumed near its midpoint.

The control lever 706 is provided with a horizontal pin 707 at its midpoint which serves as the pivot point. The ends of the pin 707 traverse holes in a pair of support brackets 708 which are secured to the structural pan 667 by means of screws 709. The bent bottom end of the vertical rod 705 is loosely secured through a hole 710 in one end 711 of the control lever 706. The opposite end 712 of the lever 706 opposite of the fulcrum point 707 is acted upon by the control knob 638 as shown in FIGS. 41 and 45 and which will be described later. It may be mentioned here that the pot support 645 is also provided with an opening 713 at its rearward side to permit the passage of the heating element ends 642C and also to permit entry of cooling air. As shown in FIGS. 43 and 44 the two pairs of horizontally extending levers 659 and 660 are located one at each assumed corner of the bottom of the circular pot support 645.

The pot support 645 can normally rest on the top panel 633 of the stove 632 through the downwardly extending periphery 651 of the collar 650 when it is in its normal "down" position, or it can optionally rest on the horizontal shafts 657 and 658 which could then be in contact with the bottom horizontal wall 647 of the pot support 645. The control for this vertically movable and vertically adjustable pot support 645 is shown in FIGS. 41 and 45 but more specifically in FIG. 45.

FIG. 45 shows a control knob 638 which is located in the top panel 633 of the stove 632. The control knob 638 is vertically mounted on the top end of an upper vertical telescoping control shaft 714 and secured thereto by means of a setscrew 715 which seats against a flat side 716 on the shaft 714. The bottom end 717 of the upper shaft 714 is narrower in diameter and is loosely fitted into a vertical bore 718 in the top end of the lower telescoping control shaft 719. The bottom end 717 of the upper control shaft 714 is tightly fitted with a horizontal pin 720 through a horizontal bore in said bottom end 717 of the shaft 714. The ends 721 of the pin 720 extend through vertical slots 722 in the opposite sides of the upper end of the lower control shaft 719. The telescoping control shafts 714 and 719 are held in vertical alignment at their lower end by means of an inverted U-shaped flanged bracket 723, which is secured to the structural pan 667 by means of screws 724. The upper end of the shafts 714 and 719 are loosely held in vertical alignment by means of the control knob 638 which is housed in the central vertical bore 725 of another control knob 726 which will be described later.

The junction between the upper and lower telescoping control shafts 714 and 719 is provided with a pair of horizontal circular disc 727 and 728 which serve as a switch means and which are shown in FIGS. 45 and 47. The discs 727 and 728 are made of electrical insulating material, such as bakelite or the like. The upper disc 727 is secured to the upper control shaft 714 by means of a setscrew 729 which seats against the flat side 716 on the control shaft 714. The circular edge portion of the disc 727 is provided with a metallic contact ring 730 which overlaps into a top edge portion 731 and a bottom edge portion 732. The lower disc 728 is secured to the upper end of the lower control shaft 719 by means of a setscrew 733 which seats on a flat side 734 on the lower control shaft 719. The lower disc 738 is also provided with a circumferential contact ring 740 similar to the contact ring 730 of the upper disc 727. The discs 727 and 728 are held vertically apart by means of a spring 735 which is located between them.

The metallic contact rings 730 and 740 are also shown in cutaway top view in FIG. 46. The lower disc 728 is provided with an integral vertically rising insulated contacting member 736 which traverses a slot 737 in the upper disc 727 and is shown in a cutaway view in FIG. 47. One side 738 of the vertical contact member 736 is normally held against an adjacent side 739 of the slot 737 in the upper disc 727 by means of a spring 741, one end of which traverses a hole 741A in the top end of the vertical contact member 736, the opposite end of the spring 741 being secured through a hole in a vertically rising peg 742 which is integral with the top surface of the upper disc 727. In this normal position no electrical contact is made between the upper and lower contact discs 727 and 728. The purpose of the vertical contact member 736 will be explained later. As shown in FIG. 45, the upper side 743 of the lower contact ring 740 is provided with a spring-type extension 744 which is positioned near the lower side 732 of the upper contact ring 730.

Referring to FIGS. 46 and 47, the upper side 743 of the lower contact ring 740 has an extension 745 which is vertically secured to the opposite free side of the vertical contact member 736. The lower side 732 of the upper contact ring 730 has an extension 746 which vertically traverses the opposite free side of the slot 737 in the upper disc 727. The first and second extensions 745 and 746 are normally horizontally spaced apart and no electrical connection is made in this position. Referring back to FIG. 45, a pair of brush-type contacts 747 and 748 are provided which are housed in individual isolating chambers 749 and 750 in the housing 754 which is made of bakelite or other electrical insulating material. The housing 754 is secured to the top surface of the bracket 723 and is secured thereto by means of screws 760. The top end of the first brush 747 is in electrical contact with the bottom side 751 of the lower contact ring 740 and the top end of the second brush 748 is in electrical contact with the bottom side 732 of the upper contact ring 730. The brushes 747 and 748 are rodlike in shape and are in a vertical position. Each brush 747 and 748 traverses a hole 752 in the top wall of its respective housing chamber 749 and 750. The bottom end of each brush 747 and 748 is flattened as a horizontal disc 753 to prevent the brushes 747 and 748 from being forced out of the hole 752 in the top of the housing 754. The brushes 747 and 748 are normally held in an upward position by means of springs 755 and 755A which are in contact with the bottom disc portions 753 of the said brushes 747 and 748 and which are also located in the vertical bores or chambers 749 and 750 of the housing 754. A metallic cap 756 and 756A is in electrical contact with the bottom end of each spring 755 and 755A and an electrical wire 757 and 758 is soldered to each cap 756 and 756A respectively with the free end of each wire 757 and 758 traveling out of the housing 754 through holes 759 in said housing 754. An insulating strip 761 is placed between the bottom of the housing 754 and the bracket 723 to insulate the caps 756 and 756A from the bracket 723.

A face cam 765 is secured to the bottom end of the lower control shaft 719 by means of a setscrew 766 which seats against the flat side 734 of the lower control shaft 719. The top surface 767 of the face cam 765 normally is frictionally engaged with a buffer block 768 which is secured to the bracket 723 by means of screws 769. The bottom end 770 of the lower control shaft 719 normally engages the flattened top surface 771 of the free end 712 of the horizontal control lever 706.

Referring to FIGS. 43 and 45, the control knob 638 has two modes of operation.

In one mode, the control knob 638 is pressed downwardly to raise the pot support 645 and latch it in an "up" position, above the surface level of the heating element 642. After a period of time, for example, 15 seconds, the pot support is automatically released and is allowed to return slowly back to its normal "down" position, so that a pot on the pot support 645 will again make metal-to-metal contact with the top surface of the heating element 642, except in the case where the pot support 645 will come to rest at a previously adjusted point on the cam 765 which will be described in the second mode of operation.

In the second mode of operation, the control knob 638 is turned clockwise, as viewed from the top in FIG. 40 to adjust the height of the pot support 645 so as to provide a space between the bottom of a pot on the said pot support 645 and the top surface level of the heating element 642.

In operation, in the first mode, when it is necessary to immediately a pot from contact with the heating element 642, the control knob 638 is pressed downwardly. The downward pressure compresses the spring 735 which is located between the upper and lower contact discs 727 and 728 causing the discs 727 and 728 to come into electrical contact with each other through the extension 744 which is formed from the top portion 743 of the lower contact ring 740 and which would be caused to press against the lower side 732 of the upper contact ring 730 thereby completing the electrical circuit. The circuit remains closed as long as the operator's hand remains on the control knob 638. With the electrical circuit completed, and referring to FIG. 45, the current, in DC or for example in a phase of AC enters through the wire 757 w which is connected to line L1–A, goes through the bottom cap 756, through the spring 755, through the brush 747, through the lower contact ring 740, through the extension 744, through the upper contact ring 730, through the second brush 748, through the second spring 755A, through the bottom cap 756A and out through the second wire 758 which is connected to the motor 772 which is shown in more detail in FIGS. 43 and 44. A second wire which is connected to the motor 772 returns to a neutral line as indicated by N.

Referring now to FIGS. 43 and 44, the electric motor 772 is mounted on the bottom portion of a frame 773 which comprises a pair of spaced apart parallel frame members 774 and 775. The bottom ends of both frame members 774 and 775 are secured by welding or other means to opposite ends of a horizontal shaft 776 which serves as a pivot point. The horizontal shaft 776 is provided with supporting flanged brackets 777 and 778 on each end. The brackets 777 and 778 are secured to the structural pan 667 by means of screws 779. A pinion gear 780 is secured to the motor shaft 781 which cooperates with a first gear 782 on shaft 783 which also carries a pinion gear 784 which cooperates with a second gear 785 on shaft 786 which also carries a pinion gear 787. The pinion gear 787 is engaged with the gear portion 702 of the gear disc 698.

The angle of the gear train 788 is arranged so that if an imaginary straight line were drawn between the center of the horizontal pivot shaft 776 of the gear frame 773 and the center of the horizontal shaft 658 which supports the right gear disc 698, the point of engagement between the pinion gear 787 and the gear disc 698 would be slightly clockwise from the said imaginary line. With this arrangement, a clockwise rotation of the pinion gear 787 when driven by the motor 772 will cause the gear frame 773 to be urged counterclockwise, and will also cause the pinion gear 787 to try to dig against the gear disc 698 to insure a positive engagement between the said pinion gear 787 and the gear disc 698. Another function of this arrangement will be described later.

The gear frame 773 is prevented from excessive counterclockwise rotation by means of a travel limit means which is in the form of a setscrew 789 which is threadedly adjusted on an extension 790 of the bracket 777. An extended portion 791 of the frame member 774 normally abuts against the threaded end of the adjustment screw 789 and is held there by means of the restraining spring 792. The adjustment screw is locked in position by means of a lock nut 793. One end of the spring 792 is connected through a hole 794 in the frame member 774 and the other end of the spring 792 is secured through a hole in the extension 790 of the bracket 777.

With the control knob 638 depressed and the electric motor 772 running, the clockwise rotation of the pinion gear 787 causes the right gear disc 698 to rotate counterclockwise and also causes the companion left gear disc 697 to rotate clockwise which in turn causes the shafts 657 and 658 and the levers 659 and 660 thereon to rotate in the same direction as their respective gear discs 697 and 698. As the levers 659 and 660 rotate upwardly in opposite directions against the bottom of the pot support 645 they force the pot support 645 to rise, for example, one-half inch, above the surface level of the heating element 642. The surface level of the heating element 642 normally extends slightly above the surface level of the pot support points 652, 653 and 654. When a pot is placed on the pot support points 652, 653 and 654 the heating element 642 is forced downwardly against the upwardly urging action of the spring 682 to the same surface level of the pot support 645 to insure a positive metal-to-metal contact between the surface of the heating element 642 and the bottom of the pot.

As the pot support 645 is raised, the heating element 642 will also rise, but only for a short distance. Its upward travel is limited by the travel limit means which is in the form of the horizontal pin 679 which abuts against the top edges 681A of the slots 680 in the sides of the stationary square shaft 656. The surface level 652, 653 and 654 of the pot support 645 would normally be able to rise a calibrated distance above the surface level of the heating element 642.

Referring to FIG. 43, as the pot support 645 reaches its "up" position, a hook 795 on a horizontal hooked spring member 796 snaps into the inclined notch 701 on the left gear disc 697. The hooked spring member 796 is made of spring steel and the upwardly extending hook 795 thereon normally presses against the underside smooth edge 797 of the left gear disc 697. As the hook 795 snaps into the inclined notch 701 it gives an audible sound which signals the operator that the pot support 645 has reached its upper limit of travel and to release pressure on the control knob 638. At this point the pot support 645 has stopped rising as a result of the "upper" travel limit means which is in the form of a bracket 798 and which is secured to the structural pan 667 by means of screws 799. The top part 800 of the bracket 798 is in a horizontal position and is positioned and spaced over the end 711 of the horizontal control level 706 to limit the upward travel of the said control lever end 711 and the pot support 645. While the pot support 645 is in an "up" position the control knob 638 is in a "down" position and serves as a visual indicator to indicate that the pot support 645 is in an "up" position, away from the surface level of the heating element 642.

During this time the heat range selector 801 shown in FIGS. 40 and 45 can be turned off or it can be turned to a lower heat range if so desired through the heat range control knob 726 which will be described later. Also, during the time that the control knob 638 was depressed downwardly and the motor 772 was energized and turning, a warning signal was also functioning to warn anyone in the vicinity of the stove 632 that the pot support 645 with a pot on it was in the process of being raised. There might be times when the control knob 638 might be depressed accidentally, as by a child, and a warning signal might be desired.

The warning signal could be in the form of a light source shown by L in FIG. 40 and can be located adjacent to its corresponding control knob such as 638 or it can be in the form of a buzzer shown by B in FIG. 41 and can be located anywhere in the stove 632. The warning indicator could be connected in parallel with the motor 772 as shown by I–1 in FIG. 45. When the motor 772 is energized the indicator I–1 gives its signal, when the motor 772 is deenergized the signal stops.

Referring to FIGS. 43, 44 and 45, as the hook 795 snaps into the inclined notch 701 giving the audible sound, and as the operator releases pressure on the control knob 638, the spring 735 which is between the contact discs 727 and 728 forces the contact discs 727 and 728 to separate vertically causing the circuit L1–A to open and causing the motor 772 to be deenergized and stopped. The weight of the pot support 645 and especially with a pot on it exerts a pressure on the outwardly extending levers 659 and 660 which are now raised to an angle of about 30° from the horizontal line. The levers 659 and 660 are prevented from receding downwardly because of the hook 795 which is engaged with the inclined notch 701 on the left gear disc 697.

The hooked spring 796 is part of an automatic latching means, automatic timing and automatic release means which will herewith be described. The hooked spring 796 is mounted in a horizontal position beneath a pair of horizontal contact points members 802 and 803, the contact points 804 and 805 of which are normally in an open position. All three members are electrically insulated from one another and are mounted on an insulating block 806 which is secured to a vertical bracket 807 which in turn is secured to the structural pan 667 by means of screws 808. A solenoid 809 is provided beneath the hooked spring 796 near the free end near the hook 795. The top end of the solenoid plunger 810 is loosely secured to the free end of the hooked spring 796 by means of a rivet 811. The bottom end of the solenoid frame is welded to the top portion of a Z-shaped bracket 812 which in turn is secured to the structural pan 667 by means of screws 813.

Figure 42:
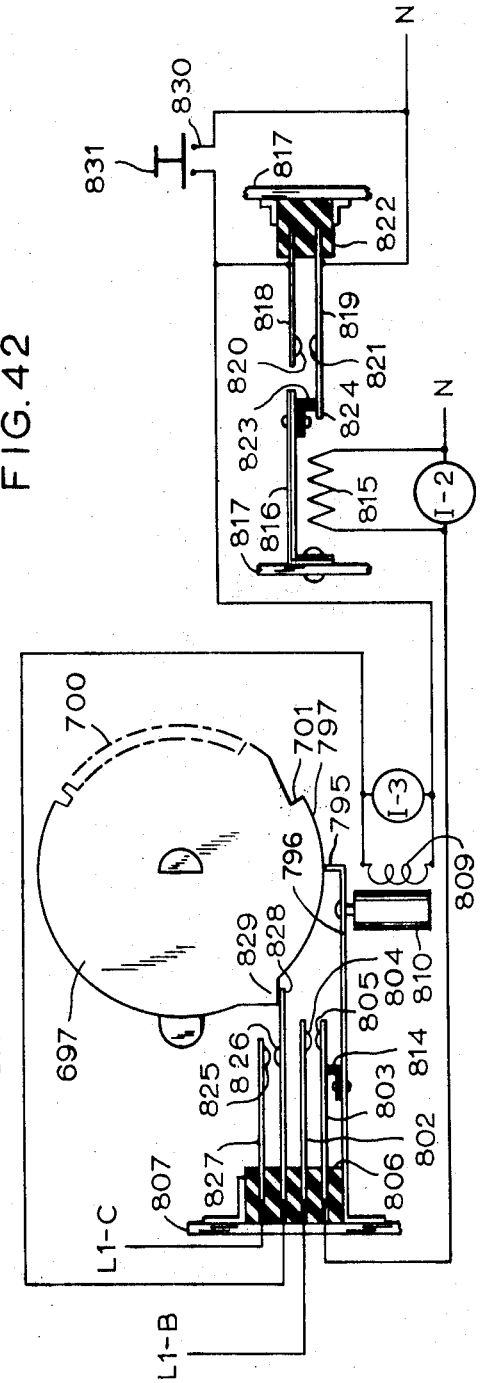
FIG. 42 is a diagrammatic view illustrating an electromechanical control usable with the stove of FIG. 40.

Referring to FIGS. 42 and 43, when the hooked spring 796 has moved upwardly to engage the inclined notch 701 on the gear disc 695, the solenoid plunger 810 is also pulled upwardly, at the same time an insulating bumper 814 which is secured by means of a rivet to the upper side of the midportion of the hooked spring 796 presses upwardly against the bottom side of the lower contact points member 803 forcing the said contact points member 803 upwardly causing the contact point 805 thereon to make contact with the contact point 804 on the upper contact points member 802 thereby completing the electrical circuit of L1-B. With the circuit L1-B completed, and referring to FIG. 42 especially, the current enters through the wire L1-B, goes through the contact points 804 and 805 on the contact points members 802 and 803, goes through the resistance wire 815 which is placed in close proximity to a thermostatic bimetal element 816 and leaves through the neutral wire indicated by N.

A second indicator I-2 designated in FIGS. 40 and 41 as a light source L, or as a buzzer B, can be connected in parallel with the resistance wire 815 to warn that the pot support 645 with a pot on it is in an "up" position and is in preparedness to descend after a lapsed period of time. One end of the thermostatic element 816 can be secured to a wall in a control box 817 which in turn can be located in the stove 632 as shown in FIG. 41. A second pair of contact points members 818 and 819 with their respective contact points 820 and 821 are also provided. The contact points members 818 and 819 are mounted on an insulating block 822 which in turn is secured by welding or other means to an opposite wall in the said control box 817. An insulating bumper block 823 riveted on the bottom surface on the free end of the bimetal strip 816 normally presses downwardly on the top surface of the free end 824 of the lower contact points member 819 to keep the contact points 820 and 821 separated from one another to keep the circuit L1-C in an open condition. As the resistance wire 815 starts to heat, the bimetal strip 816 starts to bend upwardly away from the lower contact points member end 824 causing the lower contact points member 819 to bend upwardly as a result of its own upwardly urging spring tension.

After the calibrated period of time, the bimetal strip 816 has bent upwardly far enough to allow the contact point 821 on the lower contact points member 819 to make contact with the upper contact point 820 on the upper contact points member 818 thereby completing the electrical circuit L1-C. The bimetal strip 816 and the heater 815 thus serve as the automatic timing means. With the circuit L1-C completed, the current enters through the wire L1-C, goes through a third pair of contact points 825 and 826 on the contact points members 827 and 828 respectively, which will be described later, through the solenoid coil 809, through the second pair of contact points 820 and 821 and out through the neutral wire N.

As the solenoid 809 is energized, the solenoid plunger 810 is pulled downwardly which in turn pulls the hook 795 on the hooked spring 796 out of engagement with the inclined notch 701 on the left gear disc 697. As the hooked spring 796 is pulled downwardly it also releases pressure on the lower contact points member 803 which moves downwardly by its spring tension away from the upper contact points member 802 causing the contact points 804 and 805 to separate and thus causing the circuit L1-B to open with the resulting deenergization of the resistance wire 815.

With the gear disc 697 released, the weight of the pot support 645, with or without a pot on it, causes the two pairs of outwardly extending levers 659 and 660 to be forced downwardly which in turn causes their respective gear discs 697 and 698 to be rotated in their respective opposite directions. With the pot support 645 descending, the left gear disc 697, as viewed in FIG. 43, will rotate in a counterclockwise direction and the right gear disc 698 will rotate in a clockwise direction. The right gear disc 698 is still engaged with the gear train 788 of the motor means 772 through the pinion gear 787. The gear train 788 now serves as a slow return means to prevent the pot support 645 with a pot on it from descending too fast and thereby eliminating any noise or jarring effect as the pot support 645 comes to rest in its "down" position. The second indicator I-2 was in operation until the solenoid 809 released the left gear disc 697 and opened the circuit L1-B. A third indicator I-3, which can be a light source or a buzzer, can be connected in parallel with solenoid 809 to take over when the second indicator I-2 cuts out.

With the first circuit L1-B opened, the bimetal strip 816 will start to cool off and bend downwardly causing the second pair of contact points 820 and 821 to open thus deenergizing the second circuit L1-C along with the solenoid 809 and the indicator I-3. With the solenoid 809 deenergized the solenoid plunger 810 is pulled up to its normal "up" position by means of the spring action of the hooked spring 796. At this point the hook 795 will seat itself on the smooth edge 797 of the gear disc 697 in readiness for the next cycle.

The cooling bimetal strip 816 can be calibrated to open the second circuit L1-C through the contact points 820 and 821 by the time the pot support 645 has reached its "down" and normal position. Or, optionally, the circuit L1-C can be opened to deenergize the solenoid 809 and the indicator I-3 automatically when the pot support 645 has reached its "down" position. These optional means comprise a cam 829 which is located on the edge of the left gear disc 697 and the third pair of contact points members 827 and 828 which are opened by the cam 829 when the pot support 645 has reached its "down" position.

FIGS. 42 and 43 show the third pair of contact points members 827 and 828 which are mounted above the first pair of contact points members 802 and 803 on the same insulating block 806. When the pot support 645 is in any raised position, the cam 829 is disengaged from the free end of the lower contact points member 828 allowing the said contact points member 828 to bend upwardly by means of its own spring action to cause a contact to be made between the contact points 825 and 826 which completes the circuit of L1-C to energize the solenoid 809 and the indicator I-3 when the second pair of contact points 820 and 821 are finally closed.

When the pot support 645 has been lowered, and in the event that the contact points 820 and 821 are still closed, the circuit of L1-C can be opened when the cam 829 exerts a downward pressure on the free end of the lower contact points member 828 which separates the contact points 825 and 826 thus deenergizing the solenoid 809 and the indicator I-3.

If at any time that the pot support 645 is in an "up" position and it is desired to defeat the automatic latching and timing means associated with the circuits L1-B and L1-C to bring the pot support 645 down prematurely, a defeat means is provided which is also shown in FIG. 42. The defeat means is in the form of a normally open pushbutton switch 830 which is connected across the second pair of contact points members 818 and 819. When the button 831 on the switch 830 is manually depressed the second circuit L1-C is completed through the switch 830, bypassing the separated contact points 820 and 821 on the contact points members 818 and 819, thereby energizing the solenoid 809 which in turn pulls the hooked spring 796 downwardly to release the gear disc 697 and causing the pot support 645 to descend. The indicator I-3 will also function during this time. A pushbutton defeat switch 830 can be located near each of the control knob clusters such as 638 and 726 as shown in FIGS. 40 and 45.

In the second mode of operation for the control knob 638, the control knob 638 is turned clockwise to mechanically adjust the height of the pot support 645 above the surface level of the heating element 642.

Referring to FIGS. 43, 45 and 47 rotating the control knob 638 causes the upper and lower vertical control shafts 714 and 719 connected thereto to rotate together through the interconnecting pin 721. The face cam 765 on the lower portion of the lower control shaft 719 is also caused to rotate. As the control knob 638 is rotated to the desired setting, the face cam 765 is proportionately advanced downwardly against the stationary action of the buffer block 768. The bottom end 770 of the lower control shaft 719 forces the end 712 of the horizontal control lever 706 to descend by exerting pressure on the flattened extreme end portion 771 of the said lever 706. The horizontal control lever 706 is forced to pivot on its pivot point 707 according to the amount in which the control knob 638 is rotated. The opposite end 711 of the pivoted horizontal control lever 706 is forced upwardly which in turn causes the attached vertical rod 705 to rise and to rotate the left gear disc 697 clockwise in a proportionate amount. The synchronized right gear disc 698 is consequently also rotated the same amount in a counterclockwise direction. The partial rotation of both gear discs 697 and 698 will cause the attached horizontal shafts 657 and 658 with their outwardly extending levers 659 and 660 to also rotate thus raising the pot support 645 a proportionate amount according to the amount in which the control knob 638 is rotated. During the time that the pot support 645 was being raised manually, through the action of the face cam 765, the gear train 788 would ordinarily tend to impede the counterclockwise rotation of the right gear disc 698 because of the engagement between the pinion gear 787 and the toothed portion 702 of the right gear disc 698, but a provision has been incorporated to defeat the resistance of the gear train 788.

The gear train 788, as stated before, has its frame 773 pivoted on the horizontal shaft 776. When, through the action of the face cam 765, the synchronized gear discs 697 and 698 are forced to rotate, the counterclockwise rotation of the right gear disc 698 forces against the pinion gear 787 and causes the gear frame 773 to pivot in a clockwise direction on its pivot point 776. As the gear frame 773 is pivoted in a clockwise direction, the pinion gear 787 on the end of the gear train 788 is forced out of engagement with the gear portion 702 of the right gear disc 698. The pinion gear 787 is continually being buffeted by the gear teeth 702 until the gear disc 698 is finally stopped and the pot support 645 has reached its adjusted height. At this time the gear teeth on the pinion gear 787 would try to reseat themselves in the nearest gear teeth 702 of the right gear disc 698 through the urging of the spring 792 which urges the gear frame 773 to pivot in a counterclockwise direction.

If desired, the motor means 772 can be employed to aid in the lifting action of the face cam 765 and of the lever 706 as will herewith be described. Referring to FIGS. 46 and 47, and especially to FIG. 47, when the control knob 638 is rotated in a clockwise direction to raise the pot support 645, the upper control shaft 714 also is rotated along with the upper contact disc 727 thereon. The lower control shaft 719 with the lower contact disc 728 is comparatively impeded from turning due to the resistance between the face cam 765 and the stationary buffer block 768 and also by the weight of the pot support 645 with or without a pot on it.

As the control knob 638 is turned in a clockwise direction against the tension of the restraining spring 741, the upper contact disc 727 is also turned until the extension 746 in the slot 737 on the upper contact disc 727 touches the extension 745 on the vertically rising contact member 736 on the lower contact disc 728 at which time the electrical circuit is completed through the extensions 745 and 746 and through the brush contacts 747 and 748, as shown in FIG. 45, which energize the motor 772 which in turn raises the pot support 645. As the motor 772 raises the pot support 645, the frictional resistance between the cam 765 and the buffer block 768 is decreased and the restraining spring 741 will tend to urge the vertical contact member 736 away from making contact between the extensions 745 and 746, a continued manual rotation of the control knob 638 will keep the extensions 745 and 746 in contact with each other until the pot support 645 has reached the desired height and the control knob 638 has been released, at which time the spring 741 urges the upper contact disc 727 to rotate slightly counterclockwise until the edge 739 of the slot 737 engages with the edge 738 of the vertical contact member 736 at which time the extensions 745 and 746 are drawn away from each other causing the circuit L1–A to be opened and causing the motor 772 to be deenergized.

It can be seen in FIG. 47 that the arrangement and design of the contact discs 727 and 728 along with the contacting rings 730 and 740 will allow an electrical contact to be made between the upper and lower contact disc rings 730 and 740 by depressing the control knob 638 or by turning it in a clockwise direction.

The springs 735 and 741 prevent the contact disc rings 730 and 740 from making electrical contact with each other until desired. The extension 744, shown in FIGS. 45 and 46, on the top portion 743 of the lower contact ring 740 can be omitted if so desired, and the electrical connection is then made between the top surface 743 of the lower contact ring 740 and the lower surface 732 of the upper contact ring 730. The electrical connection can also be made between the extensions 745 and 746 as described.

Referring to FIGS. 45 and 47, in order to allow the extensions 745 and 746 to make contact through the relative rotation of the upper and lower contact discs 727 and 728, the slots 722 on the opposite sides of the lower control shaft 719 are slightly wider than the pin 721 to allow the upper control shaft 714 to rotate slightly in the bore 718 of the lower control shaft 719. The upper and lower edges of the slots 722 along with the pin 721 also serve as a travel limit means to limit the vertical movement of the upper control shaft 714 in the bore of the lower control shaft 719. Enough clearance is provided between the upper and lower edges of the slot and the pin 721 to allow vertical engagement and disengagement of the contact rings 730 and 740.

If desired, the electrical portion of raising the pot support 645 could be omitted including all electrical parts associated with the motor 772, such as the contact discs 727 and 728, the brush members 747 and 748 along with their respective housing members, and including the omission of the motor 772. In that event the raising of the pot support 645 could be strictly mechanical and a one piece control shaft 832 could be substituted in place of the upper and lower control shafts 714 and 719, as shown in FIG. 41.

Referring to FIG. 45, the heat range control knob 726, as stated before, has a central bore 725 which houses the control knob 638. The heat range control knob 726 is fitted into an opening 832 in the top panel 633 of the stove 632. The control knob 726 has an upper downwardly inclined surface 833 which forms a lip 834 on the periphery of the control knob 726. The bottom surface of the lip 834 rests on the top surface 633A of the top panel 633 of the stove 632 around the opening 832. A narrower circular portion of the control knob 726 below the lip 834 extends downwardly into the opening 832 of the top panel 633. The narrower portion is provided with a circumferential undercut 835 into which is seated the end portion 836 of a spring-type locking member 837, which is also shown in a top view in FIG. 48. The other end 838 of the locking member 837 is welded to the underside 839 of the top panel 633. The locking member 837 allows horizontal rotation of the control knob 726 and also locks it in a vertical position. A lower and further narrower portion of the control knob 726 is in the form of a horizontal gear 840 which is meshed with a gear 841 which is secured to the vertical shaft 842 of the heat range selector switch 801. The heat range selector switch 801 is secured to a bracket 843 which in turn is secured to the bracket 723 by welding or other means.

In the event that a pot of food is not on the pot support 645 to offer weight, a spring 844, shown in FIGS. 43 and 44, is provided to help the pot support 645 to descend to its "down" position against the resistance of the gear train 788 which serves as a slow return means. The spring 844 has its lower end attached to a bracket 845 which is secured to the structural pan 667 by means of screws 846. The upper end of the spring 844 is secured to the free end of a horizontal bracket 847. The opposite end of the bracket 847 is welded to the vertical rod 705.

It can be mentioned here that a suitable free wheeling clutch means can be provided between the motor 772 and the gear train 788. Also a transformer can be used to provide current for the circuits L1–A, L1–B and L1–C.

Also, the collar 650, as shown in FIG. 43, can be made separately from the pot support wall 646 and can be stationary. In this case the pot support points would be 652, 653 and 646A which are the uppermost points of the pot support walls 648, 649 and 646 respectively.

It is important to note that if a pot larger than the diameter of the pot support is used, the hot air would be trapped under the pot and would consequently accumulate under the top panel of the stove and would also cause the pot support to store up an excessive amount of heat which would feed back to the pot after the heating element is lowered. Provisions have been incorporated to allow the escapement of trapped hot air. These provisions are in the form of air channels provided in the outermost portion of the pot supports shown as concave gullies and indicated by numeral 7H in FIG. 4 and by 197D in FIG. 11. Upstanding ridges, not shown, can optionally be provided to serve the same purpose.

It is also important to note that the principles of this invention can be incorporated in small portable electric stoves having only one or two heating element sections. Also, to reduce the cost of manufacture, certain of the control functions which are possible with the illustrated constructions may be eliminated by eliminating the appropriate parts, thereby providing a less expensive but equally desirable stove construction.

It will be appreciated that other modifications and variations may be effected without departing from the spirit and scope of the novel concepts of this invention.

I claim:

1. In an electric stove, a pot support having surface means in a horizontal plane engageable with the underside surface of a pot, an electric heating element having surface means in a horizontal plane positionable in proximity to said underside surface of the pot, first support means for said pot support, second support means for said heating element, control means for effecting relative vertical movement of said first and second support means between first and second limits of relative movement, said surface means of said heating element being positioned above said surface means of said pot support at said first limit of relative movement and with no pot on said heating element and being positioned a substantial distance below said surface means of said pot support at said second limit of relative movement, and yieldable means associated with said second support means and operative at said first limit of relative movement to allow the weight of a pot to lower said heating element to a position such that the underside of the pot engages both said surface means of said heating element and said surface means of said pot support.

2. In an electric stove as defined in claim 1, said surface means of said pot support including a plurality of horizontally spaced portions, and said surface means of said heating element including at least one portion interposed between said horizontally spaced portions of said surface means of said pot support.

3. In an electric stove as defined in claim 2, said surface means of said heating element including a plurality of generally annular portions at differing radial distances from a central vertical axis and interposed between said horizontally spaced portions of said surface means of said pot support.

4. In an electric stove as defined in claim 1, a horizontal wall having an opening therein, and means for supporting said pot support generally within said opening.

5. In an electric stove as defined in claim 4, an upstanding ridge around said opening to prevent flow of liquids into said opening.

6. In an electric stove as defined in claim 5, said pot support including an outer ring portion above said ridge.

7. In an electric stove as defined in claim 1, said pot support including a thin flat horizontal plate portion having an upper surface defining said surface means thereof, and said surface means of said heating element being engageable with the lower surface of said thin flat horizontal plate portion.

8. In an electric stove as defined in claim 7, said thin flat horizontal plate portion being perforated.

9. In an electric stove as defined in claim 7, a horizontal wall having an opening therein, and means supporting said pot support in said opening including a plurality of depending spring fingers at peripherally spaced points of said horizontal plate portion engageable with the edge of said top wall opening.

10. In an electric stove as defined in claim 7, a horizontal wall having an opening therein, and means supporting said pot support in said opening with said upper surface thereof in a plane in spaced relation above the plane of the upper surface of said wall, said pot support including a peripheral edge portion beveled downwardly to said wall outside said opening.

11. In an electric stove as defined in claim 1, said control means including a manually actuatable element.

12. In an electric stove as defined in claim 1, said control means including an electrically driven drive element.

13. In an electric stove as defined in claim 1, said control means including temperature responsive means for controlling the relative position of said heating element and said pot support in accordance with the temperature of the underside of the pot.

14. In an electric stove as defined in claim 13, said temperature responsive means including electrical temperature sensing means, and electromechanical means controlled by said sensing means for controlling the relative position of said heating element and said pot support.

15. In an electric stove as defined in claim 13, said temperature responsive means including a thermal element deformed in accordance with the temperature of the underside of the pot, and means mechanically coupled to said element for controlling the relative position of said heating element and said pot support.

16. In an electric stove as defined in claim 1, manually actuatable temperature setting means, means controlled by said temperature setting means for controlling the electrical energization of said heating element, and means controlled by said temperature setting means for controlling said control means for effecting relative vertical movement of said pot support and said heating element.

17. In an electric stove as defined in claim 1, said pot support being stationary, and said control means being operative to move said heating element downwardly away from the pot, and means for holding said heating element in a downward position.

18. In an electric stove as defined in claim 17, means including time delay means for automatically releasing said holding means and raising said heating element after a certain time delay period.

19. In an electric stove as defined in claim 18, said time delay means including a thermostatic element.

20. In an electric stove as defined in claim 18, said time delay means including geared mechanical escapement means.

21. In an electric stove as defined in claim 1, said second support means including a vertically movable support centrally located with respect to said heating element, and a connection between said heating element and said vertically movable support arranged to allow tilting movement of said heating element.

22. In an electric stove as defined in claim 21, stabilizing means for limiting said tilting movement of said heating element.

23. In an electric stove as defined in claim 1, said second support means including a vertically extending elongated support, means journaling said support for vertical movement along a vertical axis centrally located with respect to said heating element, means restraining said support against rotation about said axis, and means connecting said heating element to an upper end portion of said support, said connecting means being operative to restrain said heating element against rotation relative to said support.

24. In an electric stove as defined in claim 1, said control means including a lever.

25. In an electric stove as defined in claim 1, said control means including a solenoid.

26. In an electric stove as defined in claim 1, said control means including an electric motor.

27. In an electric stove as defined in claim 1, said control means including a manually rotatable control element, and cam means actuated by rotation of said control element.

28. In an electric stove as defined in claim 1, a stationary frame structure, said first support means and said pot support being carried by said frame structure, said yieldable means being operative between said second support means and said frame structure to urge said heating element upwardly toward the pot, and said control means being operative against the action of said yieldable means to lower said second support means and said heating element.

29. In an electric stove as defined in claim 28, means for releasably latching said heating element in a downward position.

30. In an electric stove as defined in claim 29, means restraining said heating element against rapid upward movement upon release of said latching means.

31. In an electric stove as defined in claim 1, said pot support including a thin flat horizontal plate portion having an upper surface defining said surface means thereof, and said control means including spring means for urging said heating element upwardly relative to said pot support to normally press said heating element into engagement with the under surface of said plate portion.

32. In an electric stove as defined in claim 1, tilting action means for supporting said heating element to normally obtain maximum area of contact with the pot.

33. In an electric stove as defined in claim 1, said heating element being substantially stationary, and said control means being operative to move said pot support upwardly to lift the pot off said heating element.

34. In an electric stove as defined in claim 33, latch means for latching said pot support in an upward position.

35. In an electric stove as defined in claim 34, means for releasing said latch means after elapse of a time interval.

36. In an electric stove as defined in claim 33, manually actuatable means for releasing said latch means.

37. In an electric stove as defined in claim 33, a vertically movable support structure operated by said control means and arranged to support said pot support while limiting tilting movement of said pot support.

38. In an electric stove as defined in claim 37, said pot support being liftable off said support structure.

39. In an electric stove as defined in claim 1, said control means including a manually depressible pushbutton element.

40. In an electric stove as defined in claim 39, said control means being operative to effect relative vertical movement of said pot support and said heating element in a direction such that the underside of the pot is separated from said heating element when said pushbutton element is depressed.

41. In an electric stove as defined in claim 1, said control means including manually actuatable means, means controlled by said manually actuatable means to control electrical energization of said heating element, said manually actuatable means having an off position in which said heating element is deenergized and in which the underside of the pot is vertically separated from said heating element.

42. In an electric stove as defined in claim 1, means associated with said control means for indicating the relative vertical position of said pot support and said heating element.

43. In an electric stove as defined in claim 1, said control means including a pair of shafts journaled in spaced parallel horizontal axes, a pair of intermeshed gears on said shafts having the same pitch diameter, and a pair of arms on said shafts for effecting said relative vertical movement of said pot support and said heating element.

44. In an electric stove as defined in claim 43, said heating element being stationary and said arms being arranged to lift said support.

45. In an electric stove as defined in claim 1, said control means including a manually actuatable element, means controllable by said manually actuatable element for adjusting the relative vertical position of said heating element and said pot support, means controllable by said manually actuatable element for latching said heating element and said pot support in relative vertical relationship, and means for automatically releasing said latching means.

46. In an electric stove as defined in claim 17, means for manually releasing said holding means.

47. In an electric stove as defined in claim 1, said pot support including air channel means to permit escapement of trapped hot air with a pot thereon.

48. In an electric stove as defined in claim 1, said surface means of said heating element including a plurality of horizontally spaced portions, and said surface means of said pot support including at least one portion interposed between said horizontally spaced portions of said surface means of said heating element.

49. In an electric stove as defined in claim 48, said one portion of said surface means of said pot support being a radially extending portion.

50. In an electric stove as defined in claim 1, means including a hinged connection for supporting said heating element.